US006910213B1

(12) United States Patent
Hirono et al.

(10) Patent No.: US 6,910,213 B1
(45) Date of Patent: Jun. 21, 2005

(54) PROGRAM CONTROL APPARATUS AND METHOD AND APPARATUS FOR MEMORY ALLOCATION ENSURING EXECUTION OF A PROCESS EXCLUSIVELY AND ENSURING REAL TIME OPERATION, WITHOUT LOCKING COMPUTER SYSTEM

(75) Inventors: Mitsuaki Hirono, Kyoto (JP); Kazushi Inui, Kyoto (JP); Yoshiharu Konaka, Kyoto (JP); Hiroshi Kuribayashi, Kyoto (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 09/195,125

(22) Filed: Nov. 18, 1998

(30) Foreign Application Priority Data

Nov. 21, 1997 (JP) .............................. 9-321766
Sep. 14, 1998 (JP) ........................... 10-260427

(51) Int. Cl.[7] .............................................. G06F 9/00
(52) U.S. Cl. ...................................................... 718/108
(58) Field of Search ................................ 709/318, 103, 709/102, 108; 719/318; 718/102, 103, 108

(56) References Cited

U.S. PATENT DOCUMENTS

| | | | | |
|---|---|---|---|---|
| 5,088,036 A | * | 2/1992 | Ellis et al. | 707/206 |
| 5,355,484 A | * | 10/1994 | Record et al. | 717/127 |
| 5,842,016 A | * | 11/1998 | Toutonghi et al. | 707/206 |
| 5,898,873 A | * | 4/1999 | Lehr | 717/125 |
| 6,026,428 A | * | 2/2000 | Hutchison et al. | 709/108 |
| 6,061,711 A | * | 5/2000 | Song et al. | 709/108 |
| 6,212,544 B1 | * | 4/2001 | Borkenhagen et al. | 709/102 |

FOREIGN PATENT DOCUMENTS

| | | |
|---|---|---|
| JP | 61-75649 | 4/1986 |
| JP | 3-231333 | 10/1991 |
| JP | 92-1076 | 1/1992 |
| JP | 4-38540 | 2/1992 |
| JP | 94-6618 | 4/1994 |
| JP | 6-208502 | 7/1994 |
| JP | 8-153037 | 6/1996 |

OTHER PUBLICATIONS

Taiichi Yuasa, "Algorithms for Realtime Garbage Collection," Jyouhoushori, Nov. 1994 w/translation.

Yuji Chiba et al., "An Implementation of a Control Stack on Standard ML of New Jersey," Proceedings of 12th Conference of Japan Society for Software Science and Technology w/translation.

Lu Xu et al., "Distributed Garbage Collection for Parallel Inference Machine: PIE64," 38th (1989 First Term) National Conference of Information Processing Society of Japan, pp. 1563–1564.

\* cited by examiner

Primary Examiner—Meng-Al T. An
Assistant Examiner—Li B. Zhen
(74) Attorney, Agent, or Firm—Dickstein Shapiro Morin & Oshinsky LLP

(57) ABSTRACT

A program control apparatus ensuring real time response by ensuring execution of a process exclusively without locking the system includes a unit responsive to an application program interface call from a thread which interface requesting start of detection of presence/absence of a context switching, for setting a flag indicating presence/absence of a context switching to a state corresponding to absence of a context switching, a unit for setting, after said flag is set to the state corresponding to absence of a context switching and a scheduler switches context, the flag to a state corresponding to presence of a context switching, and a unit responsive to an application program interface call from the thread, which interface requesting termination of detection of presence/absence of a context switching, returning a value corresponding to the state of the flag to the thread.

9 Claims, 46 Drawing Sheets

*FIG.26A* *FIG.26B*
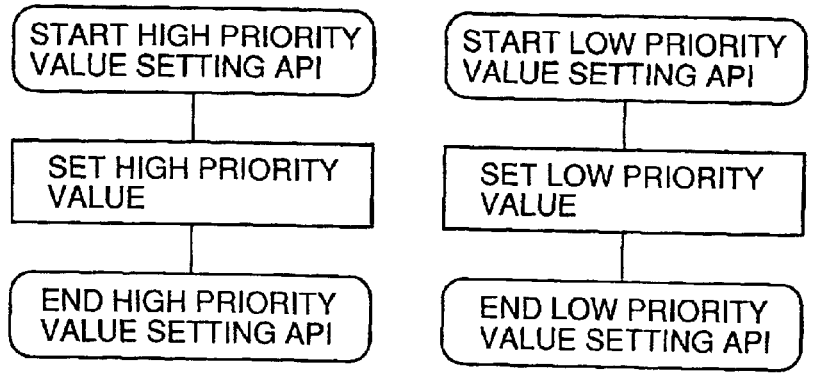
*FIG.26C* *FIG.26D*
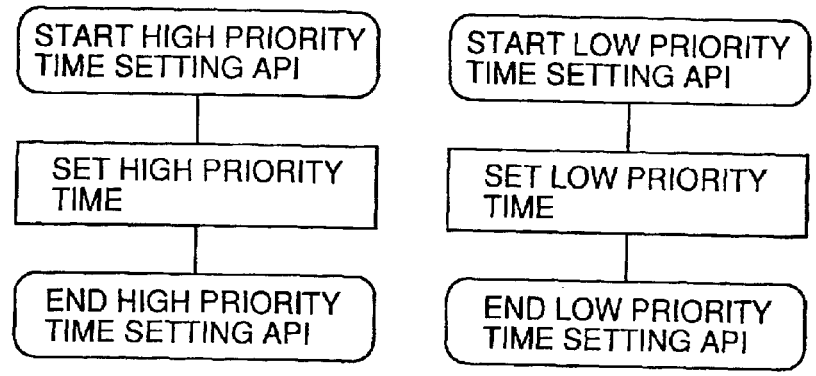
*FIG.26E*
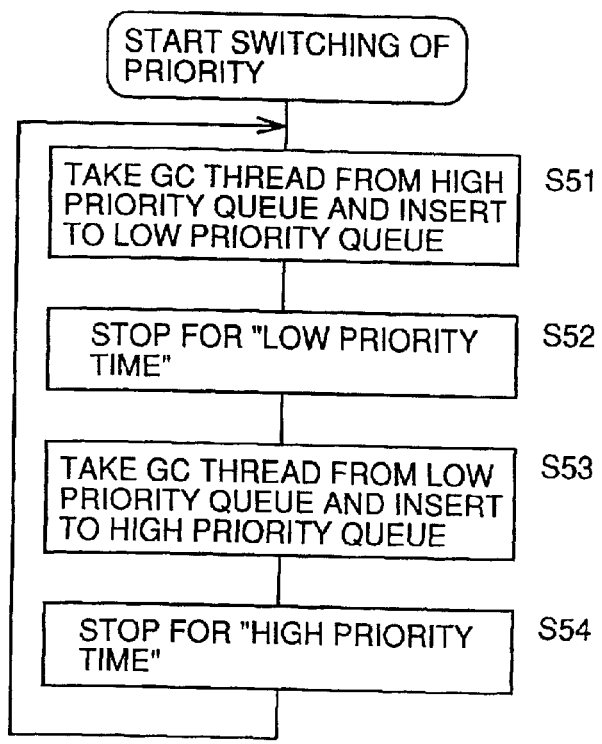

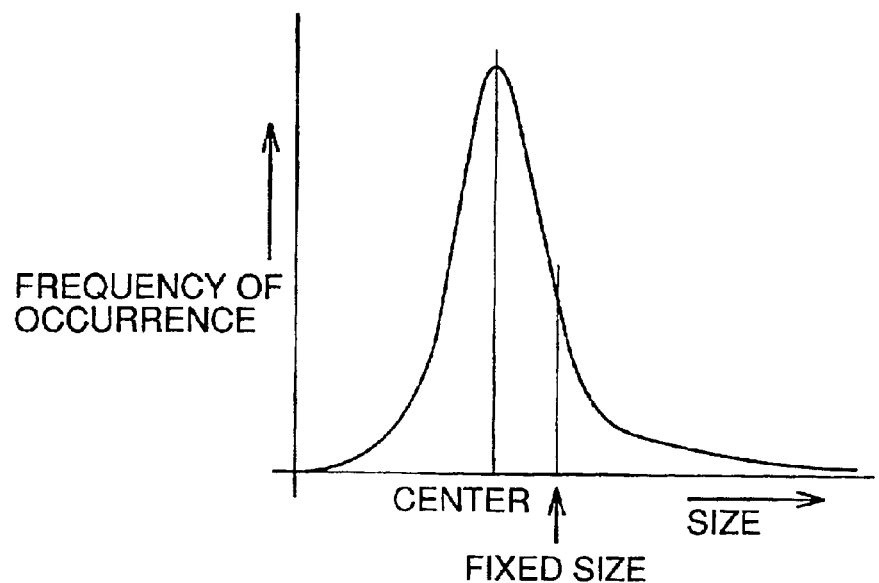

PROGRAM CONTROL APPARATUS AND METHOD AND APPARATUS FOR MEMORY ALLOCATION ENSURING EXECUTION OF A PROCESS EXCLUSIVELY AND ENSURING REAL TIME OPERATION, WITHOUT LOCKING COMPUTER SYSTEM

BACKGROUND OF THE INVENTION

1. Field of the Invention

The present invention relates to a program control apparatus and a memory allocation apparatus. More specifically, the present invention relates to a program control apparatus and a memory allocation apparatus ensuring execution of a process exclusively and ensures real time operation, without using computer resources for lock mechanism such as a semaphore and an event flag.

Definitions of various terms used in the specification of the present invention are as follows.

(1) Process

A virtual address space containing one or more threads.

(2) Thread

The basic unit of program execution. A process can have several threads running concurrently, each performing a different job, such as waiting for events or performing a time-consuming job that the program doesn't need to complete before going on. When a thread has finished its job, the thread is suspended or destroyed.

(3) Context (In relation to object oriented system) an object storing information necessary for executing a method. The contexts consists of a context of a call destination, a method object containing a program, a program counter, information referred to as a stack pointer, an area for taking an argument or temporary variable, and an evaluation stack. Such environment of execution is used as the object. The context is referred to as heap language indicating the feature of high level language supporting the process and the like. In PASCAL or ALGOL 60, such environment of execution is provided in the stack, while in FORTRAN, the environment of execution is provided in a fixed area.

(4) Task

In an environment of multi-programming or multi-processing, one or more trains of instructions handled by a control program as an element of a job to be executed by the computer.

(5) Garbage

An object created but not referenced. Collected by garbage collection.

(6) Garbage Collection

The automatic detection and freeing of memory that is no longer in use. The Java runtime system performs garbage collection section so that programmers never explicitly free objects.

(7) Interpreter

A module that alternately decodes and executes every statement in some body of code. The Java interpreter decodes and executes bytecode for the Java virtual machine.

(8) Real Time

A term representing a system in which processing of data input to the system is performed substantially at the same time as the event.

(9) Object

An entity for coupling a procedure with data characteristic, based on which calculation is performed and local state is stored.

(10) Class

In the Java programming language, a type that defines the implementation of a particular kind of object. A class definition defines instance and class variables and methods, as well as specifying the interfaces the class implements and the immediate superclass of the class. If the superclass is not explicitly specified, the superclass will implicitly be object.

(11) Heap Area

Work area of the memory used as needed while a program is being executed.

(12) Scheduling

Selecting a job or a task to be dispatched.

(13) Event

A change in the state of hardware/software noticed to other hardware/software. Generally in this notice, various parameters representing the type of event and the state of hardware/software are transmitted together as a message to the receiver. The receiver receiving the event notice performs an appropriate process in accordance with the message parameters and the like.

(14) Event Flag

Task-to-task synchronous communication mechanism where the task has a function of waiting for an occurrence of one or a plurality of events and a function of noticing the event.

(15) Semaphore

In a system processing a plurality of processes or tasks concurrently, a scheme for realizing synchronization between processes or tasks, message control and interruption.

(16) Virtual Machine

An environment for executing an application program not dependent on a specific platform, incorporated in a plurality of specific platforms (OS or hardware). When the same virtual machine is provided, the same application program can be executed even when platforms differ.

(17) Java VM (Java Virtual Machine)

The part of the Java runtime environment responsible for interpreting bytecodes.

(18) Free Area

A usable area on the heap area.

A not-yet used area.

(19) Normal Thread

A thread performing a process not requiring real time operation.

(20) Mark Table

A table used to see if an object is referenced or not, with each element of the table being in one to one correspondence to the object. When it is confirmed that an object has a reference, a column of the table corresponding to the object is marked. After all reference relations are confirmed, objects left unmarked are unnecessary, and therefore these objects can be deleted.

(21) Life Time of Object

The time from creation to deletion of an object.

(22) Write Barrier

Checking of a change in reference relation to an object and performing some process when there is an overwrite. In the present specification, when there is an overwrite, a column of the mark table corresponding to that object which is referenced is marked.

(23) Sweeping

A process of deleting an unnecessary object on the heap area.

(24) Create the Object

Allocating a part of the heap area to an object and to initialize contents of the object.

(25) Delete the Object

Removing an unnecessary object. More specifically, an area secured on the heap area is freed.

(26) Reference

For an object A to access another object B, necessary information specifying object B. More specifically, a pointer or an index indicating object B.

(27) Change the Reference/Reconnected the Reference

Change of reference from a present object B to another object C.

2. Description of the Background Art

Consider concurrent processing of a plurality of threads on an operating system, in a computer system having a single processor. Here, for mutual exclusion using a shared memory, and for synchronization with among a plurality of tasks, mutual exclusion is controlled by using a semaphore or an event flag.

Further, in order to operate a program in an environment of a small memory capacity, a so called dynamic memory management has been utilized, in which a memory of a single address space is dynamically allocated when a program is executed, without utilizing a virtual memory. In such dynamic memory management, use of a once allocated memory area often ceases. In such situation, unless the memory area is explicitly freed by the program, the memory area cannot be re-used. As a result, the program gradually runs short of available free area. In order to avoid such a problem, a process referred to as garbage collection (hereinafter referred to as "GC") is performed. GC extracts wasted or no longer used memory areas (garbage), collects these memory areas and provide the resulting area as a re-usable flee area.

FIG. 1 shows, in the form of a flow chart, the process steps of conventional GC. Various methods such as mark & sweep method, copy method and reference count method have been proposed as GC algorithms. Here, mark & sweep method will be described as an example. Referring to FIG. 1, in order to prevent any thread other than the GC thread from being executed during GC, interruption of other threads is inhibited, and operation mode enters single thread mode (s201). Thereafter, mark storing areas (hereinafter referred to as "mark table") respectively corresponding to objects allocated to an area as an object of GC on the memory (hereinafter referred to as "heap area") are cleared (s202). Thereafter, based on information representing reference relation of objects allocated to the heap area, objects which are referenced by any other object are detected, and corresponding positions on the mark table are marked (s203). An object which is not referenced by any other object is a wasted object which is not used any longer. In this process, that position of the mark table which corresponds to the non-referenced object is not marked. Therefore, an area to which the object which is not marked is allocated is extracted as an area to which a new object is allocatable, that is, as a free area (s204). The free area is generated as data in the form of a list, for example. Thereafter, interruption inhibition is cancelled, and the operation mode returns to a multi thread mode (s205).

Conventionally, such GC is automatically activated when the free area of the memory is decreased to a prescribed amount.

By GC, objects of various different sizes (memory sizes) are freed, resulting in fragmentation in the heap area. In order to secure a continuous large sized areas, memory compaction (hereinafter simply referred to as "compaction") is performed in which object allocation areas are successively packed starting from the head.

In the conventional system, the function of mutual exclusion described above is implemented by utilizing computer resources such as a semaphore or an event flag. Therefore, when the resource is used by a certain thread, other thread have to wait until the resource is freed and available. The time for waiting causes a great hindrance in a system requiring real time response. More specifically, the thread which is waiting for the resource cannot be processed until the resource is freed. Therefore, real time response of the threads is impossible.

According to the above described conventional GC, the wider the memory space, the longer it takes to find areas which can be collected as garbage. For example, it takes few seconds for a heap area of 64 to 128 MB. Further, GC is performed irregularly when the free area is decreased to some extent. For this reason, GC cannot be used in a system requiring real time response.

In the system requiring a real time response, when an event (interruption) occurs while a task is being executed, another thread corresponding to the event will be processed. Here, the time necessary for switching of the thread need to be at most several tens $\mu$sec, for example, in the worst case. In the conventional method, however, activation of GC is unpredictable, as described above, and once activated, CPU (Central Processing Unit) operates only for GC for few seconds. In this period, real time processing is impossible.

This problem is caused not only by GC, and the problem is commonly experienced in systems which suffer from long period of wait time for resources.

As another method of GC, a method of ensuring real time operation by incrementally performing the conventional copy method has been described in *JYOUHOUSHORI* (Information Processing) Vol. 35 No. 11 pp. 1008~1010. Here, "incremental" means that even when a process is interrupted, the process can be started from the interrupted portion when resumed. This method allows interruption of the process amid GC. Therefore, concurrent processing of GC time-divisionally with other threads is possible in a sense. In this method of incremental execution of the copy method, however, the memory cannot be used by other thread during copying. This means that concurrent processing of only a few threads which do not use the memory is possible. Further, in the copy method, both the memory area for the source and destination of the original and the copy must be secured. This degrades efficiency of use of the memory, and therefore the method is not suitable for a system which is operated in an environment of a small memory capacity.

The method of marking every time a reference relation is changed or reconnected in order that the mark & sweep method corresponds to multi threads is referred to as "on-the-fly GC." A method for multi CPU implementation in which a process is allocated to a CPU used only for GC is described in *JYOUHOUSHORI* Vol. 35 No. 11 pp. 1006~1008. In this method, however, when objects are continuously created and reference relation is reconnected, it becomes necessary to go over and over an already marked tree to search for a new node and to mark the newly found node. This may results in endless marking or very long time for marking. Further, this method requires locking of the system during sweeping.

Further, conventional GC in accordance with mark & sweep method or the like involves compaction for eliminating fragmentation of the heap area. The CPU consumes considerable power for compaction, whereas without compaction, efficiency in use of the memory is much degraded.

Further, in a conventional object oriented system, objects having a long life and existing permanently and objects having a short life which cease in a short time exist mixtedly on the heap area. Accordingly, when GC is performed, objects having shorter lives are deleted first, resulting in fragmentation in the memory area, and therefore efficiency in use of the memory degrades abruptly. In GC, determination as to whether an object is a garbage or not must be made every time even on a permanently existing object. This wastes the power of the CPU. In order to solve this problem, so called generation garbage collection has been proposed, in which objects which have existed for a prescribed time period are considered permanent and excluded from the search for presence. Even this method, however, has a disadvantage that unnecessary objects still exist, or it is necessary to check and see existence of objects at every prescribed period.

The incremental GC by mark & sweep method will be described with reference to FIG. 2 to 47.

Referring to FIG. 2, the overall process procedure of GC in accordance with mark & sweep method will be described with reference to FIG. 2. In the GC, clearing of the mark table, marking by tree searching described above and deletion (sweep) of an object are repeated.

Referring to FIG. 3, the content of "mark clear" process of FIG. 2 will be described. In this process, contents of the mark table are cleared temporarily. First, a pointer is moved to the head of the mark table (s131), a mark at the position pointed by the pointer is cleared (s132), and the pointer is moved to a next mark position (s133). Such steps are repeated for all marks (s134→s132→ . . . ).

Referring to FIG. 4, the contents of the process "deletion of object" in FIG. 40 will be described with reference to FIG. 4. First, the pointer is moved to the head of the mark table (s141). Whether there is a mark or not is detected and if not marked, a position in the heap area of an object corresponding to that position which is pointed by the pointer on the mark table is calculated, and the corresponding object is deleted (s142→s143→s144). Thereafter, the pointer of the mark table is moved to a next position and similar steps are repeated (s145→s146→s142→ . . . ). In this manner, objects which are marked on the mark table are left while other objects are deleted from the heap area.

Next, marking in the mark & sweep method will be described.

Referring to FIGS. 5A to 5C, the procedure of marking through tree searching will be described. As can be seen in FIG. 5A, reference relation represented by the tree structure is traced from a root node 10 to each node, and a node (object) which has a reference relation is marked. More specifically, a bit at a corresponding position of the mark table is set. The tree structure is constituted by contents of variables provided in the object indicating, for example, what object references what other object, and tracing of the reference relation of the objects corresponds to tracing of the tree.

Referring to FIG. 5A, assume that there is an interruption at a time point when nodes up to node 3 have been marked. By the interruption, reference relation from root node 10 to an object represented by node 7 is disconnected as shown in FIG. 5B, and a new reference relation is generated in which an object represented by node 2 references an object represented by node 7. When the interruption process is terminated, the flow returns to the GC thread and marking is restarted, the reference relation from the root node to be object represented by node 7 is lost. Therefore, referring to FIG. 5, the pointer returns to root node 10 and thereafter proceeds to node 8 which has the reference relation. At this time point, nodes 5 and 6 are not marked. Therefore, it is necessary for an object of which reference relation is changed or reconnected to trace the tree starting from that object and mark any object which is referenced by that object.

Referring to FIG. 6, the process of "object creation" will be described. First, a kernel locks the system (s151). A free area in the heap area is searched for (s152). A necessary size is allocated to an area larger than the size of an object to be created (s153→s154). A mark is marked (write barrier) indicating that there is a reference reconnection (s155), and the system is unlocked (s156).

Referring to FIG. 7, the process of "marking indicating reference reconnection" will be described. First, based on the reference reconnected object, a position on the mark table is calculated, and whether or not corresponding mark is WHITE determined. The WHITE mark is represented by 2 bits of 00, for example, representing unmarked state. If corresponding mark is not a WHITE mark, it means that the position is already marked, and the process is terminated. If the mark is the WHITE mark, it is marked GRAY. The GRAY mark is represented by 2 bits of 01, for example, indicating that the object has been subjected to reference reconnection. The calculation for finding the mark position from the object may be performed by multiplying the address of the object by ⅛ and adding an offset, or performed based on a serial number of the object.

Referring to FIG. 8, the process of "marking through tree search" will be described. First, a pointer for tracing the tree is moved to the root node of the tree (s161), and a newly created object is marked BLACK (s162). Thereafter, tracing the tree, the pointer is moved to a next object (s163), and the steps are repeated until the end of the tree (s164→s162→ . . .). Thereafter, the pointer is moved to the head of each thread stack (a stack generated for each thread) (s165), and an objects in the stack is marked by a corresponding mark (s166). Thereafter, the pointer is moved to the next object of the stack (s167), and the steps are repeated until the end of the tree (s168→s166→ . . . ). Thereafter, the pointer is moved to the next thread stack (s169), and similar steps are repeated until the end of the thread stack (s170→s166→ . . . ). The process steps for the thread stack are performed for every thread stack (s171→s172→s165→ . . . ). In this series of tree search, if any GRAY mark is detected, searching and marking are performed again starting from the root node (s173→s161→ . . . ).

Referring to FIG. 9, the process of "corresponding marking of object" will be described. In this process, based on a created object, a position on the mark table is calculated, and the position is marked BLACK. The BLACK mark is represented by 2 bits of 1x, for example, indicating that the object is in a marked state. Here, x represents 0 or 1.

According to the method of marking in the incremental GC by mark & sweep method, when there is an interruption amid the process and reference relation between objects is changed, GRAY mark is marked, and therefore tree search must be repeated. It is possible that marking never ends, and thus GC is kept pending endlessly.

SUMMARY OF THE INVENTION

The present invention was made to solve the above described problems and its object is to provide a program control apparatus and method of program control ensuring execution of a process exclusively without using a mechanism for locking computer resources such as a semaphore or an event flag.

Another object is to provide method and apparatus for memory allocation allowing substantially concurrent processing of a GC thread with other threads in mark & sweep method, thereby allowing incremental GC in which even when processing is interrupted at an arbitrary time point of GC, GC can surely be completed in a short time period.

A still further object is to provide method and apparatus of memory allocation eliminating the necessity of compaction and allowing improvement in efficiency of use of the memory.

A still further object is to provide apparatus and method of memory allocation reducing memory fragmentation taking into consideration the life of each object, allowing improvement in efficiency of use of the memory and reducing waste of CPU power.

The program control apparatus in accordance with an aspect of the present invention controls program execution in a computer system in which threads are switched in accordance with a scheduling policy by a scheduler. The program control apparatus includes a first unit responsive to a predetermined first application program interface call from a thread for setting a prescribed flag to either one of first and second state; a second unit for setting, after the flag is set to one of the aforementioned states, the flag to the other one of the first and second states upon detection of a prescribed change in the state of the computer system,; and a third unit responsive to a second application program interface call paired with the first application interface call from the aforementioned thread, for returning a value indicating the state of the flag to the aforementioned thread.

A process can be executed exclusively, without using computer resource as a lock mechanism. More specifically, whether there was a change in the flag state amid a processing of a thread A between the first application program interface (hereinafter referred to as "API") call and the second API call from the thread A can be known within the thread A. If the flag is set to either one of the first and second states, it can be known that there is no switching of threads, and that the process is done exclusively (for example, the contents of the memory used by the thread A which issued the aforementioned API is not overwritten by other thread B). If the flag is set to the other one of the first and second states, interference by the other thread can be eliminated by, for example, invalidating the process of the thread in that period and to reexecute the process, substantially enabling mutual exclusion. The other thread is not kept waiting for that period, therefore high response is maintained.

Preferably, the first unit includes a unit responsive to an application program interface call requesting start of detection of presence/absence of a context switch from a thread for setting a flag indicating presence/absence of a context switching to a state corresponding to absence of a context switching; the second unit includes a unit for setting, after the flag is set to the state corresponding to the absence of a context switching and a scheduler switches a context, the flag to a state corresponding to presence of a context switching; and the third unit includes a unit responsive to an application program interface call requesting termination of detection of presence/absence of a context switching from the aforementioned thread, for returning a value corresponding to the state of the flag to the aforementioned thread.

A process can be executed exclusively, without using computer resource as a lock mechanism. More specifically, whether there was a context switching amid processing of a thread A between an API requesting start of detection of presence/absence of a context switching and an API call requesting termination of detection of presence/absence of a context switching can be known within the thread A. If there was not a context switching, it means that there is no switching between threads and the process is done exclusively (for example, contents of the memory used by the thread A which issued the API are not overwritten by other thread B). If there was a context switching, mutual exclusion is possible while maintaining high response by, for example, invalidating the process of the thread A in the period mentioned above and by re-executing the process.

More preferably, the first unit includes: a unit responsive to an application program interface call from a thread which interface requests start of detection of presence/absence of a data write to a designated memory area, for setting a flag indicating presence/absence of the data write to a state corresponding to absence of a data write; the second unit includes a unit for setting, when there is a data write to the designated memory area, the flag to a state corresponding to presence of a data write; and the third unit includes a unit responsive to an application program interface call requesting termination of detection of presence/absence of a data write to the designated memory area, for returning a value corresponding to the state of the flag to the aforementioned thread.

A process can be executed exclusively, without using computer resource as a lock mechanism. More specifically, whether there was a write to a designated memory area by another thread amid processing of a thread A between an API call requesting start of detection of presence/absence of a data write to the designated memory area and an API call requesting termination of detection of presence/absence of a data write to the designated memory area, can be determined within the thread A. When there was not a data write, it means that the process for the designated memory area is done exclusively. If there was a data write, mutual exclusion is possible while maintaining high response by, for example, invalidating the process of thread A in the period mentioned above and by re-executing the process.

The program control apparatus in accordance with another aspect of the present invention includes: a unit for detecting an object in a memory heap area, which is not referenced by any object and for incrementally executing a garbage collection thread for freeing a memory area of the non-referenced object as a free memory area allocatable to other objects; a unit for scheduling time divisional execution of threads in accordance with priorities of the threads; and a unit for alternately changing priority of the garbage collection thread to be higher and lower than priorities of the threads other than the garbage collection thread.

By alternately switching priority of the GC thread, an application in another thread is executed when the priority of GC thread is low, and when there is no other application to be executed, the GC thread is executed automatically. Thus, free memory area is enlarged automatically. When the priority of the GC thread is high, other threads are not executed. Continuous execution of the GC thread is not executed because of other thread when the GC thread has low priority. Therefore, chronic shortage of free memory area is avoided. Therefore, high performance is maintained constantly.

The program control apparatus in accordance with another aspect of the present invention includes a unit for executing a real time thread in response to an occurrence of an event, and for executing a non-real time thread at an interruption or termination of the real time thread. One of the non-real time threads is a garbage collection thread for detecting an object not referenced by any object in a memory heap area, and for incrementally executing garbage collection for freeing a memory area of the non-referenced object as a free memory area allocatable to other objects. The program control apparatus further includes a unit for executing the garbage collection thread when the free memory area in the heap area is decreased to a prescribed amount due to execution of a non-real time thread other than the garbage collection thread.

Generally, in a system requiring real time operation, threads requiring and not requiring real time operation exist mixtedly. Generally, a program requiring real time operation creates smaller amount of objects, and it is possible to design while predicting the amount. For the program not requiring real time operation, it is difficult to predict the amount of objects to be created. Therefore, the amount of objects which are expected to be created by the program requiring real time operation is defined. When a thread which does not require real time operation creates an object and the amount of free memory area is decreased near to the amount of object defined above, for example, scheduling is done at that time point and GC thread is executed. Therefore, flee area is ensured immediately, and an environment allowing execution of the thread requiring real time operation is maintained constantly.

The program control apparatus in accordance with a still further aspect of the present invention includes a unit for detecting an object which is not referenced by any object in a memory heap area, and for selectively executing a plurality of garbage collection threads of different procedures for freeing a memory area of the non-referenced object as a free memory area allocatable to other objects; and a unit for executing a garbage collection thread of one of the plurality of procedures based upon an amount of the free area or of an area used by the non-referenced object.

Generally, when GC is executed, required PC power, amount of memory used and time necessary for GC differ dependent on the algorithm of GC. Therefore, suitable procedure of GC differs dependent on the amount of free area. As the procedure of GC is switched dependent on the amount of free memory area or area to be used, efficient GC is always possible.

The apparatus for memory allocation in accordance with a still further aspect of the present invention includes a unit for detecting distribution of sizes of objects allocated in a memory heap area; and a unit for determining, as a size to be allocated to a new object in the heap area, an integer multiple of a fixed size larger than the center of the distribution.

Generally, in an object oriented system, distribution of frequency of occurrence of object sizes (sizes on the memory) created when a program is executed assumes a normal distribution. When a new object is created, an allocatable area is extracted from the free area on the memory. In the present invention, a size larger than the center of distribution of the object sizes is determined to be the size to be allocated to the new object. Accordingly, when the allocated object is deleted and a still further object is allocated, the corresponding area can be reused if the aforementioned newer object is smaller than the allocated size. As the allocated size is larger than the center of distribution of normal distribution, it becomes possible for many objects to re-use a memory area which was used before. Therefore, efficiency in use of the memory can be improved without compaction. Further, CPU power for compaction is unnecessary, and therefore a system with high response can be configured with a small scale CPU.

The apparatus for memory allocation in accordance with a still further aspect of the present invention includes: a unit for creating an object in a memory heap area; a unit for determining, as a size to be allocated to an object in the heap area, an integer multiple of a fixed size; and a unit for setting the fixed size in response to an application program interface call.

A memory allocating apparatus in accordance with a still further aspect of the present invention includes: a unit for creating an object in a memory heap area; a unit for determining, as a size to be allocated to an object in the heap area, an integer multiple of a fixed size; a unit responsive to an application program interface call for setting distribution of sizes of objects allocated in the heap area; and a unit responsive to the application program interface call for setting the fixed size to a value larger than the center of the distribution.

It becomes possible to measure distribution of object sizes allocated in the memory heap area in different apparatuses, systems and algorithms, and to register a fixed size which is a base of the determined size to be allocated to an object. Therefore, efficiency in use of the memory and CPU power can be improved.

A memory allocating apparatus in accordance with a still further aspect of the present invention allocates a template class and an object created from the class in a memory heap area. The memory allocating apparatus includes: a unit for storing data corresponding to a time when an object is created from the class; a unit for detecting life of the object when the object is deleted, and for providing data of the life in the class; and a unit for dividing, when an object is created from the class, an area for creating the object in the heap area based on the data of life.

Generally, in an object oriented system, an object is created using a class as a template. Therefore, objects created from one same class have approximately the same life. Therefore, data corresponding to a time point when an object is created from a certain class is stored. When the object is deleted, the life of the object is detected, and the detected life is stored as a life data of the class from which the object is created. When objects are created from the class, the objects are created in different heap areas based on the data of life. Therefore, an object having long life and an object having short life are created in different areas. Therefore, fragmentation in the area for the long life data can significantly be reduced, and efficiency in use of the memory is improved. Further, when executing GC, it becomes possible to execute GC focusing on the area where objects of short life are generated, so as to reduce CPU power consumed for GC.

A memory allocating apparatus in accordance with a still further aspect of the present invention includes: a reference information storing unit for detecting an object referenced by another object in a memory heap area, and for storing state of presence/absence of the reference; and an object deleting unit for freeing a memory area of an object which is not referenced by any object, as a free memory area allocatable to other object, based on the stored content of the reference information storing unit. The reference information storing unit includes a reference object detecting unit for storing first data of a tree structure representing a relation of reference among objects and second data representing an object at a portion where the relation of reference among objects is changed, for detecting an object which is referenced by searching the first data, for reading the second data, and for detecting an object which is referenced by searching the first data based on said read data.

When sweeping or mark table clearing is performed, the following effect can be obtained. Even if a new object is created by another thread or the relation of reference among objects is changed during sweeping or clearing of the mark table, erroneous deletion of the newly created object can be avoided while sweeping is performed based on the mark table, and it is not necessary to stop other threads. Therefore, GC can be done incrementally, and interruption can be done freely. This improves real time operation. Further, it becomes possible to execute GC thread continuously on the background, and therefore efficiency in use of the memory can be maintained high. Further, the time necessary for marking through tree searching is reduced. The problem of endless marking caused by interruption is prevented, and GC is surely executed.

A memory allocating apparatus in accordance with a still further aspect of the present invention includes: a unit for creating an object in a memory heap area; a heap area dividing unit for dividing the heap area into a plurality of regions of different sizes in advance; and a unit for allocating to an object to be created one of the divided regions which is the smallest among the regions larger than the size of the object.

A method of program control in accordance with a still further aspect of the present invention includes the steps of: in response to an application program interface call from a thread which interface requests start of detection of presence/absence of a context switching, setting a flag indicating presence/absence of a context switching to a state corresponding to absence of a context switching; after the flag is set to the state corresponding to the absence of a context switch, when a context is switched by a scheduler, setting the flag to a state corresponding to presence of a context switching; and in response to an application program interface call from the thread which interface requests termination of detection of presence/absence of a context switching, returning a value corresponding to the state of the flag to the thread.

A process can be executed exclusively, without using computer resource as a lock mechanism. More specifically, whether-there was a as context switching amid processing of a thread A between an API requesting start of detection of presence/absence of a context switching and an API call requesting termination of detection of presence/absence of a context switching can be known within the thread A. If there was not a context switching, it means that there is no switching between threads and the process is done exclusively (for example, contents of the memory used by the thread A which issued the API are not overwritten by other thread B). If there was a context switching, mutual exclusion is possible while maintaining high response by, for example, invalidating the process of the thread A in the period mentioned above and by re-executing the process.

A method of program control in accordance with a still further aspect of the present invention includes the steps of: in response to an application program interface call from a thread which interface requests start of detection of presence/absence of a data write to a designated memory area, setting a flag indicating presence/absence of a data write to a state corresponding to absence of the data write; setting the flag to a state corresponding to presence of a data write when there is a data write to the designated memory area; and in response to an application program interface call from the thread which interface requests termination of detection of presence/absence of a data write to the designated memory area, returning a value corresponding to the state of the flag to the thread.

A process can be executed exclusively, without using computer resource as a lock mechanism. More specifically, whether there was a write to a designated memory area by another thread amid processing of a thread A between an API call requesting start of detection of presence/absence of a data write to the designated memory area and an API call requesting termination of detection of presence/absence of a data write to the designated memory area, can be determined within the thread A. When there was not a data write, it means that the process for the designated memory area is done exclusively. If there was a data write, mutual exclusion is possible while maintaining high response by, for example, invalidating the process of thread A in the period mentioned above and by re-executing the process.

A method of program control in accordance with a still further aspect of the present invention includes the steps of: detecting an object which is not referenced by any object in a memory heap area, and incrementally executing a garbage collection thread for freeing a memory area of the non-referenced object as a free memory area allocatable to other objects; scheduling time divisional execution of threads in accordance with priorities of the threads; and alternately changing priority of the garbage collection thread to be higher and lower than priorities of the threads other than the garbage collection thread.

By alternately switching priority of the GC thread, an application in another thread is executed when the priority of GC thread is low, and when there is no other application to be executed, the GC thread is executed automatically. Thus, free memory area is enlarged automatically. When the priority of the GC thread is high, other threads are not executed. Continuous execution of the GC thread is not executed because of other thread when the GC thread has low priority. Therefore, chronic shortage of free memory area is avoided. Therefore, high performance is maintained constantly.

A method of program control in accordance with a still further aspect of the present invention includes the steps of: executing a real time thread in response to an occurrence of an event, and executing a non-real time thread at an interruption or termination of the real time thread. One of the non-real time threads is a garbage collection thread for detecting an object which is not referenced by any object in a memory heap area, and freeing a memory area of the non-referenced object as a free memory area allocatable to other objects. The method of program control further includes the step of executing the garbage collection thread when the free memory area in the heap area is decreased to a prescribed amount due to execution of a non-real time thread other than the garbage collection thread.

Generally, in a system requiring real time operation, threads requiring and not requiring real time operation exist mixedly. Generally, a program requiring real time operation creates smaller amount of objects, and it is possible to design while predicting the amount. For the program not requiring real time operation, it is difficult to predict the amount of objects to be created. Therefore, the amount of objects which are expected to be created by the program requiring real time operation is defined. When a thread which does not require real time operation creates an object and the amount of free memory area is decreased near to the amount of object defined above, for example, scheduling is done at that time point and GC thread is executed. Therefore, free area is ensured immediately, and an environment allowing execution of the thread requiring real time operation is maintained constantly.

A method of program control in accordance with a still further aspect of the present invention includes the steps of: detecting an object which is not referenced by any object in a memory heap area, and freeing the memory area of the non-referenced object as a free memory area allocatable to other objects; and selectively executing one of a plurality of garbage collection threads having different procedures, based on an amount of area used by the object or the free area.

Generally, when GC is executed, required PC power, amount of memory used and time necessary for GC differ dependent on the algorithm of GC. Therefore, suitable procedure of GC differs dependent on the amount of free area. As the procedure of GC is switched dependent on the amount of free memory area or area to be used, efficient GC is always possible.

A method of memory allocation in accordance with a still further aspect of the present invention includes the steps of: detecting distribution of sizes of objects allocated in a memory heap area, and determining, as a size to be allocated to a new object in the heap area, an integer multiple of a fixed size larger than the center of the distribution.

Generally, in an object oriented system, distribution of frequency of occurrence of object sizes (sizes on the memory) created when a program is executed assumes a normal distribution. When a new object is created, an allocatable area is extracted from the free area on the memory. In the present invention, a size larger than the center of distribution of the object sizes is determined to be the size to be allocated to the new object. Accordingly, when the allocated object is deleted and a still further object is allocated, the corresponding area can be reused if the aforementioned newer object is smaller than the allocated size. As the allocated size is larger than the center of distribution of normal distribution, it becomes possible for many objects to re-use a memory area which was used before. Therefore, efficiency in use of the memory can be improved without compaction. Further, CPU power for compaction is unnecessary, and therefore a system with high response can be configured with a small scale CPU.

A method of allocating a memory in accordance with another aspect of the present invention allocates a template class and an object created from the class in a memory heap area. The method of allocating a memory includes the steps of storing data corresponding to a time when an object is created from the class; detecting a life of the object when the object is deleted and providing data of the life in the class; and when an object is created from the class, dividing an area for creating an object in the heap area based on the data of life.

Generally, in an object oriented system, an object is created using a class as a template. Therefore, objects created from one same class have approximately the same life. Therefore, data corresponding to a time point when an object is created from a certain class is stored. When the object is deleted, the life of the object is detected, and the detected life is stored as a life data of the class from which the object is created. When objects are created from the class, the objects are created in different heap areas based on the data of life. Therefore, an object having long life and an object having short life are created in different areas. Therefore, fragmentation in the area for the long life data can significantly be reduced, and efficiency in use of the memory is improved. Further, when executing GC, it becomes possible to execute GC focusing on the area where objects of short life are generated, so as to reduce CPU power consumed for GC.

In a method of memory allocation in accordance with a still further aspect of the present invention, an object which is referenced by another object in a memory heap area is detected, a state of presence/absence of the reference is stored, and a memory area of an object which is not referenced by any object is freed as a free memory area allocatable to other objects based on the stored content. The method of memory allocation includes the steps of: storing first data of a tree structure representing a relation of reference among objects when an object is created; storing second data representing an object at a portion where the relation of reference among objects is changed; detecting an object which is referenced by searching the first data: reading the second data, and searching the first data based on the read data to detect an object which is referenced.

When sweeping or mark table clearing is performed, the following effect can be obtained. Even if a new object is created by another thread or the relation of reference among objects is changed during sweeping or clearing of the mark table, erroneous deletion of the newly created object can be avoided while sweeping is performed based on the mark table, and it is not necessary to stop other threads. Therefore, GC can be done incrementally, and interruption can be done freely. This improves real time operation. Further, it becomes possible to execute GC thread continuously on the background, and therefore efficiency in use of the memory can be maintained high. Further, the time necessary for marking through tree searching is reduced. The problem of endless marking caused by interruption is prevented, and GC is surely executed.

A computer readable recording medium in accordance with a still further aspect of the present invention stores a program control program allowing a computer to execute a method of program control. The method of program control includes the steps of: in response to an application program interface call from a thread which interface requests start of detection of presence/absence of a context switching, setting a flag indicating presence/absence of a context switching to a state corresponding to absence of a context switching; after the flag is set to the state corresponding to the absence of a context switch, when a context is switched by a scheduler, setting the flag to a state corresponding to presence of a context switching; and in response to an application program interface call from the thread which interface requests termination of detection of presence/absence of a context switching, returning a value corresponding to the state of the flag to the thread.

A process can be executed exclusively, without using computer resource as a lock mechanism. More specifically, whether there was a context switching amid processing of a thread A between an API requesting start of detection of presence/absence of a context switching and an API call requesting termination of detection of presence/absence of a context switching can be known within the thread A. If there was not a context switching, it means that there is no switching between threads and the process is done exclusively (for example, contents of the memory used by the thread A which issued the API are not overwritten by other thread B). If there was a context switching, mutual exclusion is possible while maintaining high response by, for example, invalidating the process of the thread A in the period mentioned above and by re-executing the process.

A computer readable recording medium in accordance with a still further aspect of the present invention stores a program control program allowing a computer to execute a method of program control. The method of program control includes the steps of: in response to an application program interface call from a thread which interface requests start of detection of presence/absence of a data write to a designated memory area, setting a flag indicating presence/absence of a data write to a state corresponding to absence of the data write; setting the flag to a state corresponding to presence of a data write when there is a data write to the designated memory area; and in response to an application program interface call from the thread which interface requests termination of detection of presence/absence of a data write to the designated memory area, returning a value corresponding to the state of the flag to the thread.

A process can be executed exclusively, without using computer resource as a lock mechanism. More specifically, whether there was a write to a designated memory area by another thread amid processing of a thread A between an API call requesting start of detection of presence/absence of a data write to the designated memory area and an API call requesting termination of detection of presence/absence of a data write to the designated memory area, can be determined within the thread A. When there was not a data write, it means that the process for the designated memory area is done exclusively. If there was a data write, mutual exclusion is possible while maintaining high response by, for example, invalidating the process of thread A in the period mentioned above and by re-executing the process.

A computer readable recording medium in accordance with a still further aspect of the present invention stores a program control program allowing a computer to execute a method of program control. The method of program control includes the steps of: detecting an object which is not referenced by any object in a memory heap area, and incrementally executing a garbage collection thread for freeing a memory area of the non-referenced object as a free memory area allocatable to other objects; scheduling time divisional execution of threads in accordance with priorities of the threads; and alternately changing priority of the garbage collection thread to be higher and lower than priorities of the threads other than the garbage collection thread.

By alternately switching priority of the GC thread, an application in another thread is executed when the priority of GC thread is low, and when there is no other application to be executed, the GC thread is executed automatically. Thus, free memory area is enlarged automatically. When the priority of the GC thread is high, other threads are not executed. Continuous execution of the GC thread is not executed because of other thread when the GC thread has low priority. Therefore, chronic shortage of free memory area is avoided. Therefore, high performance is maintained constantly.

A computer readable recording medium in accordance with a still further aspect of the present invention stores a program control program allowing a computer to execute a method of program control. The method of program control includes the steps of: executing a real time thread in response to an occurrence of an event, and executing a non-real time thread at an interruption or termination of the real time thread. One of the non-real time threads is a garbage collection thread for detecting an object which is not referenced by any object in a memory heap area, and freeing a memory area of the non-referenced object as a free memory area allocatable to other objects. The method program control further includes the step of executing the garbage collection thread when the free memory area in the heap area is decreased to a prescribed amount due to execution of a non-real time thread other than the garbage collection thread.

Generally, in a system requiring real time operation, threads requiring and not requiring real time operation exist mixedly. Generally, a program requiring real time operation creates smaller amount of objects, and it is possible to design while predicting the amount. For the program not requiring real time operation, it is difficult to predict the amount of objects to be created. Therefore, the amount of objects which are expected to be created by the program requiring real time operation is defined. When a thread which does not require real time operation creates an object and the amount of free memory area is decreased near to the amount of object defined above, for example, scheduling is done at that time point and GC thread is executed. Therefore, free area is ensured immediately, and an environment allowing execution of the thread requiring real time operation is maintained constantly.

A computer readable recording medium in accordance with a still further aspect of the present invention stores a program control program allowing a computer to execute a method of program control. The method of program control includes the steps of: detecting an object which is not referenced by any object in a memory heap area, freeing the memory area of the non-referenced object as a free memory area allocatable to other objects; and selectively executing one of a plurality of garbage collection threads having different procedures, based on an amount of area used by the object or the free area.

Generally, when GC is executed, required PC power, amount of memory used and time necessary for GC differ dependent on the algorithm of GC. Therefore, suitable procedure of GC differs dependent on the amount of flee area. As the procedure of GC is switched dependent on the amount of free memory area or area to be used, efficient GC is always possible.

A computer readable recording medium in accordance with a still further aspect of the present invention stores a memory allocation program allowing a computer to execute a method of memory allocation. The method of memory allocation includes the steps of: detecting distribution of sizes of objects allocated in a memory heap area; and determining, as a size to be allocated to a new object in the heap area, an integer multiple of a fixed size larger than the center of the distribution.

Generally, in an object oriented system, distribution of frequency of occurrence of object sizes (sizes on the memory) created when a program is executed assumes a normal distribution. When a new object is created, an allocatable area is extracted from the free area on the memory. In the present invention, a size larger than the center of distribution of the object sizes is determined to be the size to be allocated to the new object. Accordingly, when the allocated object is deleted and a still further object is allocated, the corresponding area can be reused if the aforementioned newer object is smaller than the allocated size. As the allocated size is larger than the center of distribution of normal distribution, it becomes possible for many objects to re-use a memory area which was used before. Therefore, efficiency in use of the memory can be improved without compaction. Further, CPU power for compaction is unnecessary, and therefore a system with high response can be configured with a small scale CPU.

A computer readable recording medium in accordance with a still further aspect of the present invention stores a program allowing a computer to function as a memory allocating apparatus. The memory allocating apparatus includes: a unit for creating an object in a memory heap area: a unit for setting a fixed size in response to an application program interface call; and a unit for determining, as a size to be allocated to an object in the heap area, an integer multiple of the fixed size.

A computer readable recording medium in accordance with a still further aspect of the present invention stores a program allowing a computer to function as a memory allocating apparatus. The memory allocating apparatus includes: a unit for creating an object in a memory heap area; a unit for setting, in response to an application program interface call, a distribution of sizes of objects allocated in the heap area; a unit for setting, in response to the application program interface call, a value larger than the center of the distribution as a fixed size; and a unit for determining as a size allocated to an object in the heap area, an integer multiple of the fixed size.

It becomes possible to measure distribution of object sizes allocated in the memory heap area in different apparatuses, systems and algorithms, and to register a fixed size which is a base of the determined size to be allocated to an object. Therefore, efficiency in use of the memory and CPU power can be improved.

A computer readable recording medium in accordance with a still further aspect of the present invention stores a memory allocation program allowing a computer to execute a method of memory allocation. In the method of a memory allocation, when a program is executed, an object is created in a memory heap area using a class as a template. The method of memory allocation includes the steps of: storing data corresponding to a time when an object is created from the class; detecting a life of the object when the data is deleted, and providing data of the life in the class; and when an object is created from the class, dividing an area for creating an object in the heap area based on the data of life.

Generally, in an object oriented system, an object is created using a class as a template. Therefore, objects created from one same class have approximately the same life. Therefore, data corresponding to a time point when an object is created from a certain class is stored. When the object is deleted, the life of the object is detected, and the detected life is stored as a life data of the class from which the object is created. When objects are created from the class, the objects are created in different heap areas based on the data of life. Therefore, an object having long life and an object having short life are created in different areas. Therefore, fragmentation in the area for the long life data can significantly be reduced, and efficiency in use of the memory is improved. Further, when executing GC, it becomes possible to execute GC focusing on the area where objects of short life are generated, so as to reduce CPU power consumed for GC.

A computer readable recording medium in accordance with a still further aspect of the present invention stores a memory allocation program allowing a computer to execute a method of memory allocation. In the method of memory allocation, an object which is referenced by another object in a memory heap area is detected, state of presence/absence of the reference is stored, and an object is deleted based on the stored content. The method of memory allocation includes the steps of: storing first data of a tree structure representing a relation of reference among objects when an object is created; storing second data representing an object at a portion where the relation of reference among objects is changed; detecting an object which is referenced by searching the first data, reading the second data and searching the first data based on the read data to detect an object which is referenced.

When sweeping or mark table clearing is performed, the following effect can be obtained. Even if a new object is created by another thread or the relation of reference among objects is changed during sweeping or clearing of the mark table, erroneous deletion of the newly created object can be avoided while sweeping is performed based on the mark table, and it is not necessary to stop other threads. Therefore, GC can be done incrementally, and interruption can be done freely. This improves real time operation. Further, it becomes possible to execute GC thread continuously on the background, and therefore efficiency in use of the memory can be maintained high. Further, the time necessary for marking through tree searching is reduced. The problem of endless marking caused by interruption is prevented, and GC is surely executed.

A computer readable recording medium in accordance with a still further aspect of the present invention stores a program allowing a computer to function as a memory allocating apparatus. The memory allocating apparatus includes a unit for creating an object in a memory heap area; a unit for dividing the heap area into a plurality of sizes in advance; and a unit for allocating to an object to be created, one of the divided areas which is the smallest among those larger than the size of the object.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 26A to 26E are flow charts related to switching of priority values and priority time of threads.

FIG. 36 shows a distribution of sizes of created objects.

FIGS. 37A and 37B are illustrations showing allocated sizes of memory to the objects.

DESCRIPTION OF THE PREFERRED EMBODIMENTS

Configurations of the program control apparatus and the memory allocation apparatus in accordance with the embodiment of the present invention will be described with reference to FIGS. 10 to 53.

Figure 10:
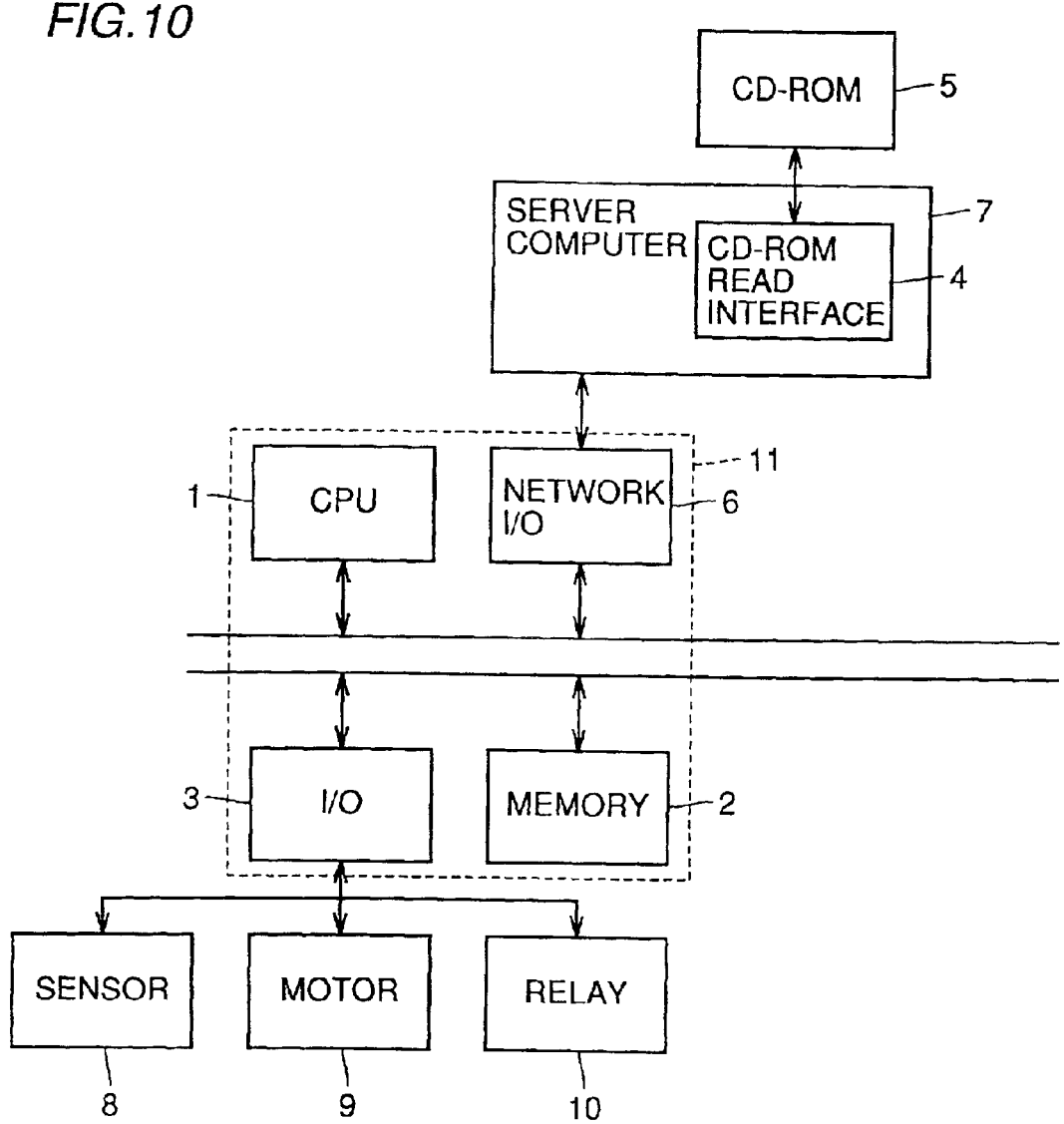
FIG. 10 is a block diagram showing a hardware configuration of an apparatus in accordance with an embodiment of the present invention.

Referring to FIG. 10, the apparatus 11 in accordance with the present embodiment includes a CPU (Central Processing Unit) 1, a memory 2 including a heap area used for creating objects and storing a mark table and programs and the like, a network I/O (Interface) 6 connected to an external server computer 7 for exchanging data, and an I/O (Interface) 3 connected to an external equipment for exchanging data. Server computer 7 includes a CD-ROM reading interface 4 for reading a program stored in a CD-ROM 5. The program read by CD-ROM reading interface 4 is loaded to memory 2 through network I/O 6. Equipment connected to I/O 3 may include a sensor 8, a motor 9, a relay 10 and the like. By appropriately combining the apparatus 11 with these equipments 8 to 10, a PLC (Programmable Logic Controller) or an ATM (Automatic Teller Machine) may be provided.

Figure 11:
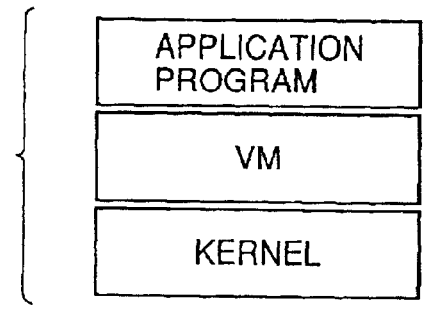
FIG. 11 is a block diagram showing a software configuration of the apparatus.

Referring to FIG. 11, software configuration will be described. Referring to the figure, a kernel portion manages the CPU and the memory as resources, and implements time divisional multi threads function. A VM (Virtual machine) portion is a software implementing interface between an application program and the kernel. Here, viewed from the application program, all the hierarchical layers below VM function as a Java virtual machine (JAVA is a trademark of Sun Microsystems). Here, the kernel and the VM portion constitute the JavaOS. The VM portion includes an interpreter for interpreting the program when the program is applied as an intermediate code such as byte code, and a program module and the like called in accordance with the interpretation. The application program shown in the figure represents various threads in the form of intermediate codes, and internal program module is executed through the interpreter.

Figure 12:
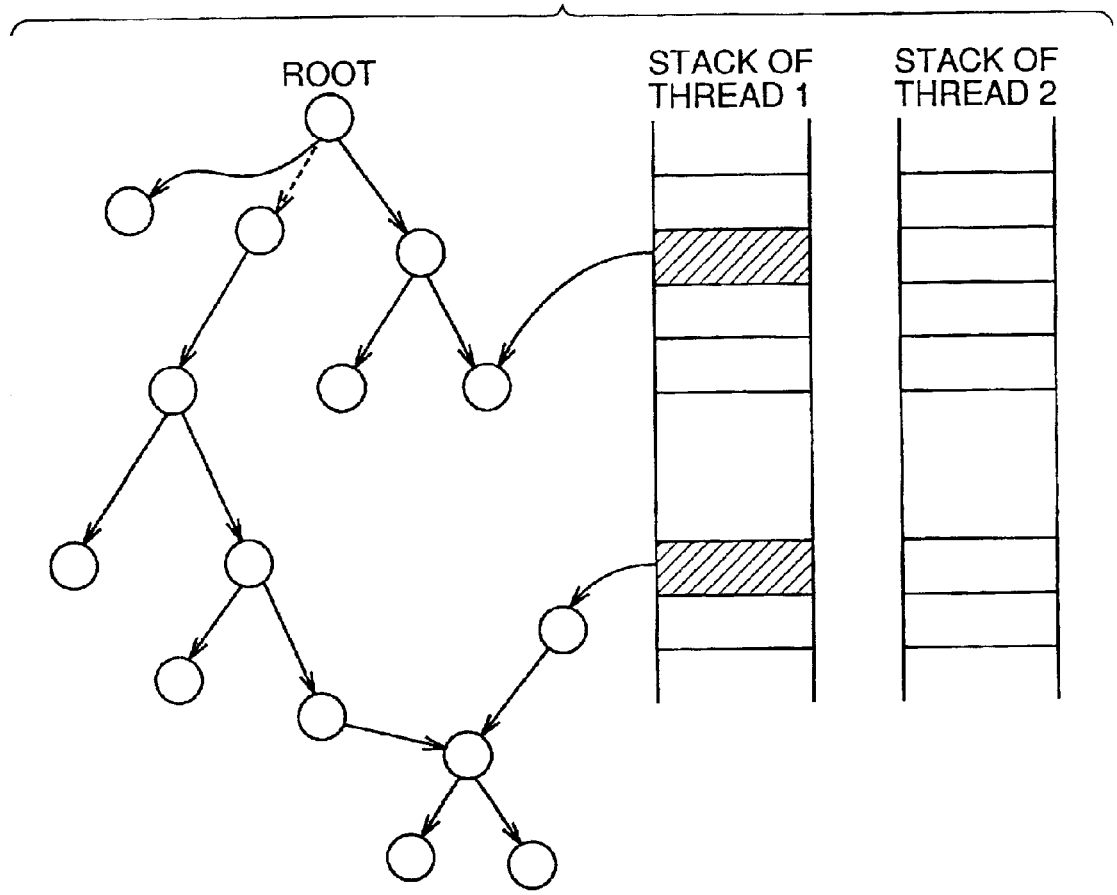
FIG. 12 is an illustration of a tree representing reference relation among objects and relation between each of threads and stacks.

FIG. 12 is an illustration showing reference relation among objects created in the heap area of memory 2 and the relation between the objects and stacks. When an object is created in the heap area, reference relation from an object to another object is represented by a tree structure extended from a root node, as shown in the figure. When a global variable is decleared for example, an object corresponding to the variable is created. Further, a stack (thread stack) storing an argument area, a return address, a local variable, a work area and so on are created thread by thread. For example, reference relation from a local variable on the stack to a global variable on the tree such as represented by allows in the figure are also stored in the stack. These stacks are stored in prescribed areas outside the heap area.

Figure 13:
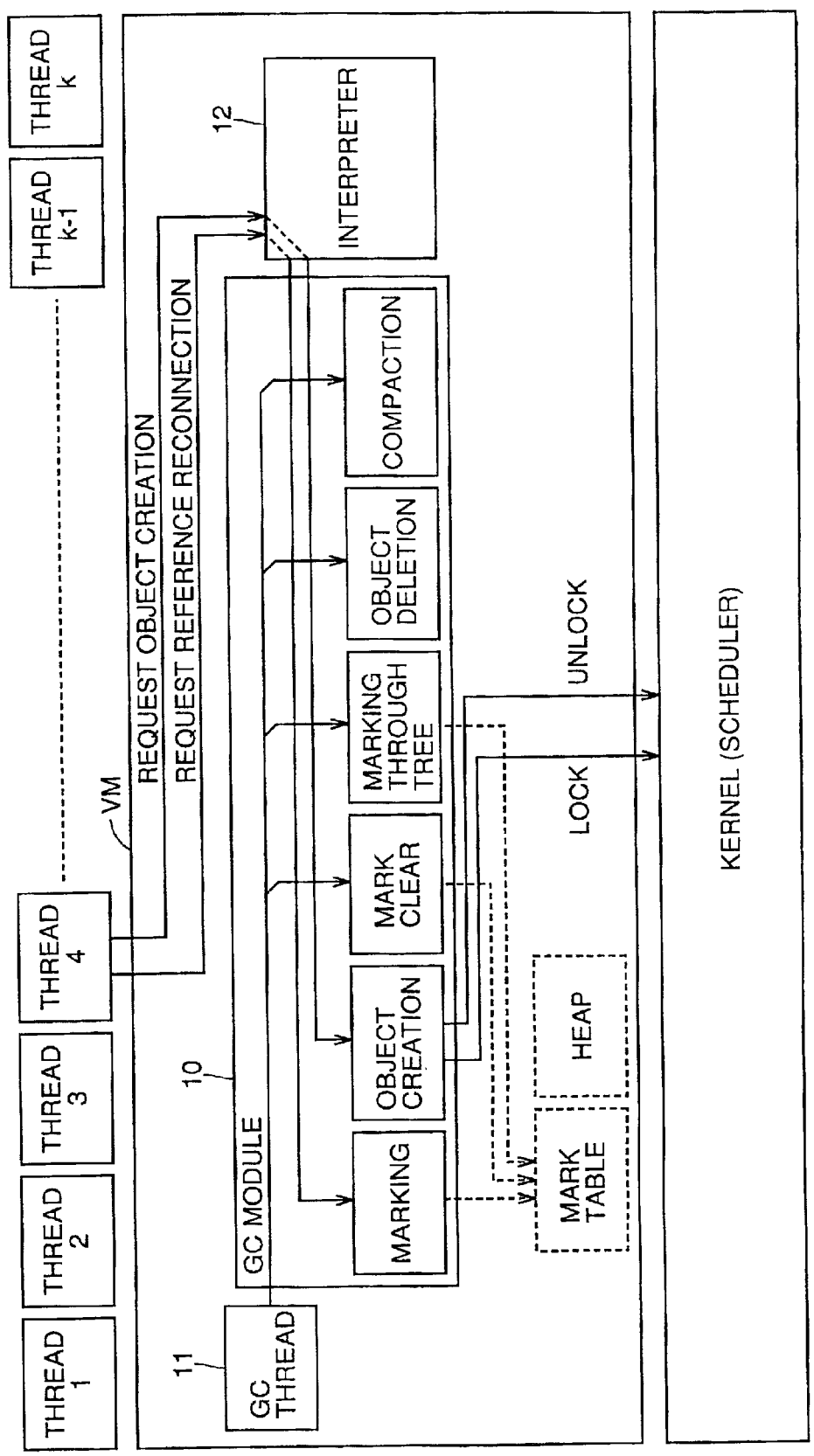
FIG. 13 is a functional block of the software.

FIG. 13 is a block diagram showing, in detail, the software configuration shown in FIG. 11. In the figure, a GC module 1 represents program modules of various processes for GC, and a GC thread 11 executes GC by calling these program modules. When there is an object creation request from "thread 4" in this example, an interpreter 12 calls a program module "object creation" of GC module 10, and when there is a request of change in reference relation among objects, it calls a program module "marking" of GC module 10.

In the example shown in FIG. 13, each thread is represented by an intermediate code (for example, byte code in the case of Java Applet). A compiler for converting the intermediate code to native code for VM may be provided. (In the case of Java, JIT(Just-In-Time compiler) may be provided.) In this case, each thread is a thread described in the native code, and therefore the thread directly accesses the GC module 10 not through interpreter 12 shown in FIG. 13.

Figure 14A:
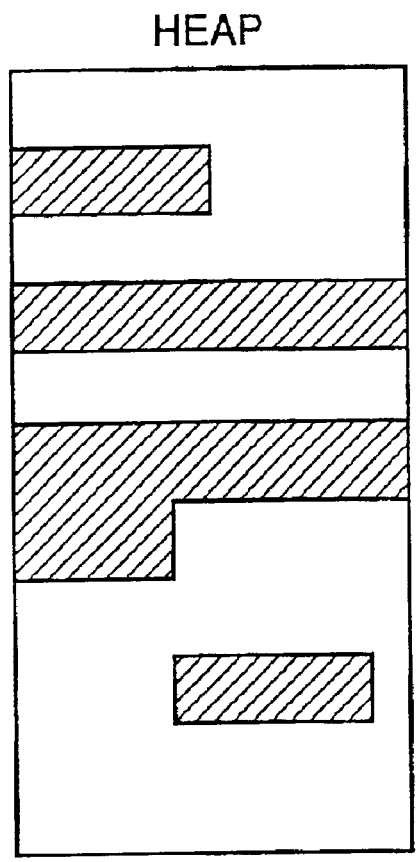
FIGS. 14A and 14B illustrate function of compaction.
Figure 14B:
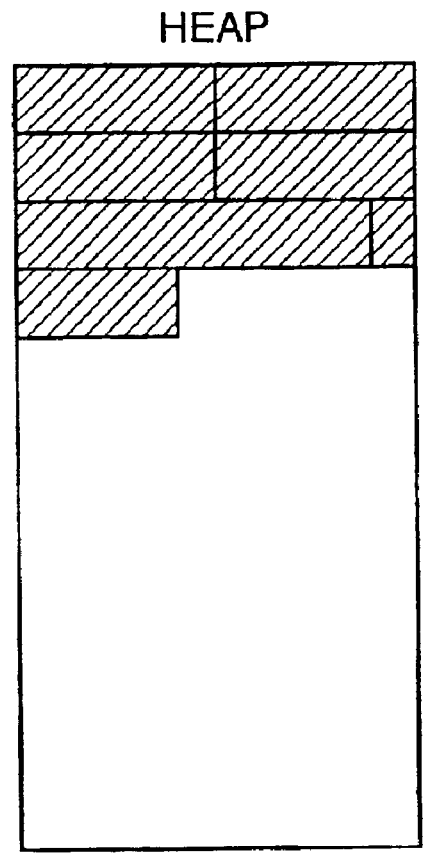

FIGS. 14A and 14B are illustrations showing an example of compaction performed in order to eliminate fragmentation in the heap area. In the figure, hatched portions represent objects. By the compaction of the heap area shown in FIG. 14A, fragmentation is eliminated as shown in FIG. 14B, and continuous memory area is widened.

The compaction is performed by the program "compaction" of the CG module shown in FIG. 13.

Figure 15A:
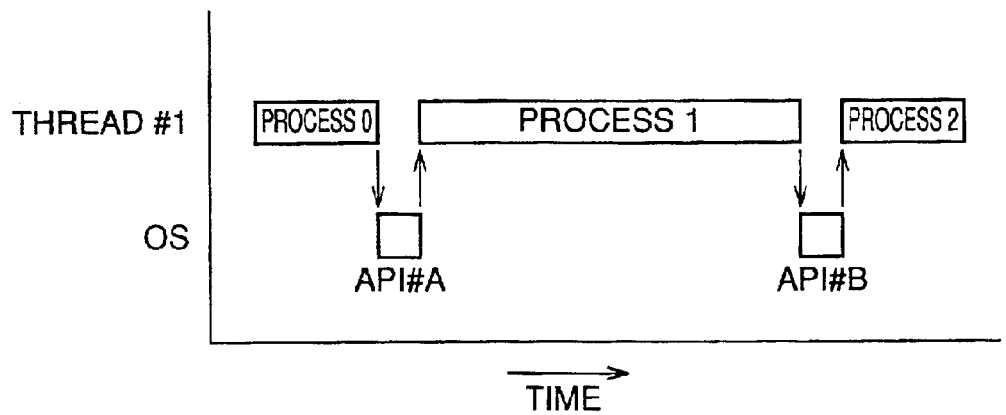
FIGS. 15A and 15B represent change in contents of processing of threads dependent on presence/absence of context switching.
Figure 15B:
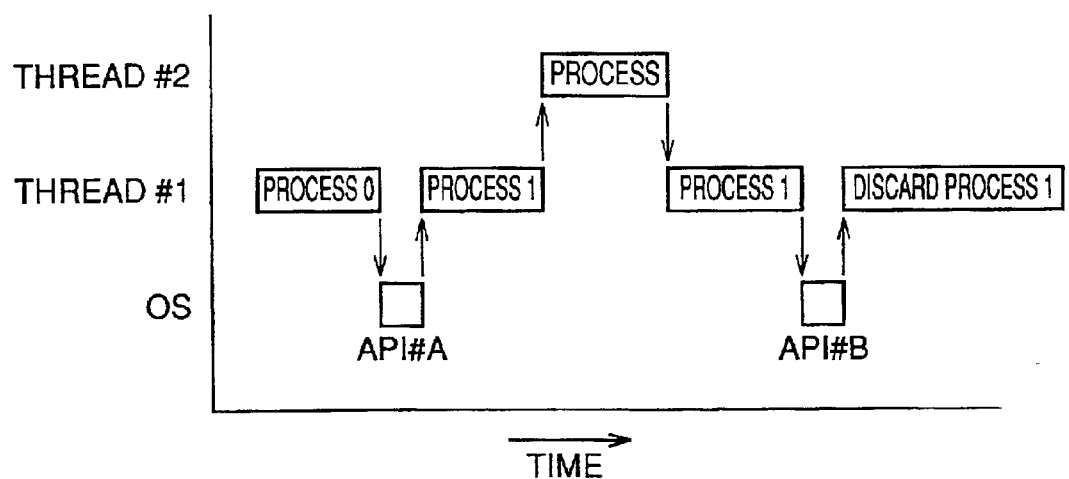

FIGS. 15A and 15B show examples of use of an API for detecting presence/absence of a context switching. Referring to FIG. 15A, before execution of a process 1, API#A requesting start of detection of presence/absence of a context switching is issued, and thereafter, process 1 is executed. After the end of process 1, API#B requesting termination of direction of a context switching is issued. In the example shown in FIG. 15A, no context switching occur in this period, and therefore the next process, process 2 is performed. If a thread #2 is processed amid the process 1 as shown in FIG. 15B, in other words, if there is a context switching, process 1 is discarded after the issuance of API#B. For example, in a process of copying the contents of a memory area A to an area B, if there is a context switching during copying, the contents of area A may be changed so that the contents of areas A and B would be inconsistent. With the contents being inconsistent, the process of copying fails. Therefore, the area B is invalidated. This has the same meaning as no process at all from the start, and therefore, here, the process itself is discarded.

Figure 16:
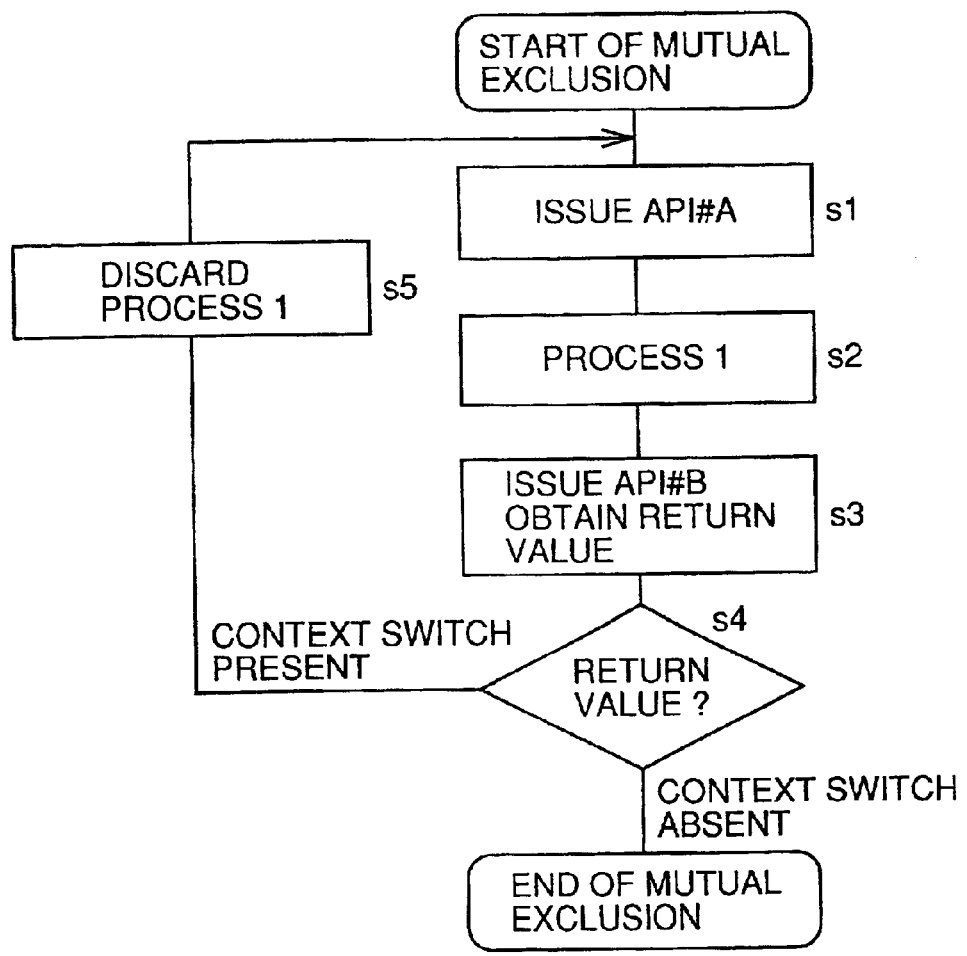
FIG. 16 is a flow chart showing mutual exclusion control process.

Referring to FIG. 16, the flow of the above described process will be described. First, API#A is issued, and process 1 is executed (s1→s2). After the end of process 1, API#B is issued and a return value is obtained (s3). When the return value indicates occurrence of a context switch, process 1 is discarded, and process 1 is executed again (s4→s5→s1→s2). When the return value indicates no context switching, the process is terminated. As presence/absence of a context switch in a prescribed period can be known, when there is a context switch, the process in the corresponding period is discarded and invalidated. Accordingly, mutual exclusion is attained whereas the system in not actually locked.

Figure 17A:
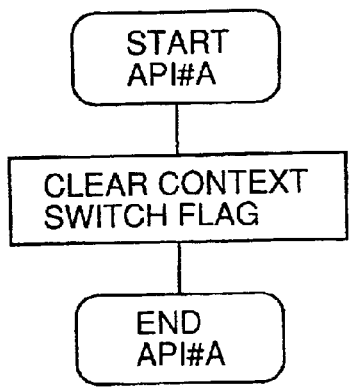
FIGS. 17A and 17B are flow charts representing a process related to an API for detecting presence/absence of a context switching.
Figure 17B:
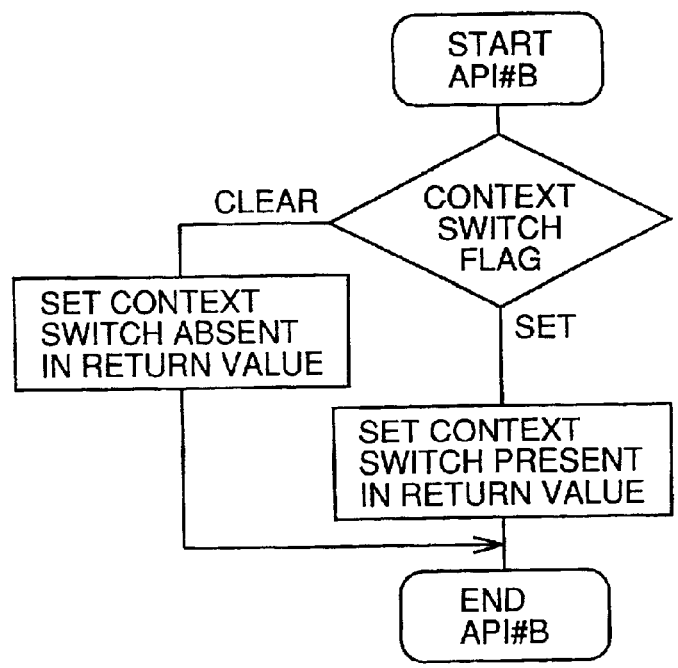

Referring to FIGS. 17A and 17B, a process procedure in the kernel of API#A and API#B will be described. Referring to FIG. 17A, when there is an issuance of API#A (system call), the kernel clears a flag indicating presence/absence of context switching (context switch flag). Referring to FIG. 17B, when API#B is issued, the kernel returns the state of the flag as a return value to the thread.

Figure 18:
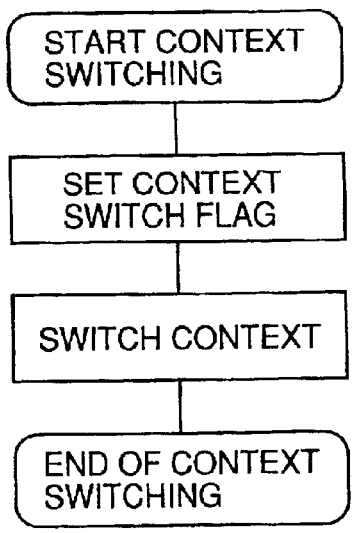
FIG. 18 is a flow chart showing a process of context switching.

Referring to FIG. 18, the process of context switching will be described. When there is a context switching by the scheduler, the context switch flag is set, and then context switching is executed. More specifically, the state of execution of the thread before switching is stored as the context, and the context of the thread after switching is read and set in a register of the CPU or the like.

Figure 19:
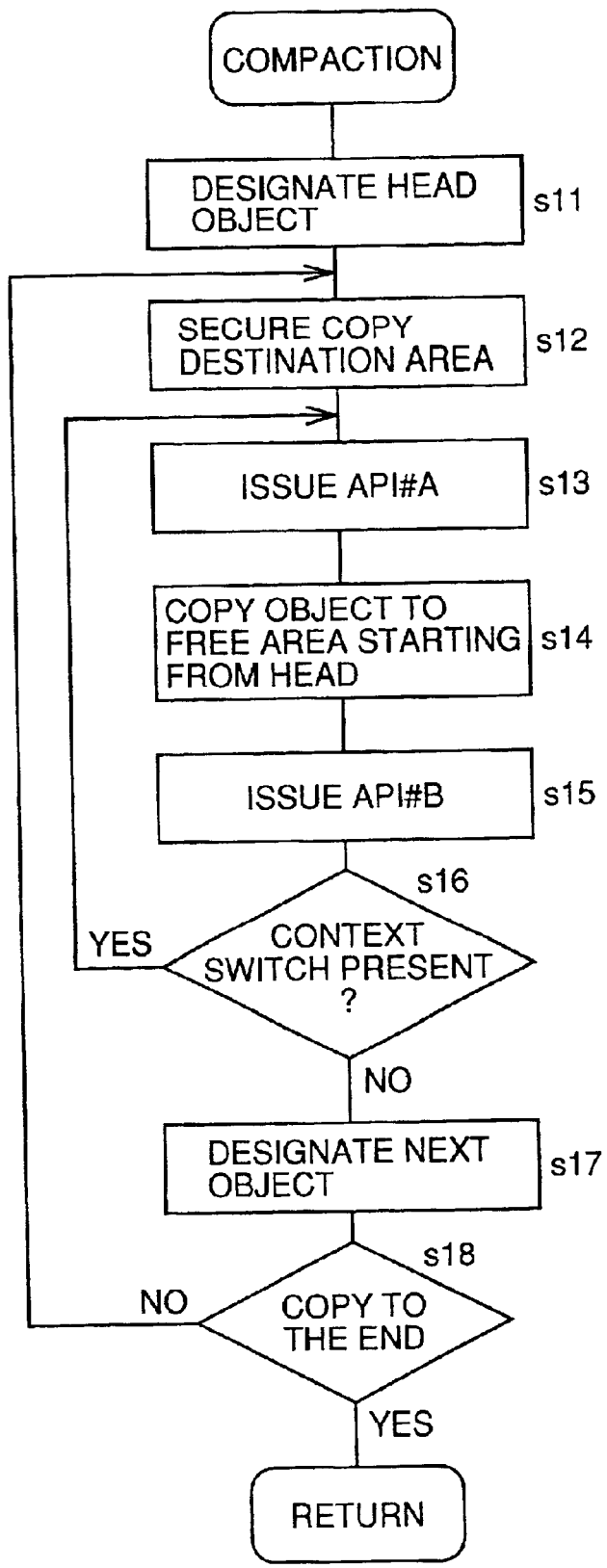
FIG. 19 is a flow chart showing a process of compaction.

Referring to FIG. 19, the process of compaction in GC in accordance with mark & sweep method will be described in detail. First, a heading object in the heap area is designated (s11). Thereafter, an area for copying the object at the head of the heap area is ensured (s12). Writing of any data to that region by another thread during copying is prevented, and then API#A mentioned above is issued (s13). As can be seen from FIGS. 14A and 14B, objects in the heap area are copied to free area successively, starting from the head, and thus packed (s14). When copying of one object ends, API#B mentioned above is issued (s15). Accordingly, whether there is a context switching in the period between the issuance of API#A and issuance of API#B can be confirmed by the return value of API#B indicating the state of the flag. If there is a context switching (YES in s16), the object which is copied this time is copied again to the region already secured (s16→s13→ . . . ). If there is not a context switch (NO in s16) similar process is performed for the next object (s16→s17→s18→ . . . ). In this manner, simultaneous compaction together with other threads is possible without locking the system.

The above described example related to compaction in GC in accordance with mark & sweep method. Compaction is also possible in GC in accordance with copy method. The process related to GC in accordance with copy method will be described with reference to FIGS. 20 and 21.

Figure 20:
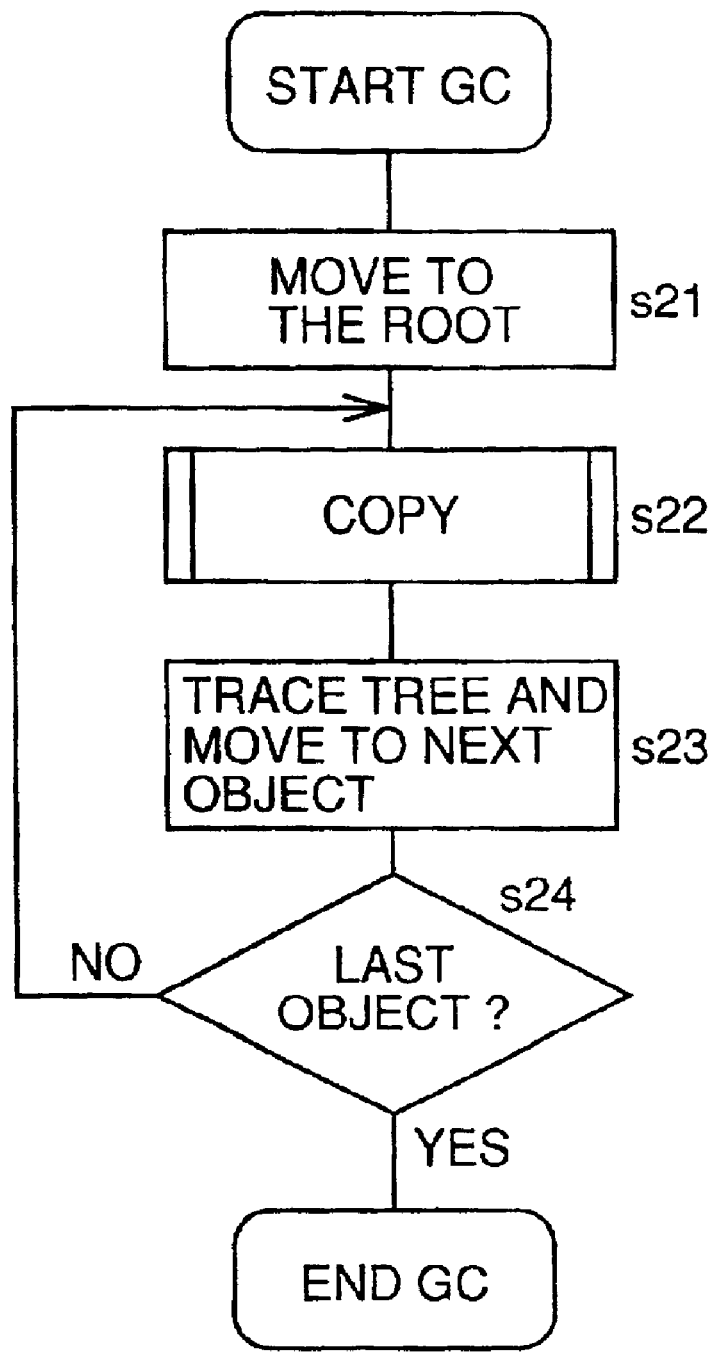
FIG. 20 is a flow chart showing a process of GC in accordance with copy method.

Referring to FIG. 20, GC in accordance with the copy method will be described. First, a pointer is moved to a root node of a data in the form of a tree structure representing reference relation among objects (s21). An object in a From area corresponding to the root node is copied to a To area (s22). (The heap area is divided into a From area and a To area, and those object in the From area which should be left are copied to the To area, so that only the objects without any garbage are re-configured in the To area. The present From area is used as the To area and the present To area is used as the From area the next time, and this operation is repeated alternately, in accordance with garbage collection in accordance with copy method.) Thereafter, tracing that tree, the pointer is moved to a next object having a reference relation (s23), and the object is copied to the To area (s24). This process is performed for every object which can be traced over the tree.

Figure 21:
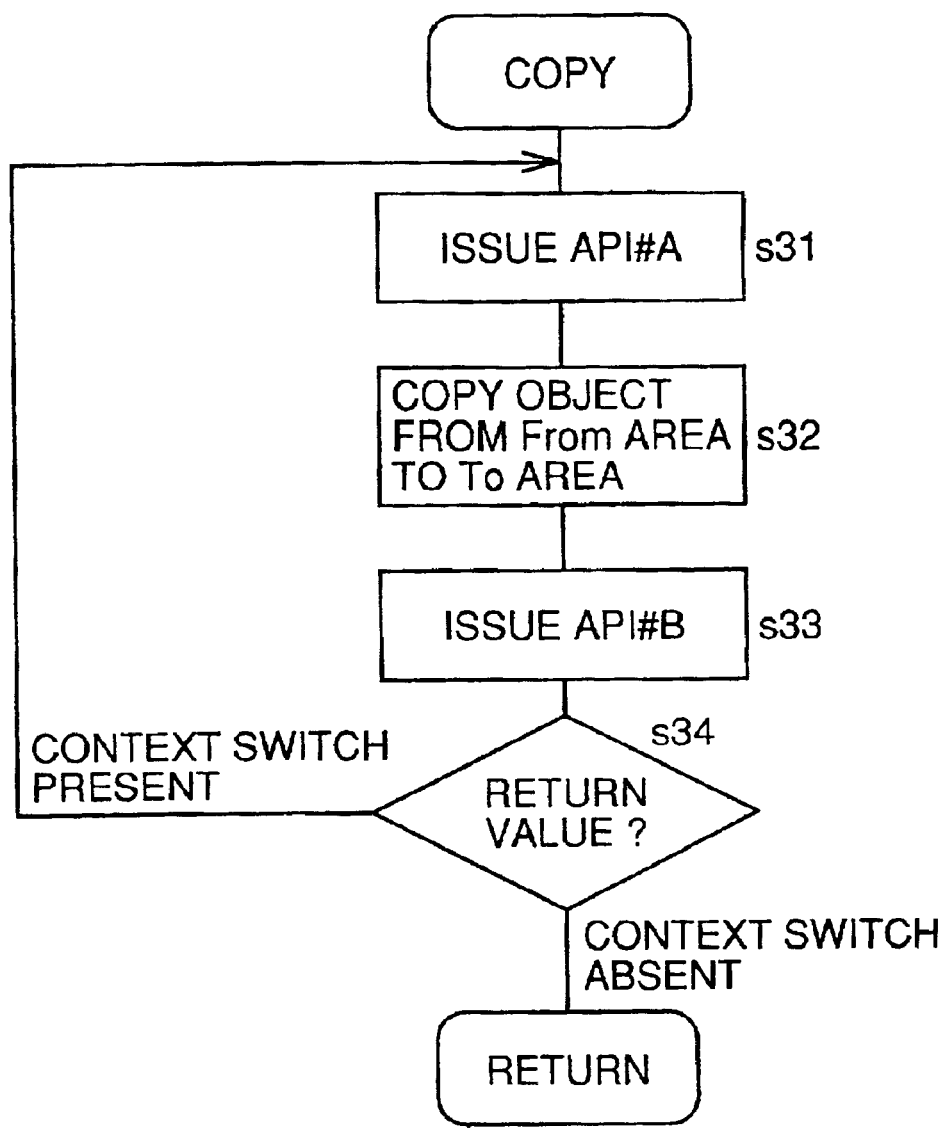
FIG. 21 is a flow chart showing a process of mutual exclusion in accordance with copy method GC.

The copy process (s22) of FIG. 20 will be described with reference to FIG. 21. First, an area for copying the object to be copied to a prescribed position in the To area is secured Any data write to that region by other thread during copying is prevented, and API#A mentioned above is issued (s31). The object is copied from the From area to the To area (s32). Thereafter, API#B mentioned above is issued (s33). Accordingly, whether there is a context switch in the period from the issuance of API#A to the issuance of API#B is known by the return value of API#B indicating the state of the flag. If there is a context switching, the object which is copied this time is again copied to the already secured area (s34→s31→ . . . ).

Figure 22:
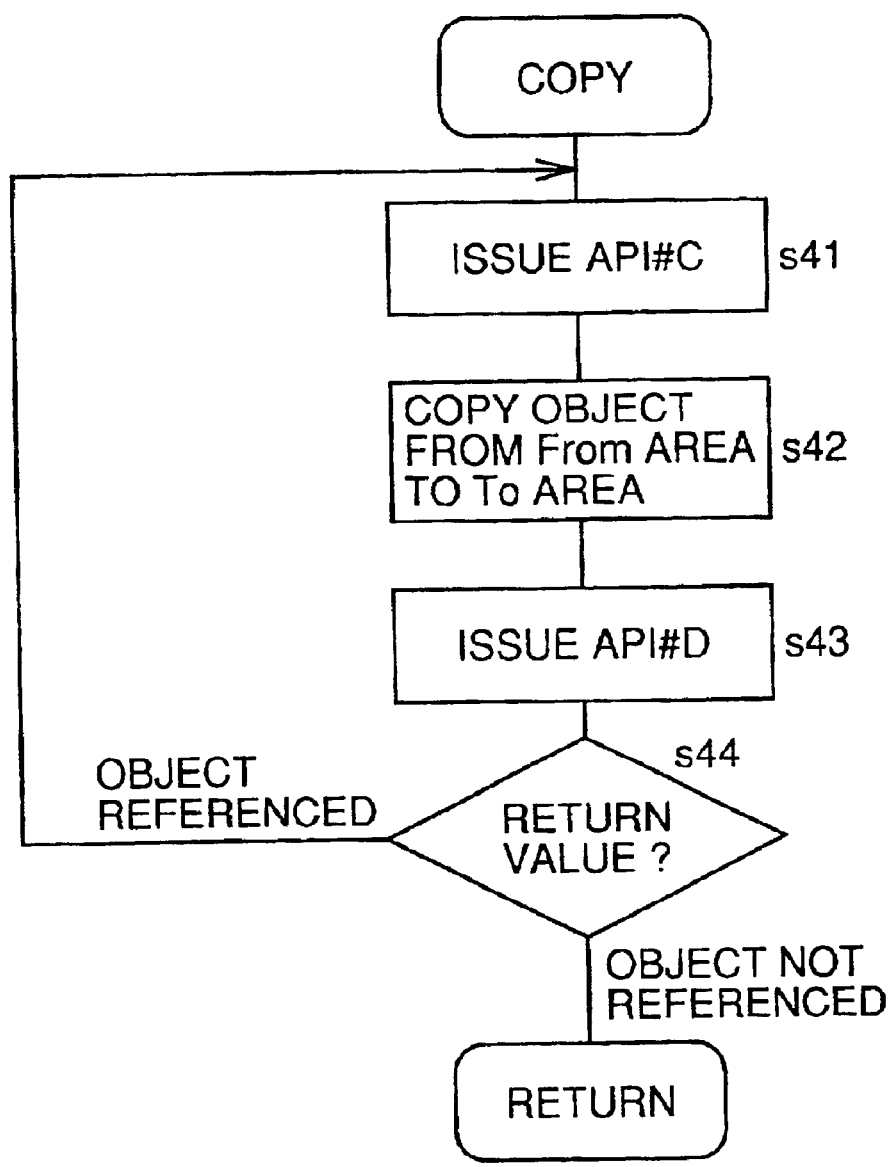
FIG. 22 is a flow chart showing a process of another mutual exclusion in accordance with copy method GC.
Figure 23A:
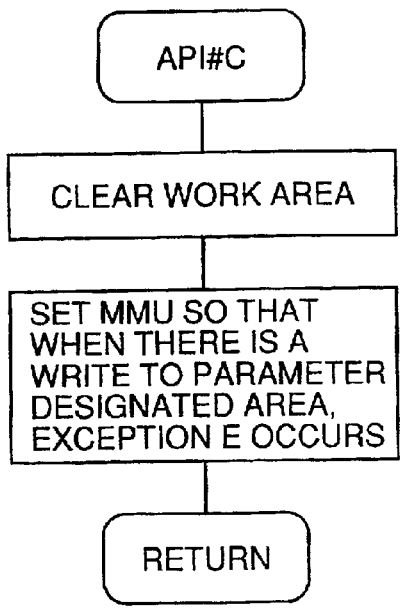
FIGS. 23A and 23B are flow charts showing a process related to mutual exclusion API of FIG. 22.
Figure 23B:
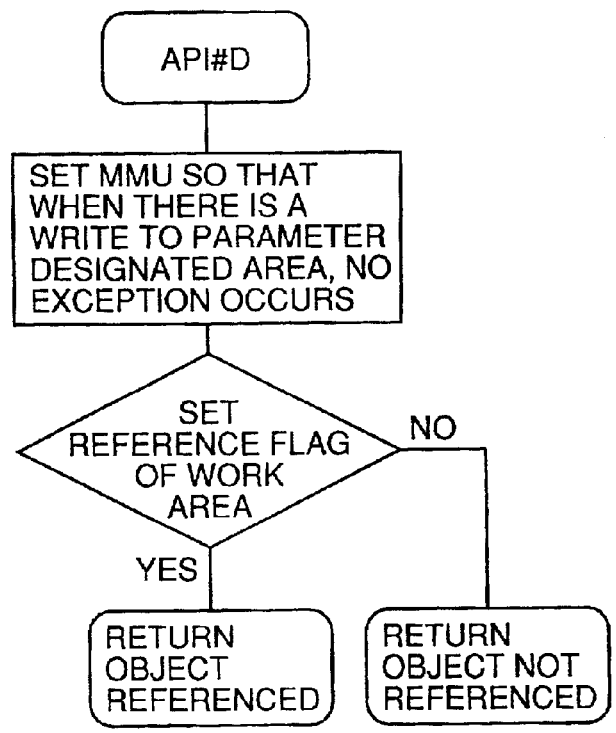
Figure 24:
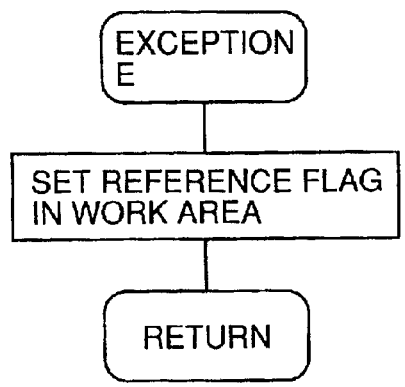
FIG. 24 is a flow chart showing a process related to mutual exclusion API of FIG. 22.

Referring to FIGS. 22 and 23A and 23B, a process for ensuring exclusive operation not by detecting presence/absence of a context switching but by detecting overwrite of the object to be copied before the copying operation will be described in the following.

Referring to FIG. 22, for copying, first, an area for copying an object to be copied at a prescribed position in the To area is secured. Any data write to that area by other thread during copying is prevented, and an API#C is issued (s41). The API represents an application program interface requesting detection of presence/absence of a write to a designated memory area. Thereafter, the object is copied from the From area to the To area (s42). Thereafter, API#D is issued (s43). API#D represents an application program interface returning as a return value, whether there is any data write to the designated memory area in the period from the call of API#C to the call of API#D. Therefore, by issuing API#C while designating a memory area of the object to be copied and by checking the return value of API#D, whether the object is referenced or not can be determined. If the object has been referenced, there is a possibility that the contents are changed. Therefore, copying of the object is performed again (s44→s41→ . . . ).

Referring to FIGS. 23A and 23B, the process by the kernel of API#C and API#D will be described. Referring to FIG. 23A, when API#C is issued (system call), the kernel clears a prescribed work area, and sets an MU (Memory Management Unit) such that an exception occurs when there is a write to the area designated by a parameter of API#C. Referring to FIG. 23B, when API#D is issued, the kernel cancels the above described setting of MMU, so that exception does not occur when there is a write to the area designated by the parameter. The state of the flag set in the work area is returned as a return value to the thread. The process contents of MMU when the exception occurs will be described with reference to FIG. 24. When an exception occurs, MMU sets a reference flag in the work area.

According to the first embodiment, whether there was a context switching or not amid a thread processing between an API call from a thread requesting start of detection of presence/absence of a context switching and an API call requesting termination of detection of presence/absence of a context switching can be determined within the thread. Therefore, a process can surely be executed exclusively, without using a computer resource as a lock mechanism.

Further, it is possible to mutual exclusion while maintaining high response, by invalidating a thread process and re-executing the process, for example, when there was a context switch in the period from issuance of an API to issuance of another API.

Further, it is possible to start GC without locking the system, and therefore real time operation is ensured.

Further, it is possible to start memory compaction without locking the system, and therefore real time operation is ensured.

A process can be executed exclusively, without using computer resource as a lock mechanism. More specifically, whether there was a write to a designated memory area by another thread amid processing of a thread A between an API call requesting start of detection of presence/absence of a data write to the designated memory area and an API call requesting termination of detection of presence/absence of a data write to the designated memory area, can be determined within the thread A. When there was not a data write, it means that the process for the designated memory area is done exclusively. If there was a data write, mutual exclusion is possible while maintaining high response by, for example, invalidating the process of thread A in the period mentioned above and by re-executing the process.

Second Embodiment

Figure 25A:
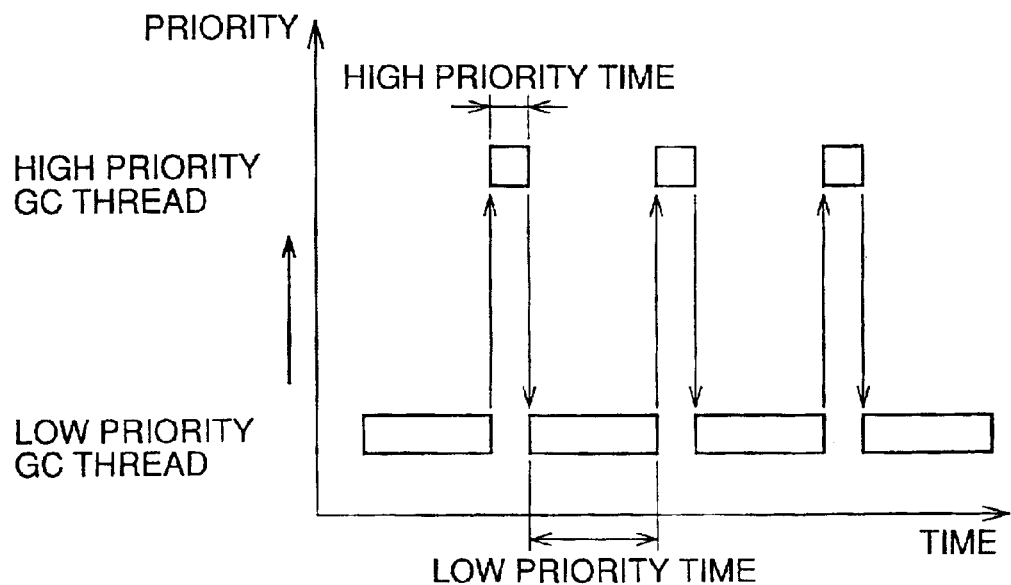
FIGS. 25A and 25B show automatic switching of priorities of GC threads.
Figure 25B:
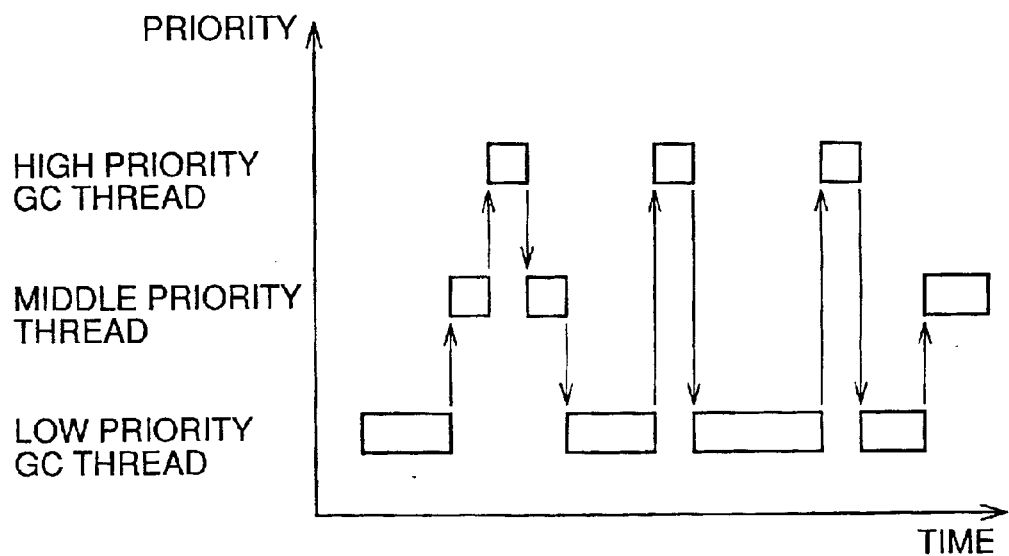

Referring to FIGS. 25A and 25B as well as 26A to 26E, an example in which priorities of GC threads capable of incremental garbage collection are automatically switched will be described.

Referring to FIG. 25A, an operation of setting priority of GC thread to be higher (for example, highest priority) in a high priority time and an operation of setting the priority to low (for example, lowest priority) in a low priority time are performed alternately.

Referring to FIG. 25B, an example when threads having middle priorities other than the GC thread are executed simultaneously will be described. When a GC thread has low priority and a thread having higher priority is set to a Ready state, then the context is switched to a GC thread having higher priority. When the priority of the GC thread attains higher while aforementioned thread is being executed, the context is switched to the GC thread. When the processing of the GC thread is interrupted, a thread other than the aforementioned GC thread is processed. In this manner, it is ensured that a GC thread is executed without fail in a constant period. Therefore, chronicle shortage of the free area can be prevented, and high performance is continuously maintained.

The process performed by the kernel related to switching of thread priorities will be described with reference to FIGS. 26A to 26E. There are a plurality of priority values, and setting of the values is possible by issuance of corresponding APIs. In this example, for setting two priorities of a GC thread, when an API for setting a high priority value is issued by a high priority setting thread, the kernel sets the value as the high priority value of the GC thread, as shown in FIG. 26A. Similarly, when an-API for setting a low priority value is issued, the kernel sets the value as a low priority value of the GC thread as shown in FIG. 26B. When an API for setting a high priority time of the GC thread is issued, the kernel sets the value as shown in FIG. 26C and, when an API for setting a low priority time is issued in the similar manner, the kernel sets the value as shown in FIG. 26D.

Referring to FIG. 26E, the process for the scheduler performed by the kernel will be described. Here, it is assumed that a GC thread is in a high priority queue to which resources are to be allocated, in the initial state. The scheduler takes out, from the high priority queue, data for identifying the GC thread, and inserts the data to a low priority queue (s51). The scheduler waits for an already set low priority time (s52), and thereafter takes out the data for identifying the GC thread from the low priority queue and inserts the data to the high priority queue (s53). The scheduler waits for the already set high priority time (s54). By repeating this process, priority of the GC thread is switched alternately by the operation of the scheduler, as shown in FIG. 16A. As to the thread other than the GC thread, scheduling in the similar manner as the prior art is performed in accordance with the queues corresponding to the priorities of the threads, and context switching occurs as shown in FIG. 16B.

Figure 27A:
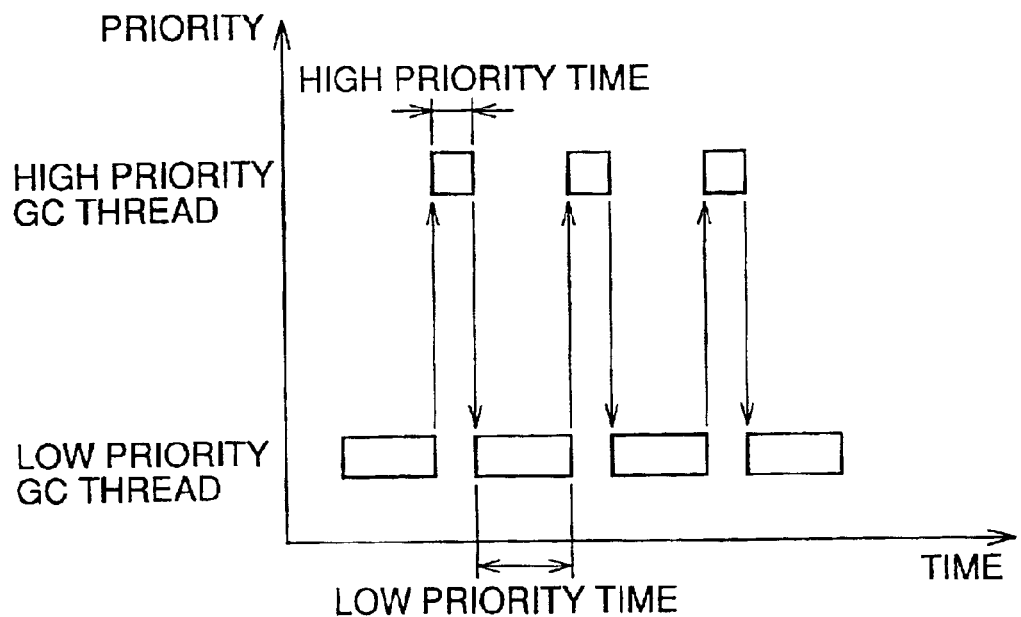
FIGS. 27A and 27B show an example of changing of high priority time of GC threads.
Figure 27B:
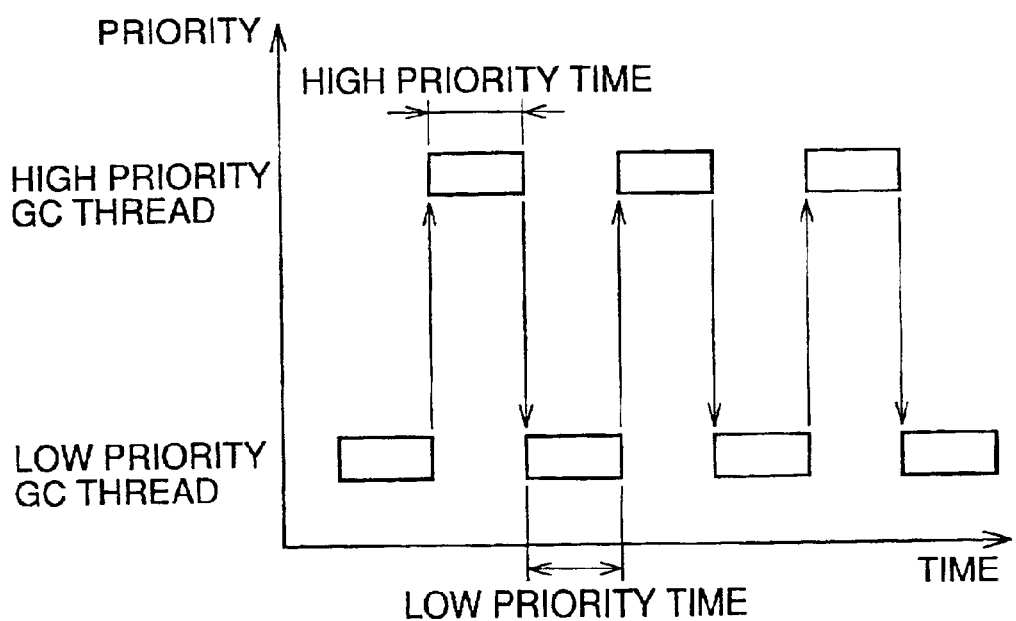

FIGS. 27A and 27B show an example in which setting of the high priority time of the GC thread described above is made possible by an API. Referring to FIG. 26C again, the process by the kernel in response to the API call will be described. When there is the API issuance (system call), the kernel sets (registers) the above described high priority time in accordance with the parameter of the API.

Figure 28:
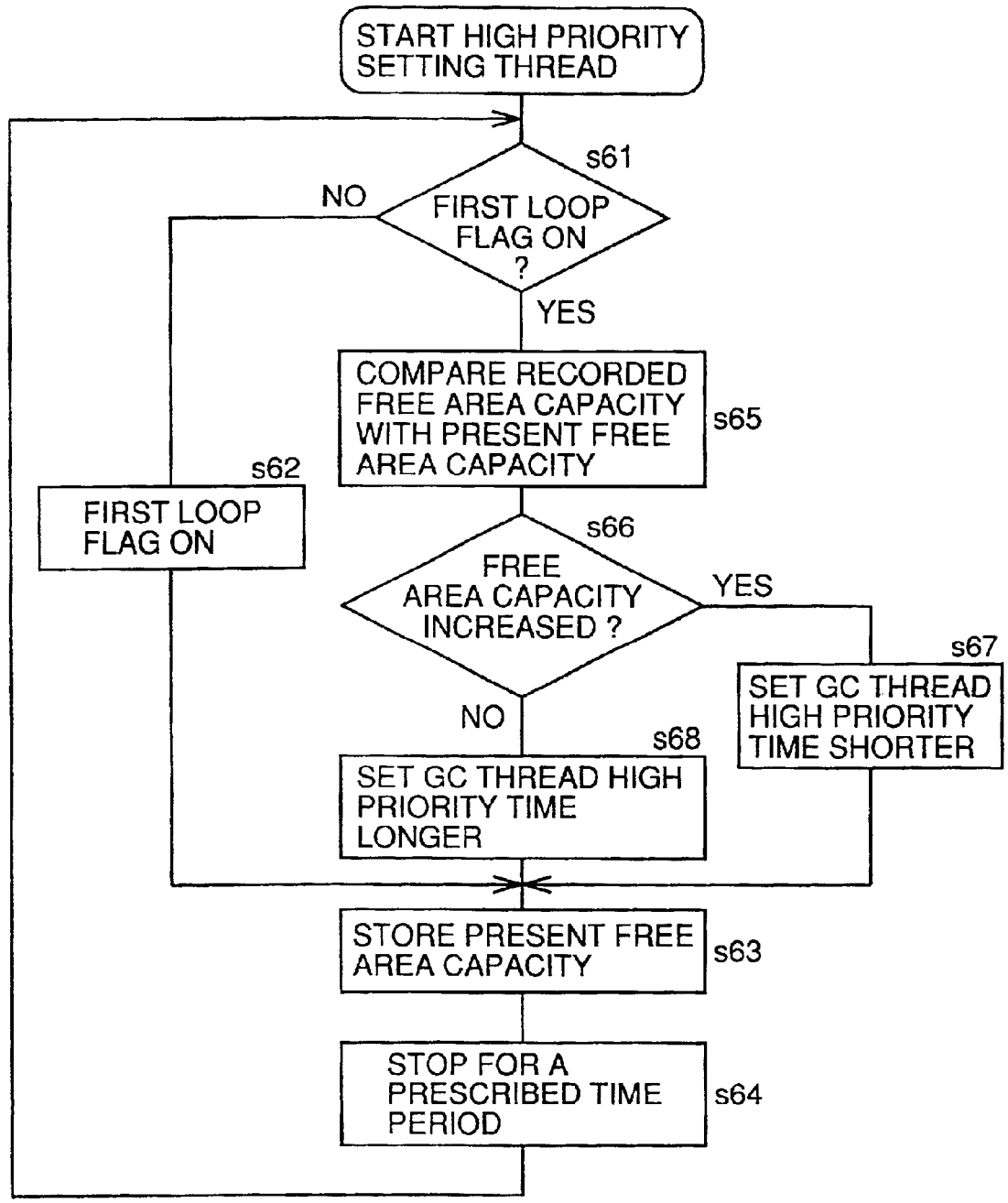
FIG. 28 is a flow chart related to automatic changing of high priority time of the GC thread.

Referring to FIG. 28, an example of a program using the API allowing setting of the high priority time of the GC thread will be described. First, a state of a flag indicating whether it is a first loop or not is confirmed (s61). As the flag is OFF initially, the flag is turned ON (s62), free area at present is examined and recorded (s63). The high priority time and the low priority time of the GC are initially at predetermined default values. There is a prescribed stop period (s64) imposed by the scheduler and, thereafter, sizes of the capacity of a free area examined last time and the capacity of the present free area are compared with each other (s65). If the capacity of the free area has been increased (YES in s66), the high priority time of the GC thread is made shorter (s67), and if the capacity of the free area has been decreased (NO in s66), the high priority time of the GC thread is made longer (s68). The above described process is repeated. In this manner, the GC priority is dynamically adjusted automatically.

Figure 29A:
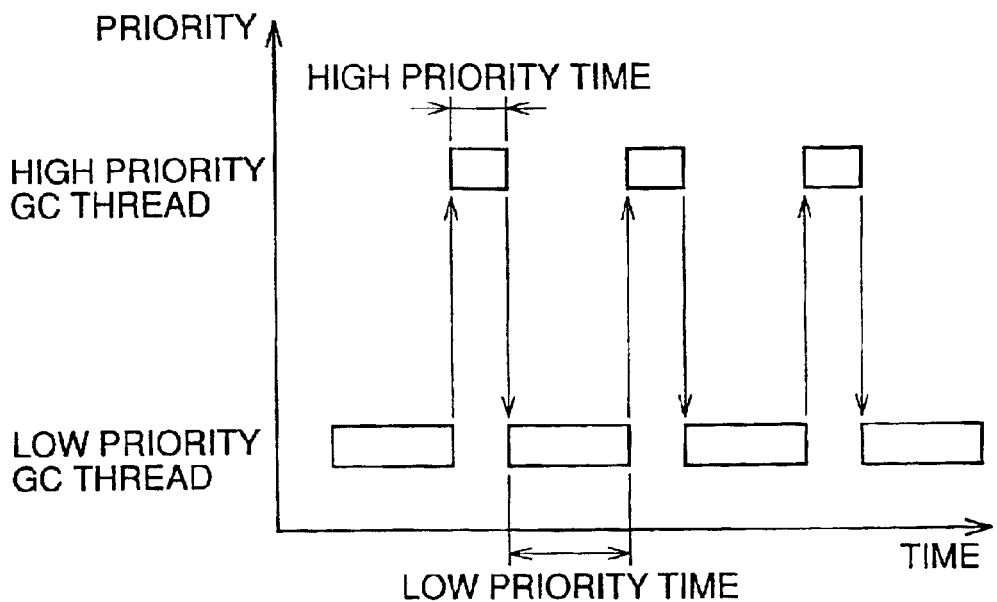
FIGS. 29A and 29B show examples of changing period of switching between high-low priority times of GC threads.
Figure 29B:
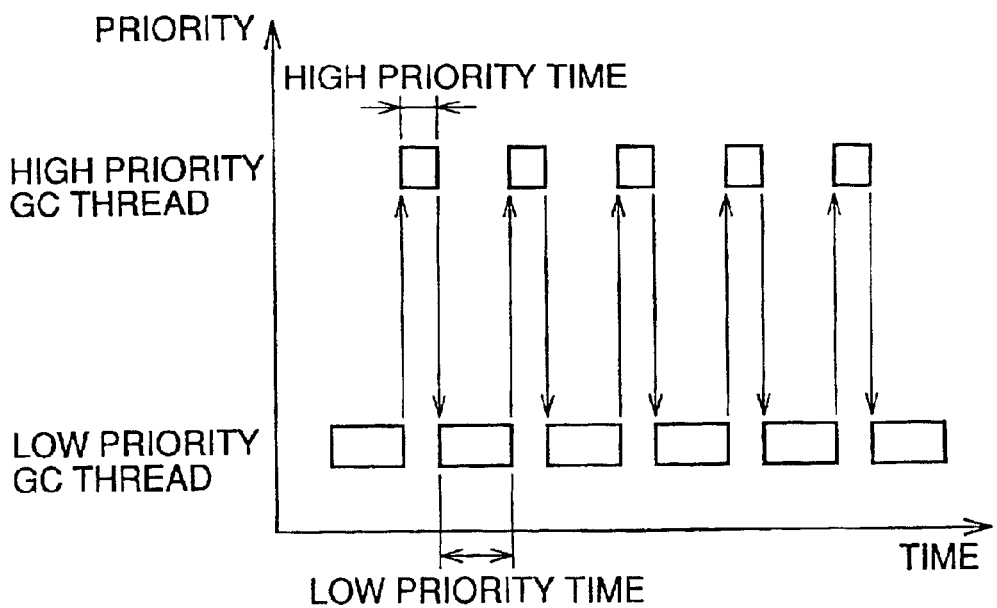

FIGS. 29A and 29B show an example in which setting of a period of the high priority time and the low priority time of the GC thread is made possible. FIG. 29A represents a longer period while FIG. 29B represents a shorter period.

Figure 30:
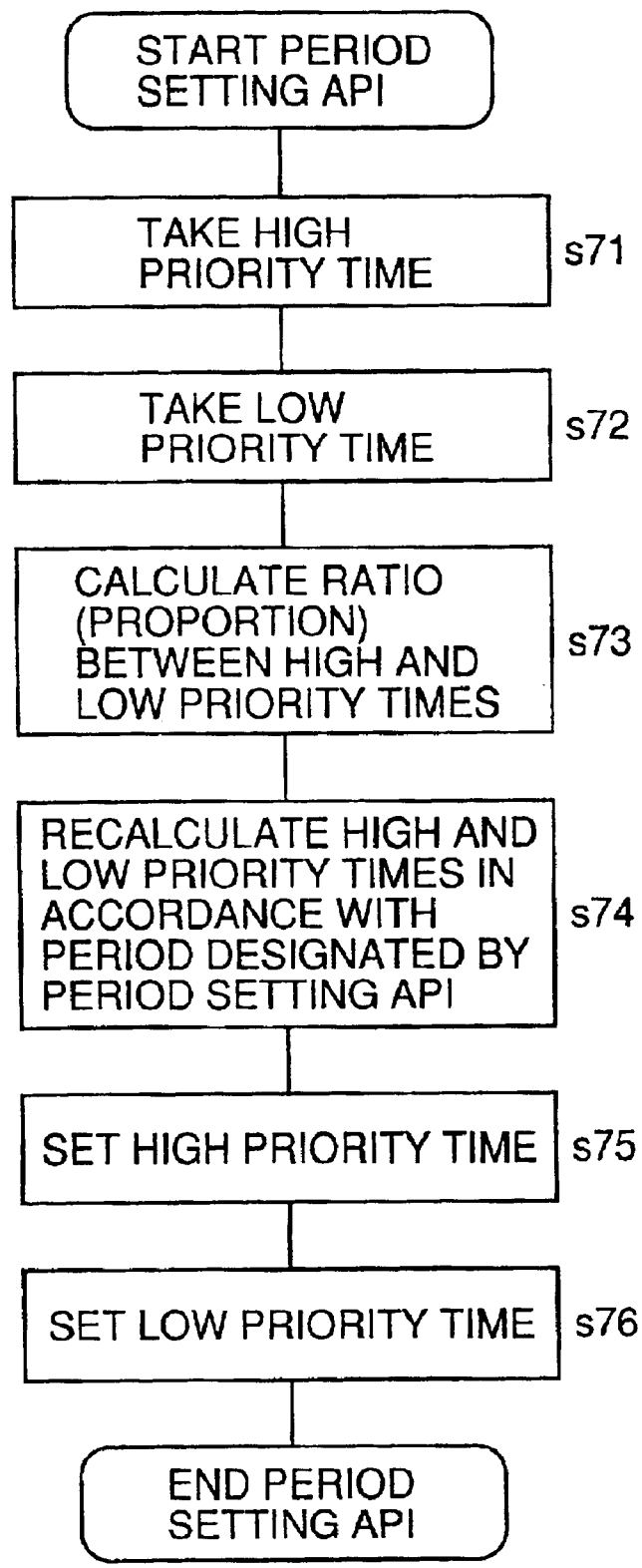
FIG. 30 is a flow chart for changing a period of switching of high-low priority times of GC threads.

A process by the kernel in response to a call of a period setting API allowing setting of period will be described with reference to FIG. 30. When the period setting API is issued, the kernel reads the values of presently set high priority time and low priority time, and calculates the ratio (proportion) (s71→s72→s73). Thereafter, the kernel calculates the high and low priority times in accordance with the value of a period designated by a parameter of the period setting API (s74). Then, the kernel sets and updates the high priority time and the low priority time (s75→s76).

In an application program continuously requiring CPU resource such as processing of continuous pulses, for example, the period setting API is issued so that the period of the GC thread is made short. In an application program utilizing the CPU resource intermittently as in the case of a common application program, for example, the period setting API is issued so that the period is made long. When two or more period setting APIs are issued, the period is set in accordance with the period setting API for the longest period.

According to the second embodiment, by alternately switching priority of the GC thread, an application in another thread is executed when the priority of GC thread is low, and when there is no other application to be executed, the GC thread is executed automatically. Thus, free memory area is enlarged automatically. When the priority of the GC thread is high, other threads are not executed. In this state, however, chronic shortage of free memory area is avoided, which chronic shortage is caused by other thread preventing continuous execution of the CC thread when the GC thread has low priority. Therefore, high performance is maintained constantly.

Further, it becomes possible for an API calling side to shorten the time when the priority is high, if system response is of high importance, and to make the time longer when the priority is high if throughput of the overall system is of higher importance. Therefore, system performance can be changed as needed.

Further, it is possible to reduce overhead of a context switching, for example, by setting a period shorter for an application program continuously requiring CPU resource such as in the case of processing continuous pulses, and by setting a period longer for an application program which utilizes the CPU resource intermittently, as in the case of a common application program.

Further, the time when the GC has high priority is dynamically adjusted, and therefore shortage of a free memory area can be avoided in any application program and, in addition, in a system or an application program which can secure sufficient free memory area, GC can be minimized.

Third Embodiment

Figure 31:
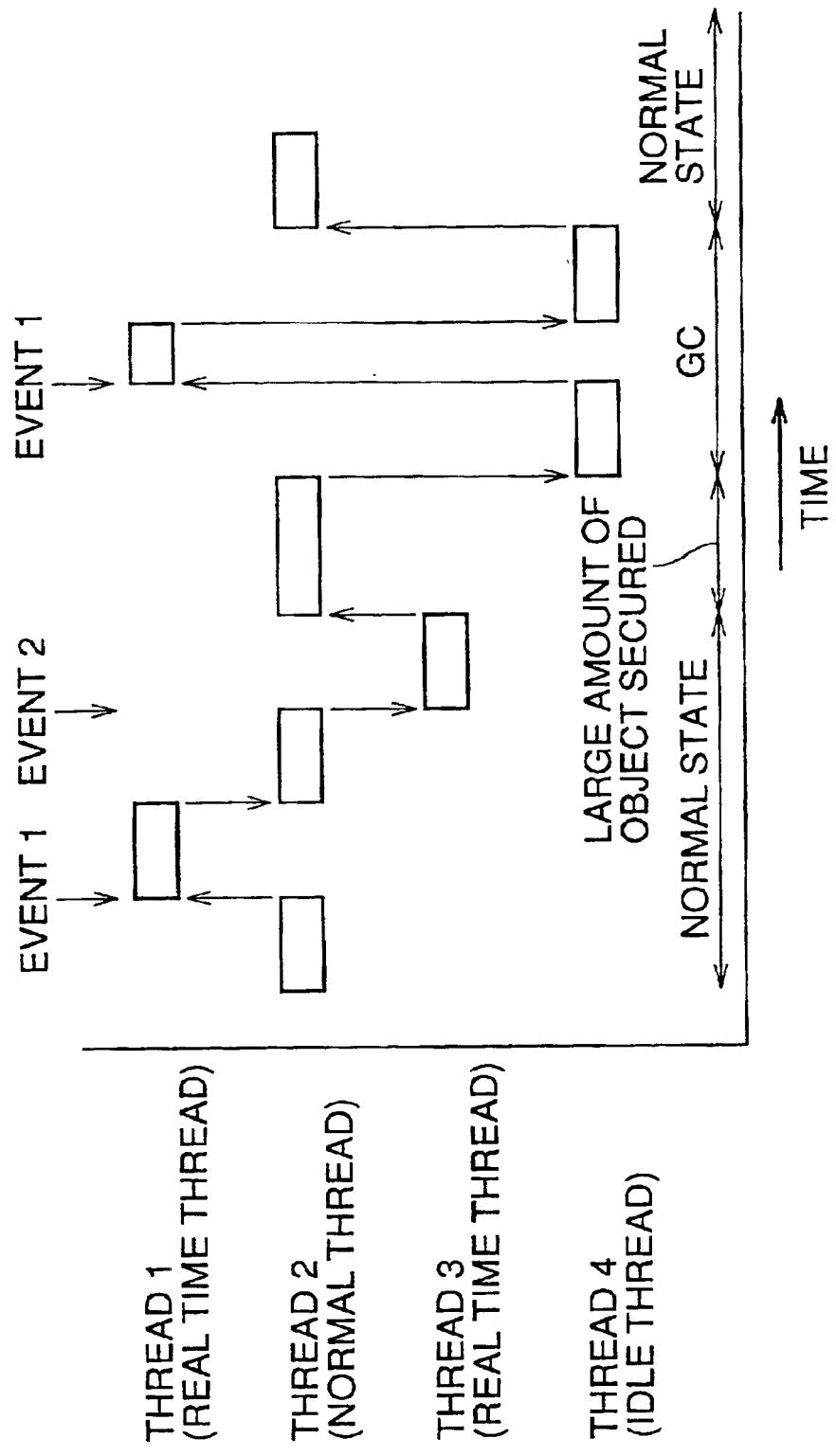
FIG. 31 is an illustration of an irregular GC processing.
Figure 32:
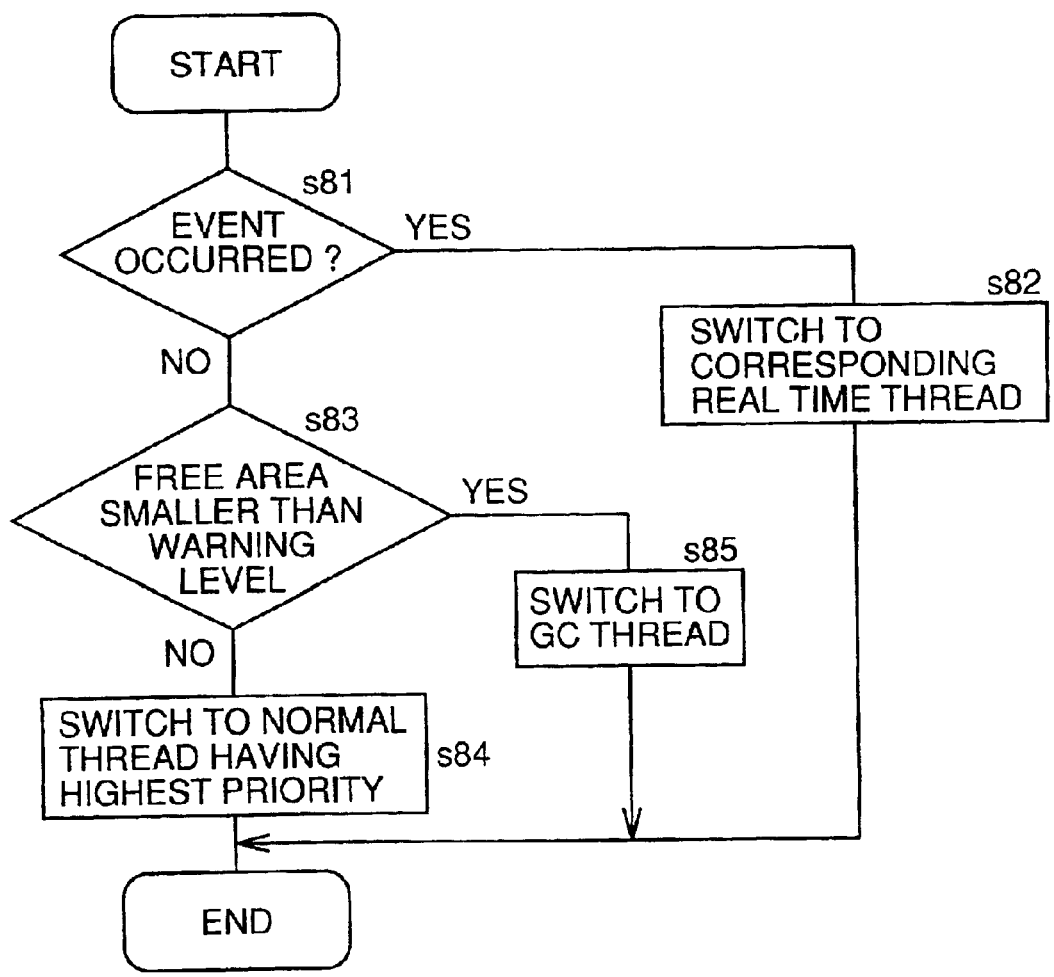
FIG. 32 is a flow chart corresponding to FIGS. 29A and 29B.

FIGS. 31 and 32 show examples in which a GC thread is executed at a necessary time point while real time response is ensured. In the example shown in FIG. 31, thread 1 and thread 3 are threads requiring real time response, and thread 2 is a thread not requiring real time response (normal thread). Thread 4 is a GC thread. In a normal state where there is much capacity of memory free area, when event 1 occurs while thread 2 is being executed, the process is switched to thread 1, and when processing of thread 1 derived from the processing of event 1 ends, the process returns to thread 2. Similarly, when event 2 occurs, the process is switched to thread 3. When the capacity of the free area decreases to a predetermined warning level by the processing of thread 2, the processing of thread 2 is stopped, and GC thread of threads 4 is executed. When the free area is secured by this process, the process returns to thread 2. When event 1 occurs during the GC thread, the process is switched to thread 1, even in the middle of GC. The thread requiring real time response generally creates a small amount of objects, and therefore rough prediction is possible. Therefore, by setting the warning level accordingly, it is possible to avoid failure of a process requiring real time response such as thread 1 or thread 3 as the free area is significantly decreased by the process of thread 2.

Referring to FIG. 32, the process steps performed by scheduler processing the context switching will be described. The scheduler detects presence/absence of an occurrence of an event (s81). When there is an event occurred (YES in s81), the scheduler switches the context to a corresponding real time thread (s82). When there is no event (NO in s81) and the capacity of the free area is larger than the warning level (NO in s83), the scheduler switches the context to one of the normal threads that has highest priority (in the example shown in FIG. 31, thread 2) (s83→s84). If the capacity of the free area is reduced to be smaller than the warning level (YES in s83), the scheduler switches the context to the GC thread (s85).

According to the third embodiment, when a thread which does not require real time operation creates an object and the amount of free memory area is decreased near to the amount of object created by a thread which requires real time operation, for example, scheduling is done at that time point and GC thread is executed. Therefore, flee area is ensured immediately, and an environment allowing execution of the thread requiring real time operation is maintained constantly.

Fourth Embodiment

Figure 33:
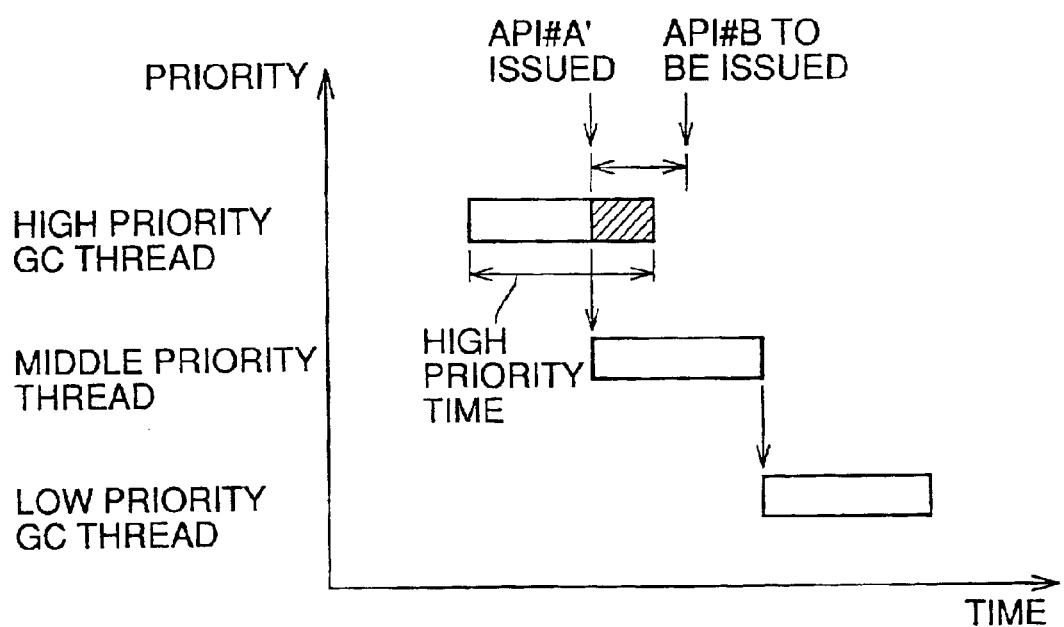
FIG. 33 shows an example of forced change of the priorities of GC threads in accordance with mutual exclusion API.

FIG. 33 shows an example of a forced context switching by an API requiring detection of a context switching. In the example described above, whether there is a context switching in the period from issuance of API#A to issuance of API#B is determined. In the example shown in FIG. 33, predicting occurrence of a context switching while the API for mutual exclusion is being issued, wasteful processing is eliminated, while GC priority is switched alternately to high and low. More specifically, when API#A' is issued while a high priority GC thread is being executed, API#A' determines whether the necessary process can be completed before the end of the high priority time and if it is determined not possible, priority of the GC thread is set lower, as it is inevitable to restart the process again. In the example shown in FIG. 33, as the priority of the GC thread is made low, the context is switched to a thread of middle priority other than the GC thread. This avoids wasteful processing.

Figure 34:
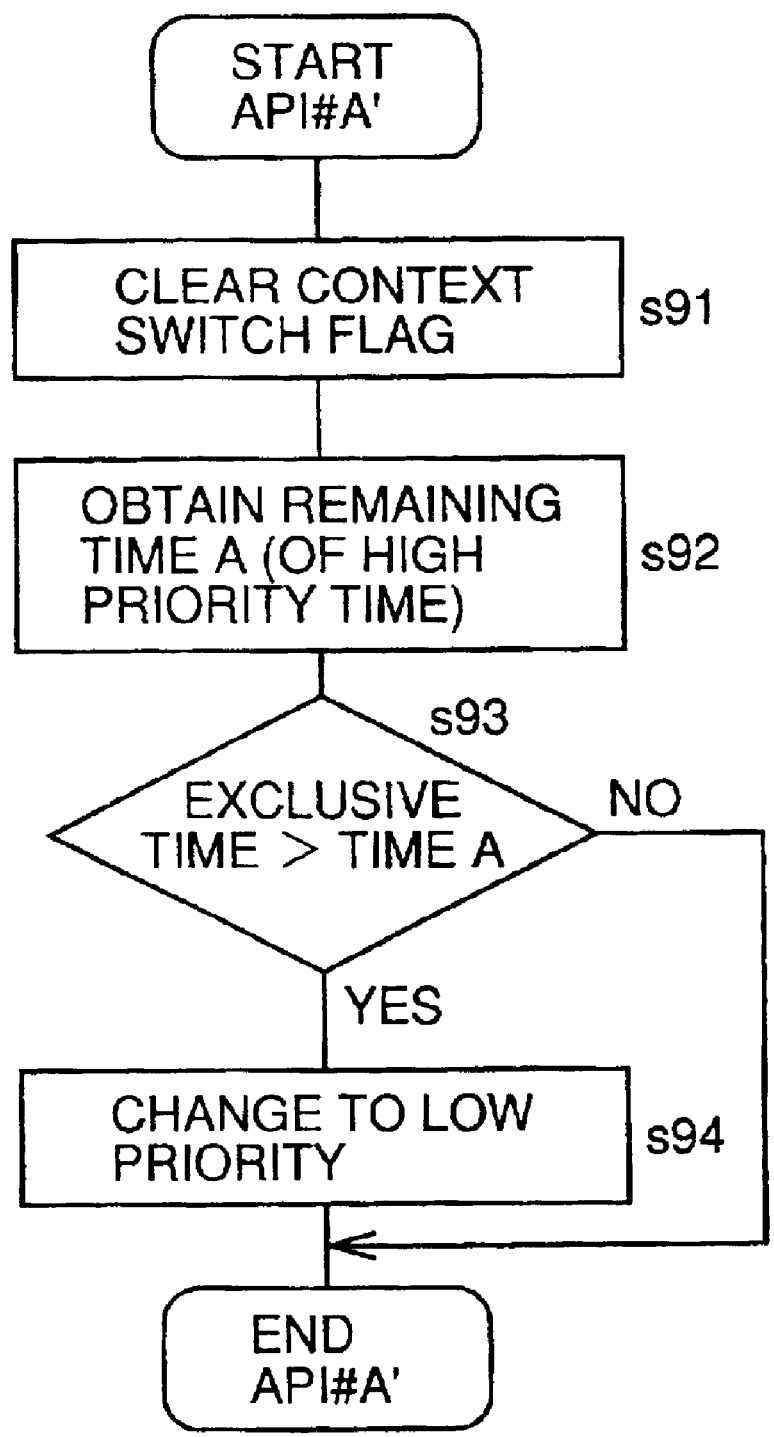
FIG. 34 is a flow chart for forced change of priorities of GC threads in accordance with mutual exclusion API.

Referring to FIG. 34, the process performed by the kernel in response to the call of API#A' will be described. Upon API#A' call, the kernel clears the context switch flag (s91), and obtains remaining time of the high priority time of the GC thread (s92). The kernel compares an exclusive time (the time from the issuance of API#A' by the kernel to the issuance of API#B), which is a parameter of API#A' with the aforementioned remaining time (s93). If the remaining time is shorter than the exclusive time (YES in s93), the kernel forcefully lowers the priority of the GC thread (s94). The contents of processing in response to API#B call and the contents of processing of the context switch are similar to those shown in FIGS. 17A, 17B and 18.

According to the fourth embodiment, priority of a thread is changed between high and low and when a time necessary for the thread priority to attain from high to low is shorter than necessary processing time, the processing is not executed. Therefore, corresponding power of the CPU is not wasted, and the overall processing can be done efficiently.

Fifth Embodiment

Figure 35:
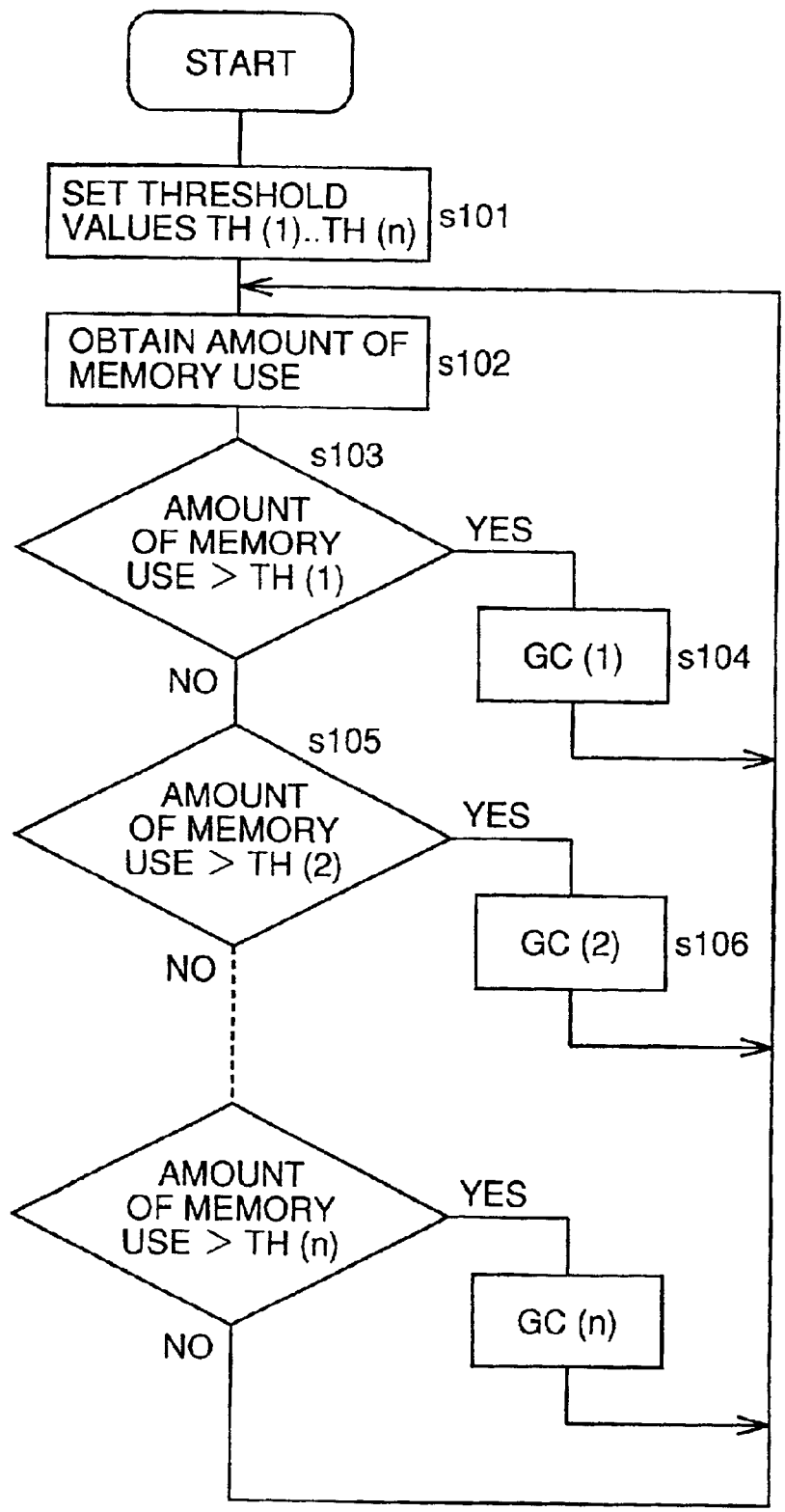
FIG. 35 is a flow chart showing a process of switching GC algorithm.

Referring to FIG. 35, the process for switching GC algorithm in accordance with the amount of use of the memory (heap area) will be described. First, values of the amount of use of the memory and threshold values indicating what algorithm is to be used for GC accordingly are set (s101), and the amount of use of the memory is obtained (s102). The amount of use of the memory represents the total value of memory sizes of objects created in the heap area. When the amount of use of the memory exceeds a threshold value TH (1), GC is performed in accordance with the procedure of GC algorithm (1) (s103→s104). When the amount of use of the memory exceeds a threshold value TH (2), GC is performed in accordance with the procedure of GC algorithm (2) (s105→s106). Similar operation is repeated thereafter. Here, the threshold value TH (1) is smaller than the threshold value TH (2), and the process in which high and low priorities of GC thread alternately repeated shown in FIGS. 25A and 25B is performed as GC algorithm (1). An irregular GC shown in FIG. 31 is executed as the GC algorithm when the threshold value is high. Here, GC itself is performed in accordance with mark & sweep method. Generally, load to the CPU is light when the process is in accordance with GC algorithm (1), and therefore GC is performed in most cases by this process. When a large amount of memory is used in a short period by a normal thread, however, GC is performed in focused manner by the process shown in FIG. 31. Accordingly, while free area is ensured constantly, real time response is maintained. By switching GC procedure in accordance with the amount of free area or the amount of used area, efficient GC is always possible.

Sixth Embodiment

Figure 38:
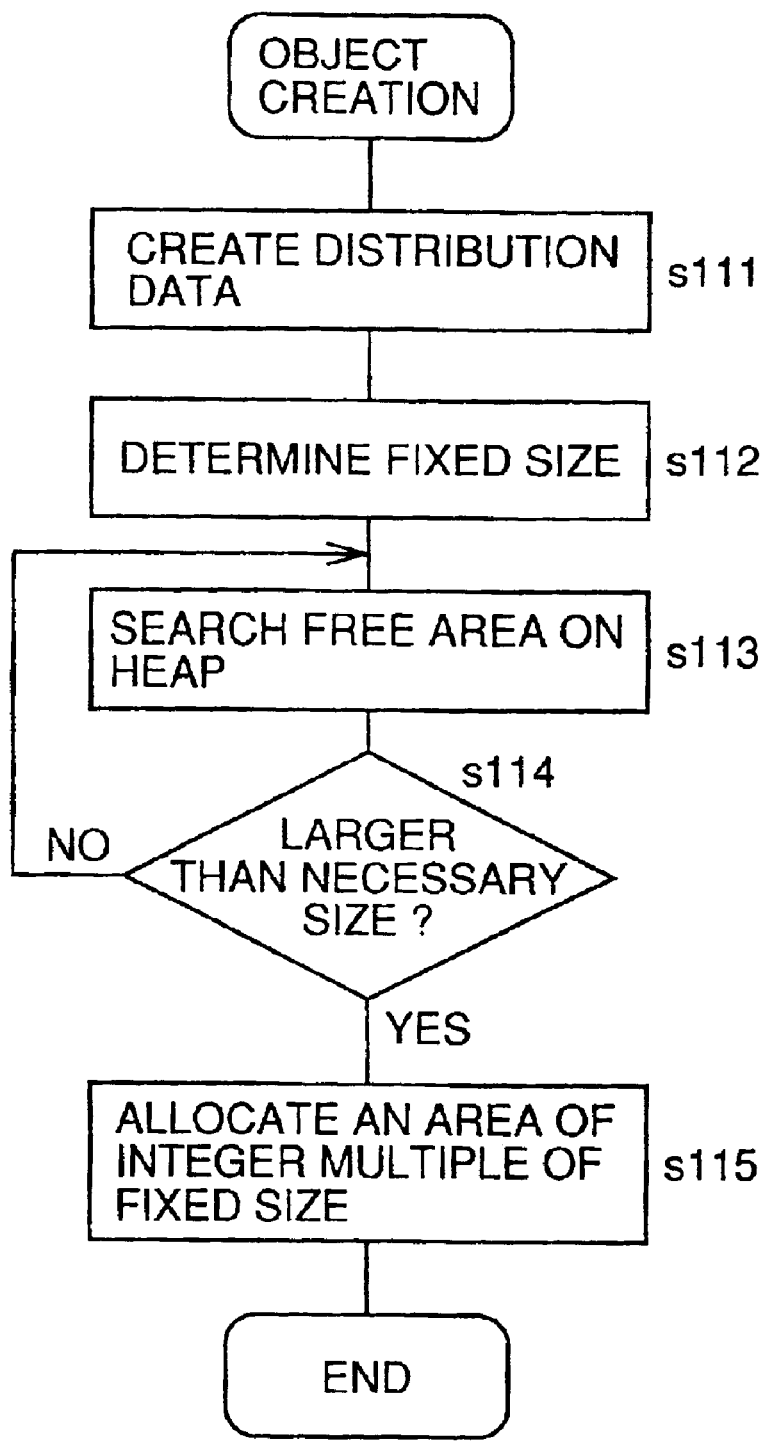
FIG. 38 is a flow chart showing a process of object creation.

Referring to FIGS. 36 and 38, a process for determining a size to be allocated to a new object for heap area when the object is created will be described. Generally, distribution of object sizes created by executing a program approximates a normal distribution. The central value thereof is generally between 32 to 64 bytes. Accordingly, a size which is larger than the central value and of an integer multiple of 2's power byte is determined to be a size to be allocated to the objects. Conventionally, the area for the size of the object to be created is allocated arbitrarily as shown in FIG. 37B. Accordingly, when the object is deleted, fragmentation of different sizes occurs. According to the present invention, the size of a newly created object is an integer multiple of the aforementioned fixed value. Therefore, loaded to the memory (s126), and the program module is executed. More specifically, the distribution data registered in the system is taken, and a size larger than the central value of distribution and of 2's power byte for example, is determined as the fixed size, and the value is registered in the system (s127→s128). Thereafter, the program module for determining the fixed size is unloaded (s129).

In this manner, after the object size distribution is once detected and the fixed size is determined, the program modules therefor are unloaded from the memory, so that the memory area and CPU power are not wasted.

According to the sixth embodiment, it becomes possible for many is objects to re-use a memory area which was used. Therefore, efficiency in use of the memory can be improved without compaction. Further, CPU power for compaction is unnecessary, and therefore a system with high response can be configured with a small scale CPU.

Seventh Embodiment

Figure 40A:
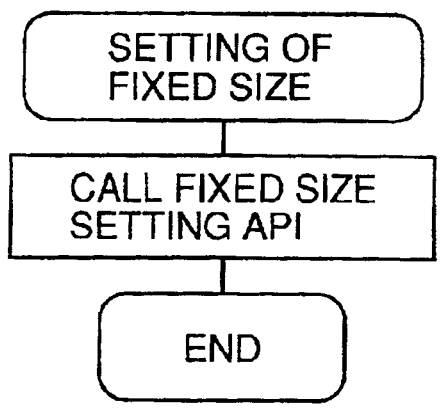
FIGS. 40A to 40C are flow charts showing a process related to setting of the fixed size and object creation.
Figure 40B:
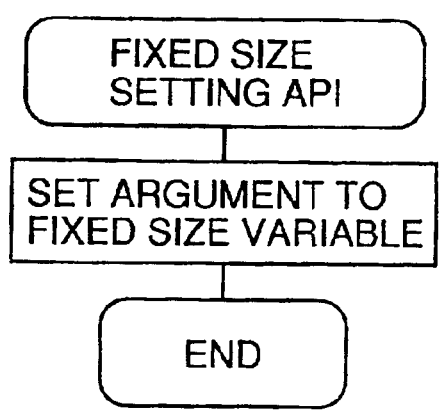
Figure 40C:
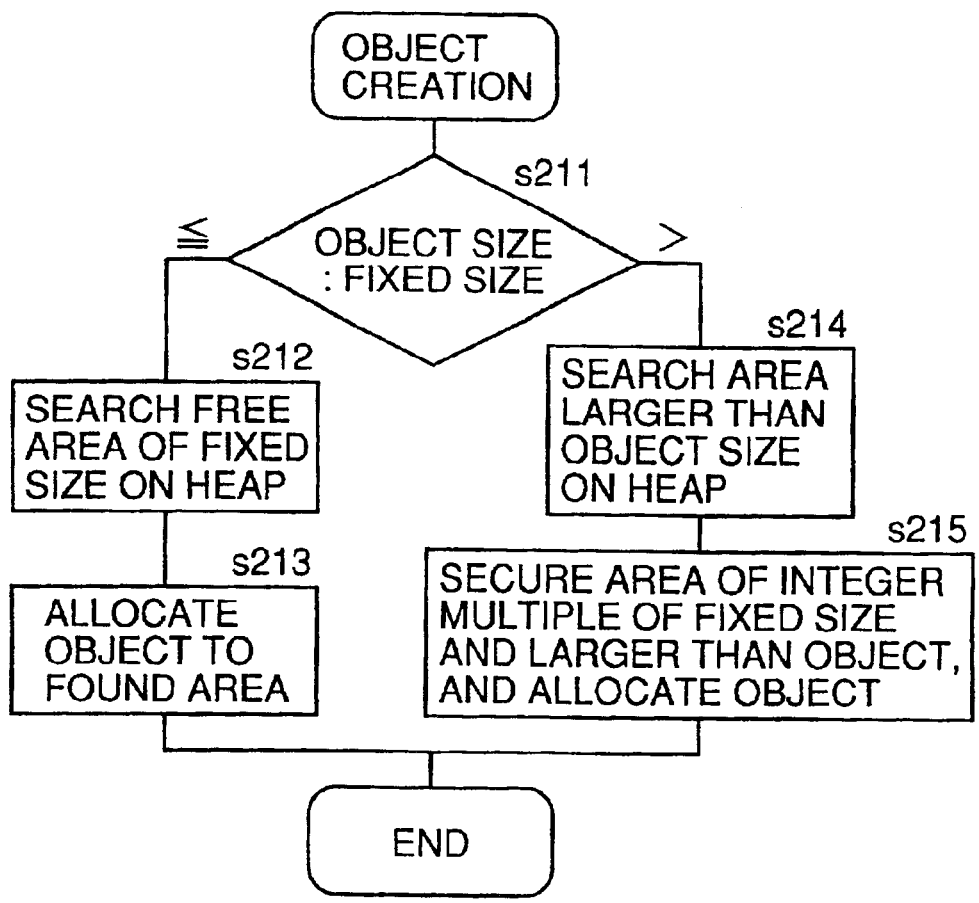

FIGS. 40A to 40C represent an example in which the fixed size is set by an API. Referring to FIG. 40A, in the fixed size setting process, a fixed size setting API is called, using the fixed size as an argument. Referring to FIG. 40B, in the called API, the argument is registered as the fixed size. Referring to FIG. 40C, when an object is created, the object size is compared with the fixed size (s211). If the object size is not larger than the fixed size, a free area of the fixed size on the heap is searched, and the found area is allocated to the object (s212→s213). If the object size exceeds the fixed size, a free area larger than the object size of the heap is searched, and the found area is allocated to the object (s214→s215).

According to the seventh embodiment, it becomes possible to measure distribution of object sizes allocated in the memory heap area in different apparatuses, systems and algorithms, and to register a fixed size which is a base of the determined size to be allocated to an object. Therefore, efficiency in use of the memory and CPU power can be improved.

Eighth Embodiment

Figure 41A:
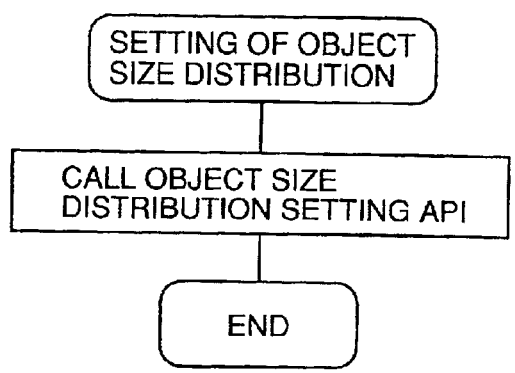
FIGS. 41A and 41B are flow charts showing the process related to setting of object size distribution.
Figure 41B:
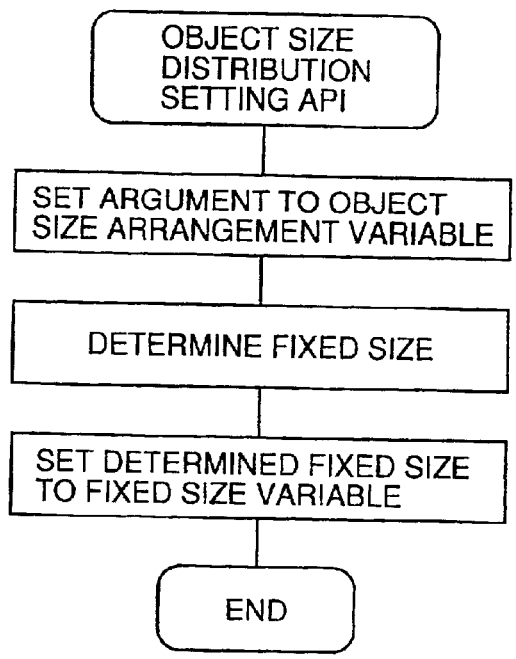

FIGS. 41A and 41B represent another example for setting the fixed size by an API. Referring to FIG. 41A, first, the distribution data of object convenience in reusing the memory area is improved, and therefore, the overall efficiency of memory use is improved. Further, when the upper limit of the size of the object to be created and the upper limit of the number of objects are known, compaction is unnecessary.

Referring to FIG. 38, the process of object creation will be described. First, distribution data of frequency of generation of the object sizes created so far is obtained (s111). When distribution data has already been obtained by the last process, the data is updated. Thereafter, within a free memory area to be allocated this time, an area larger than the size of the object to be created is searched and the object is allocated to a memory area which is an integer multiple of the fixed size mentioned above (s112→s113→s114→s115). The aforementioned 2's power byte is a system constant. It is not necessary to use this value as the fixed size, and an arbitrary value may be used. If the fixed size is determined too large, it will be the case that small object is often allocated to a larger area. If the fixed size is determined to be too small, by contrast, it would be the case that many area can not be reused for object creation. When the fixed size is to be determined based on the distribution data, the size may be determined to optimize the efficiency of memory use. Even if it may not be an optimal value, when a 2's power is used, address determination is facilitated.

Figure 39:
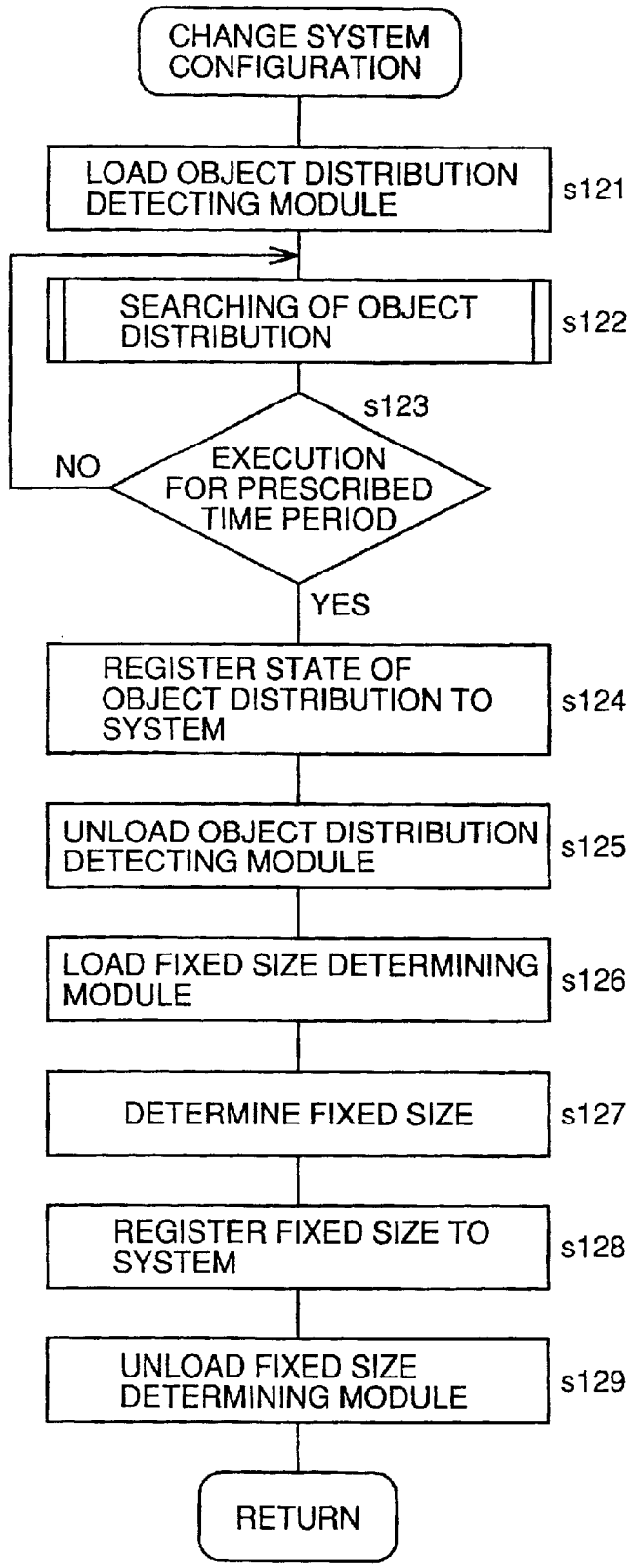
FIG. 39 is a flow chart related to detection of object size distribution and determination of fixed size.

Referring to FIG. 39, the processes of a program module for obtaining the distribution data of frequency of object size generation and program module for determining size to be allocated to the object will be described. First, a program module for obtaining distribution data of frequency of object size generation is loaded (s121), and the program module is activated. More specifically, for a prescribed time period (for example, until application program is activated and terminated ten times, or for 24 hours), sizes of created objects are counted size by size, and distribution data is obtained (s122→s123). Thereafter, the distribution data is registered in the system (s124), and the program module for obtaining the distribution data of frequency of the object size generation is unloaded from the memory (s125). Thereafter, a program module for determining the fixed size is sizes is set by calling an object size distribution setting API. The distribution data is measured by executing a prescribed application for prescribed time period in advance. In response to the call, the object size distribution setting API sets an argument to an object size arrangement variable. Thereafter, the object size distribution setting API determines as the fixed size, a size larger than the central value and of 2's power byte and sets the determined size to a fixed size variable.

According to the eighth embodiment, it becomes possible to measure distribution of object sizes allocated in the memory heap area in different apparatuses, systems and algorithms, and to register a fixed size which is a base of the determined size to be allocated to an object. Therefore, efficiency in use of the memory and CPU power can be improved.

Ninth Embodiment

Figure 42:
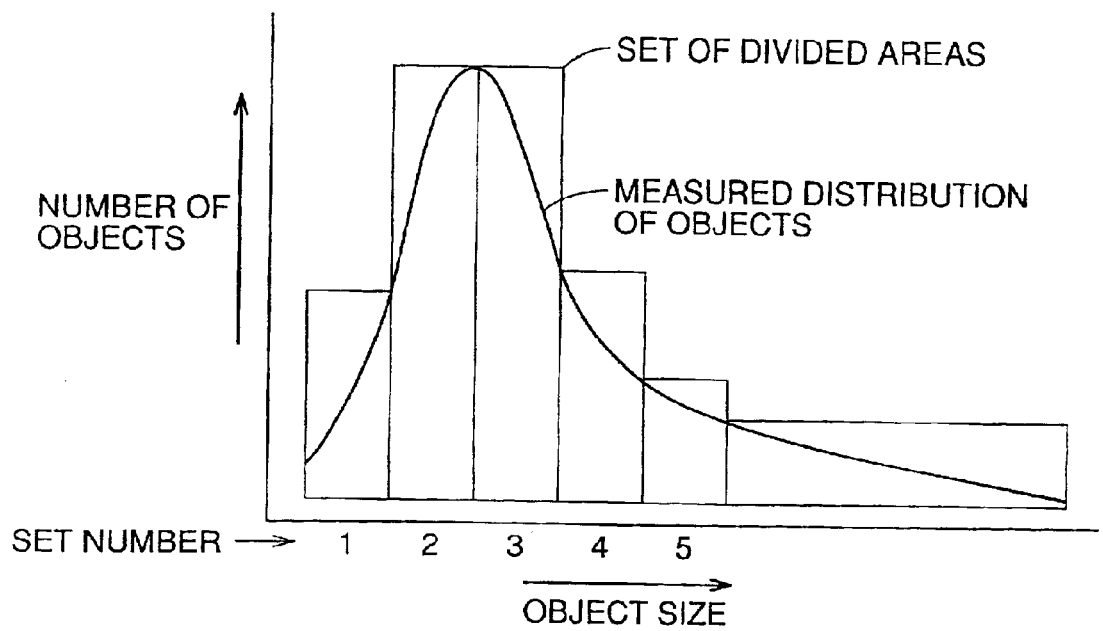
FIG. 42 show examples of object size distribution and size of division.

FIGS. 42, 43A, 43B, 44A and 44B represent examples in which several sizes are determined in advance as sizes to be allocated to the objects. FIG. 42 represents object size distribution and sets of divided areas measured by executing a prescribed application for a prescribed time period in advance. When the heap area is to be divided in advance, the actual object size distribution is measured, and the size and the number of division are determined to approximate the distribution. If the heap area is 2 MB, for example, the size of division designating variables are set in the following manner.

| Set No. n | Byte k | Number m |
|---|---|---|
| 1 | 64 | 5000 |
| 2 | 256 | 10000 |
| 3 | 1 k | 10000 |
| 4 | 4 k | 5000 |
| 5 | 32 k | 500 |

Figure 43A:
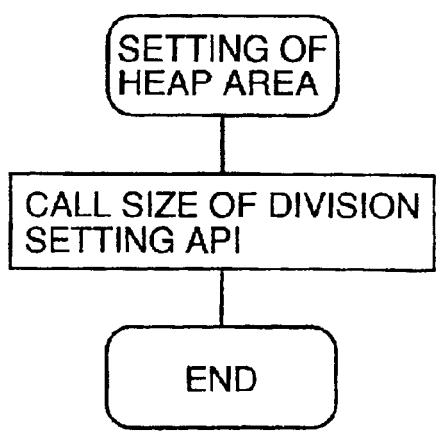
FIGS. 43A and 43B are flow charts showing a process related to division of the heap area by a prescribed size and object creation.
Figure 43B:
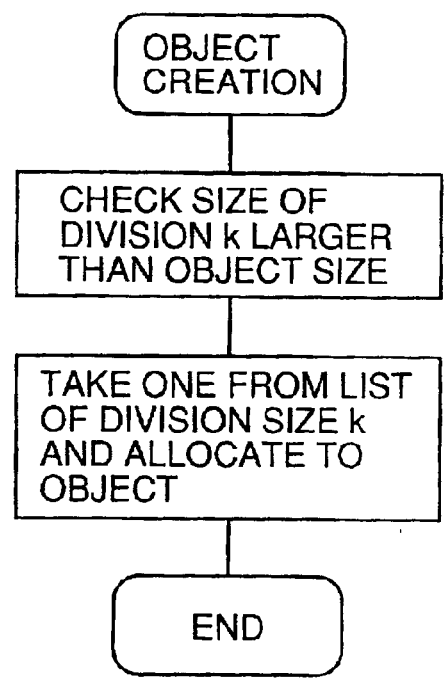
Figure 44A:
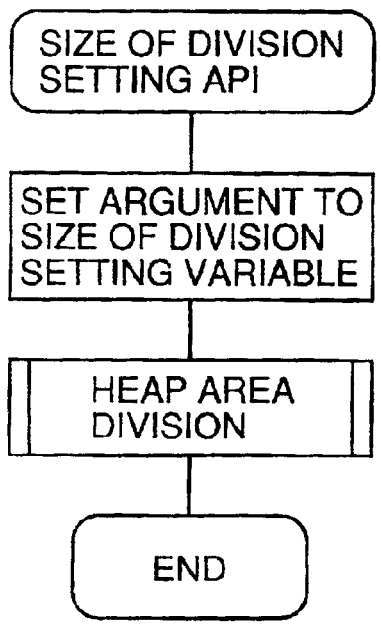
FIGS. 44A and 44B are flow charts showing a process related to division of the heap area by a prescribed size.
Figure 44B:
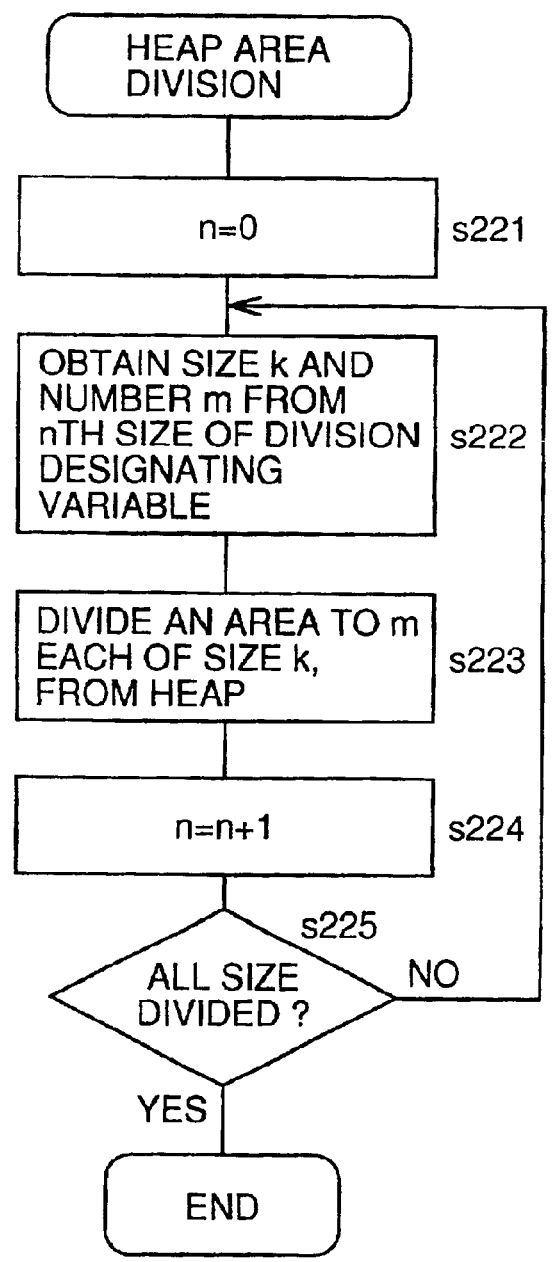

Setting of the size of division is performed by calling a division size setting API as shown in FIGS. 43A and 43B. The called division size setting API sets an argument to the size of division designating variable as shown in FIG. 44A, and divides the heap area accordingly. More specifically, referring to FIG. 44B, first, a loop counter n is set to 0 (s221), and the size k and number m are obtained from the nth size of division designating variable (s222). Thereafter, m areas each having the size k are divided from the heap area (m areas are secured), and registered in a list (s223). This process is repeated with the loop counter n incremented one by one, and division for every size is performed (s225→s222→ . . . ). When an object of which size exceeds 32 k is to be created in this example, the object is allocated to an area other than the above described divided areas, in the heap area, or the object is allocated to two or more areas.

According to the ninth embodiment, it becomes possible for many objects to re-use the memory heap area without any waste, and therefore efficiency in use of the memory can be improved without compaction. Further, the CPU power for compaction is unnecessary. Therefore, a system with high response can be configured with a small scale CPU.

Tenth Embodiment

Figure 45A:
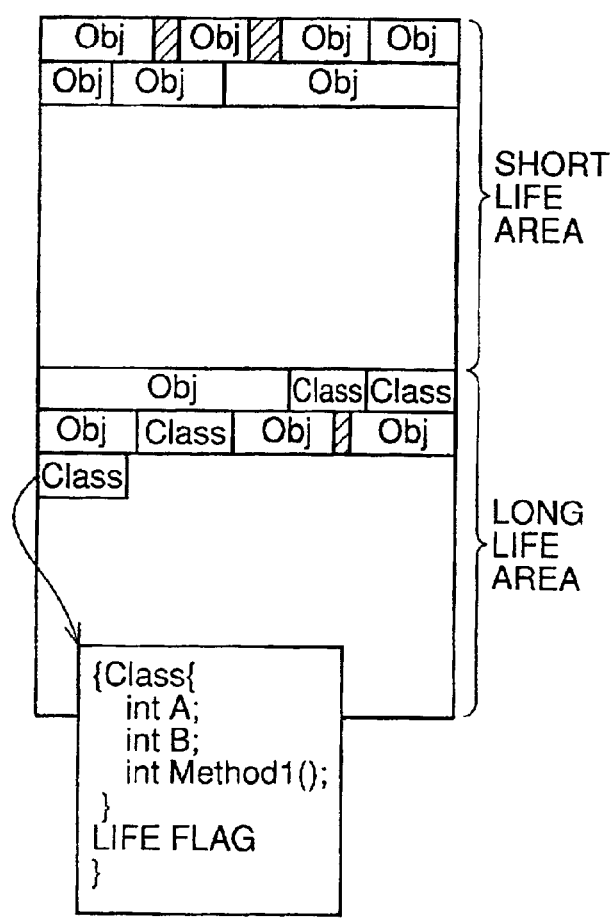
FIGS. 45A and 45B are illustrations showing configuration of heap area.
Figure 45B:
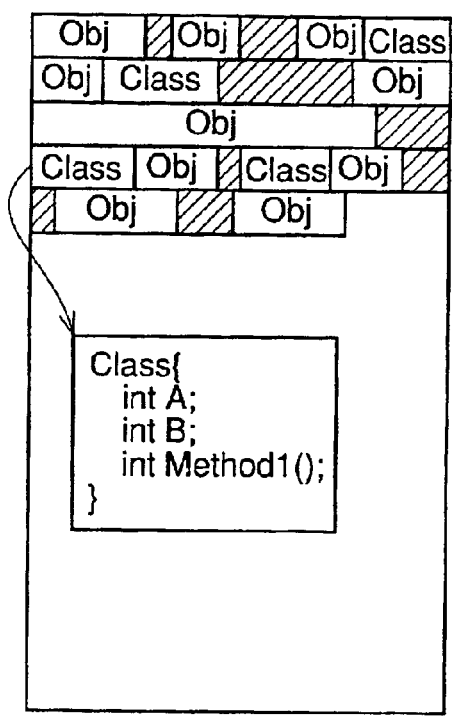

FIGS. 45A, 45B, 46 and 47 represent processes for improving GC, taking into consideration object lives. In the example shown in FIG. 45A, the heap area is divided into an area where objects having short lives are created and an area where objects having long lives are created, and a class is secured in the long life area. The class may be secured at other fixed area. The class is provided with definition information as a template for creating objects as well as a life flag indicating life of an object to be created. The life flag is automatically created when the class is created. FIG. 45B shows an example of object allocation to the heap area. Conventionally, object having long lives and object having short lives are mixed on the heap area.

Figure 46:
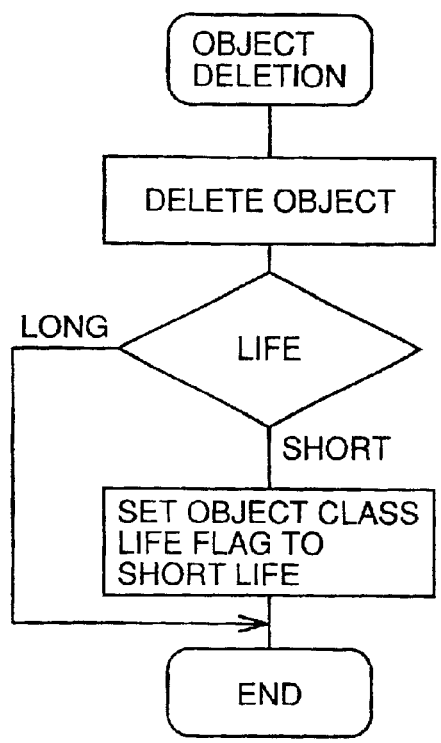
FIG. 46 is a flow chart showing a procedure of object deletion.

Referring to FIG. 46, the process of object deletion will be described. When an object is deleted, whether the object has long life or short life is determined, as shown in the figure. Whether the life is long or short is determined by a prescribed threshold value. If the object has short life, the life flag on the class to which the object belongs is set to short life. For example, a time point when the object is created is stored in an object area and based on the difference from the time point when the object is deleted, the life of the object is calculated. The time may be based on the number of GC, for example.

Figure 47:
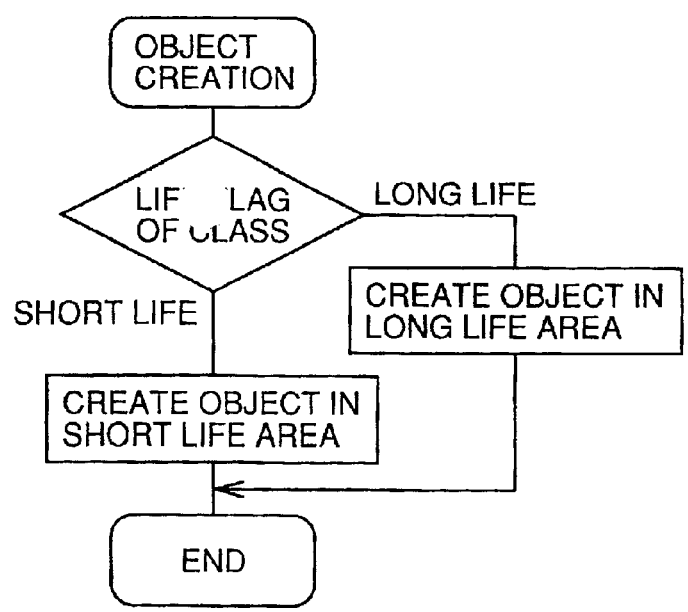
FIG. 47 is a flow chart showing a procedure of object creation.

Referring to FIG. 47, the process of object creation will be described. When the life flag of the class indicates a short life, the object is created in the short life area, and otherwise, the object is created in the long life area.

As the memory allocation area is divided depended on the life of the object, fragmentation can significantly be reduced in the long life area, whereby efficiency of memory use is improved. Further, by performing GC focusing on the short life area, the CPU power consumed for GC can be reduced.

Eleventh Embodiment

Figure 3:
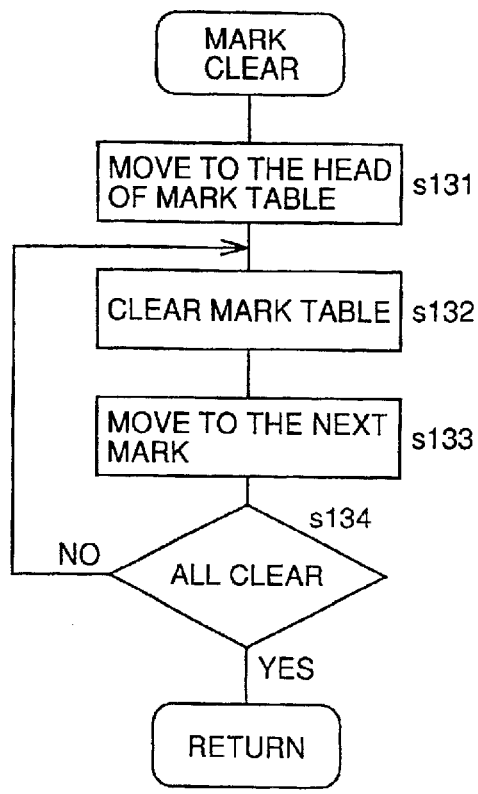
FIG. 3 is a flow chart showing a process of mark clear.
Figure 4:
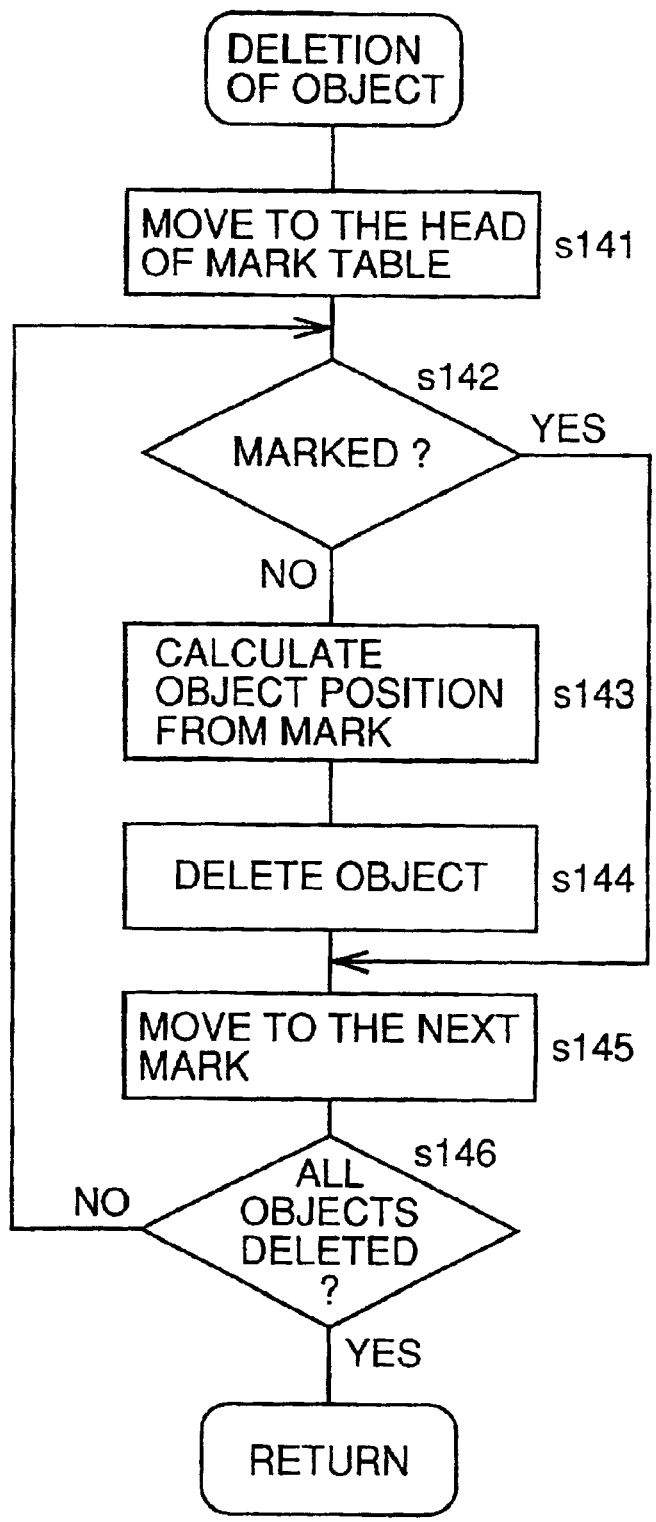
FIG. 4 is a flow chart showing a process of deletion of object.

The incremental GC in accordance with mark & sweep method will be described. The overall process procedure of GC in accordance with mark & sweep method is the same as that shown in FIGS. 2 to 4. Therefore, description is not repeated.

Figure 5A:
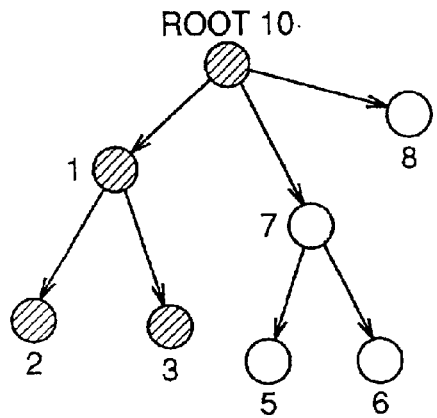
FIGS. 5A to 5C are illustrations showing an example of marking through tree search.
Figure 5B:
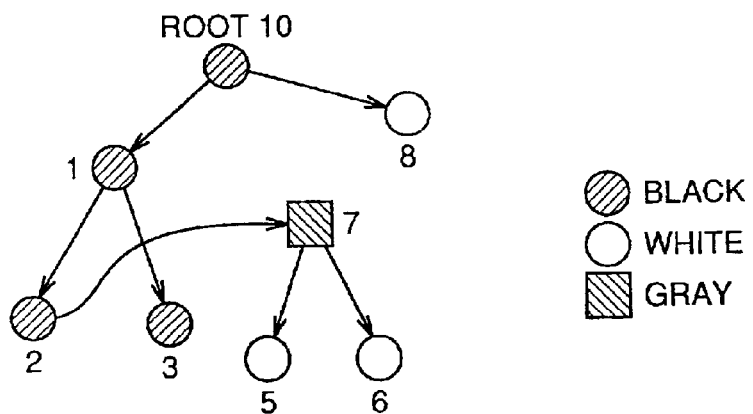
Figure 5C:
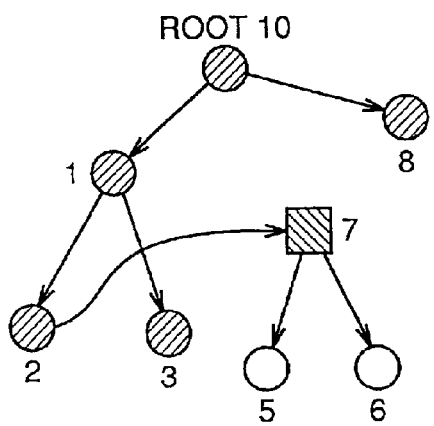
Figure 48A:
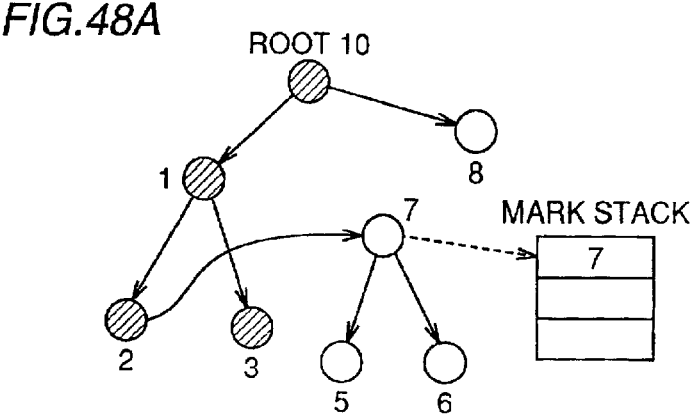
FIGS. 48A to 48D are illustrations of exemplary marking through tree search.
Figure 48B:
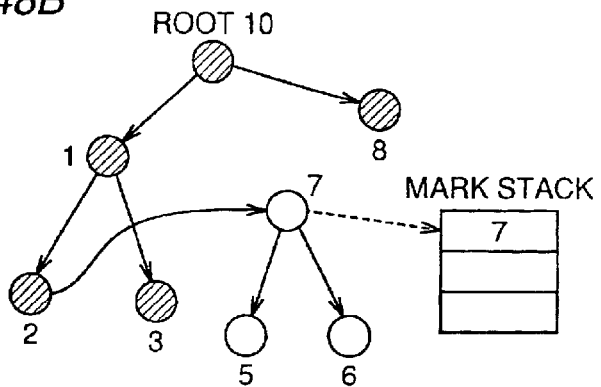
Figure 48C:
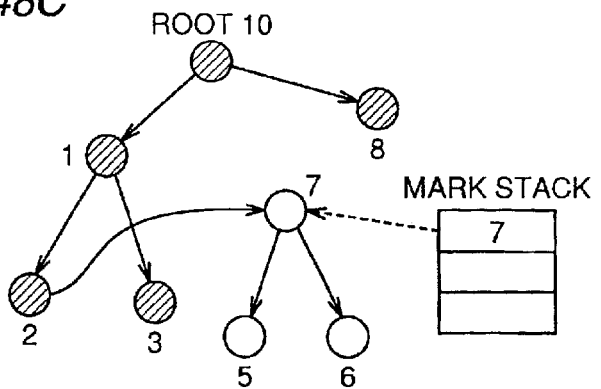
Figure 48D:
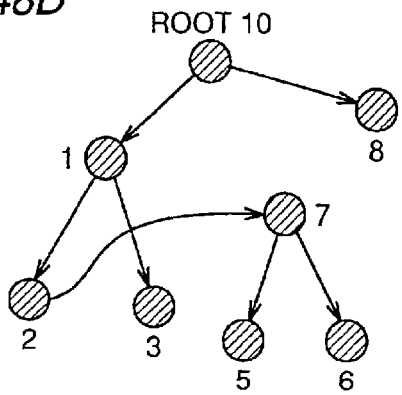

FIGS. 48A to 48D represent the procedure of "marking through tree search" eliminating the above described problem. FIG. 48A represents a, state where reference relation is changed by an interruption occurred in the state of FIG. 5A. An interruption occurs at a time point when marking of nodes up to node 3 has been completed, and by the interruption, reference relation from the root node to an object represented by node 7 is disconnected. When there is generated a relation where the object represented by node 2 refers to the object represented by node 7, data representing the referenced node 7 is stacked on a mark stack. When interruption ends and the process returns to the GC thread and marking is re-started, the reference relation from the root node to the object represented by node 7 has been disconnected. Therefore, as shown in FIG. 48B, the pointer is returned to the root node, and node number 8 is marked which has the next reference relation. At this time point, the series of tree search is completed, and thereafter, the tree is traced from a node identified by the contents of the mark stack as shown in FIG. 48C, and objects which have reference relation are marked. In this manner, all the objects which have reference relation are marked, as shown in FIG. 48D.

Figure 6:
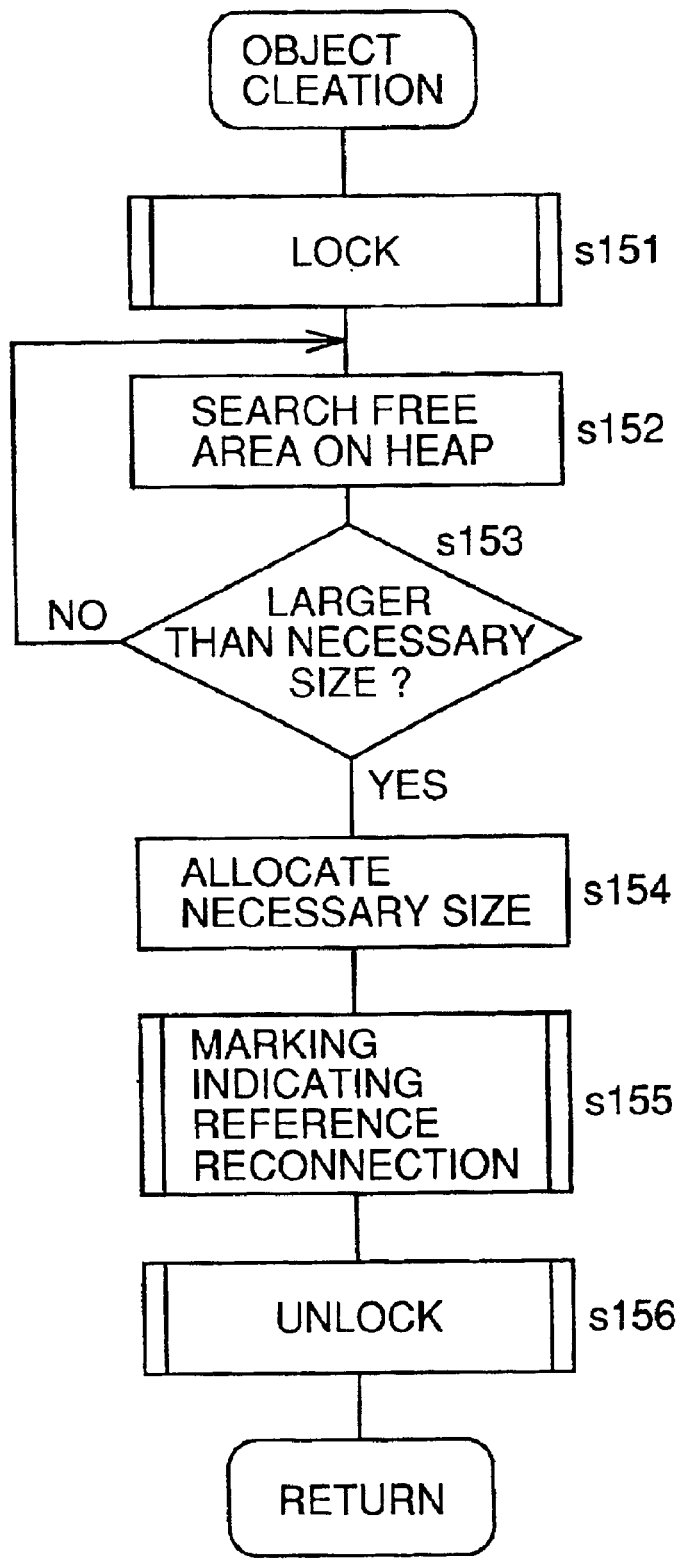
FIGS. 6 to 9 are flow charts corresponding to FIGS. 5A to 5C.
Figure 7:
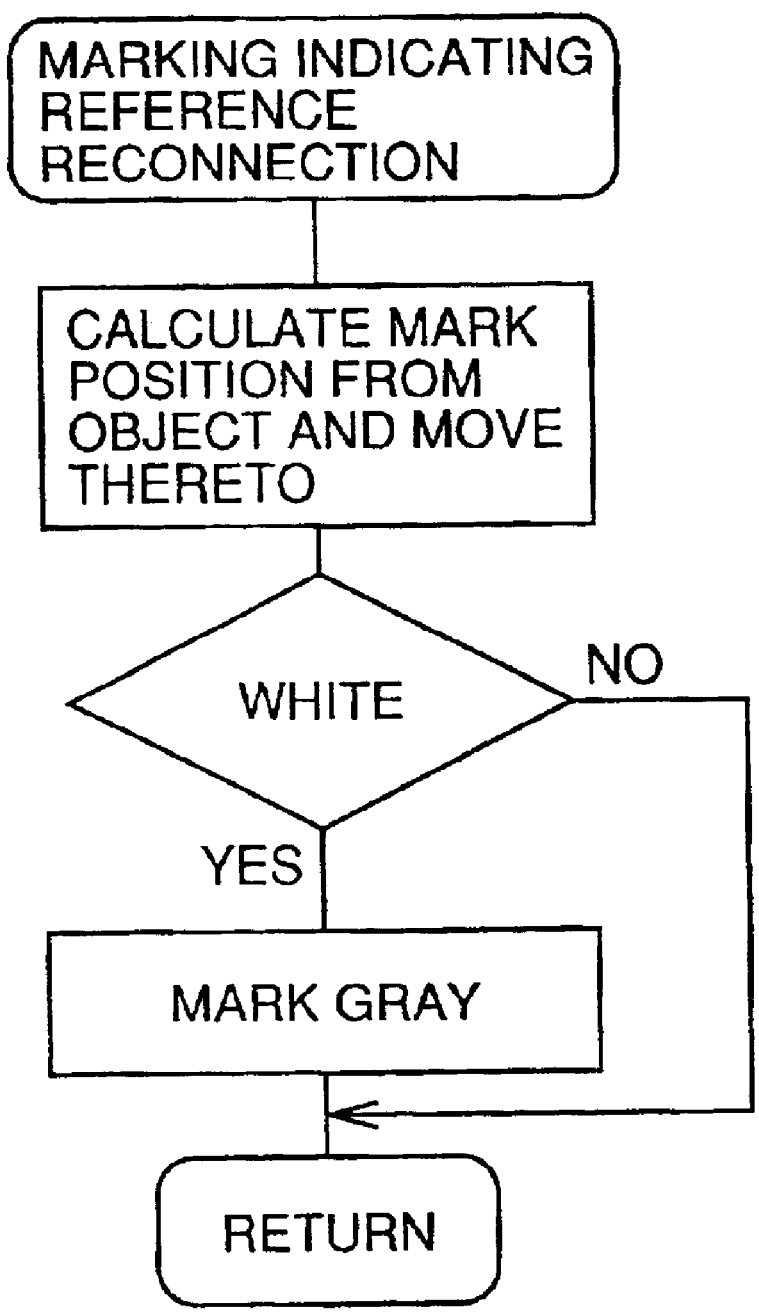
Figure 49:
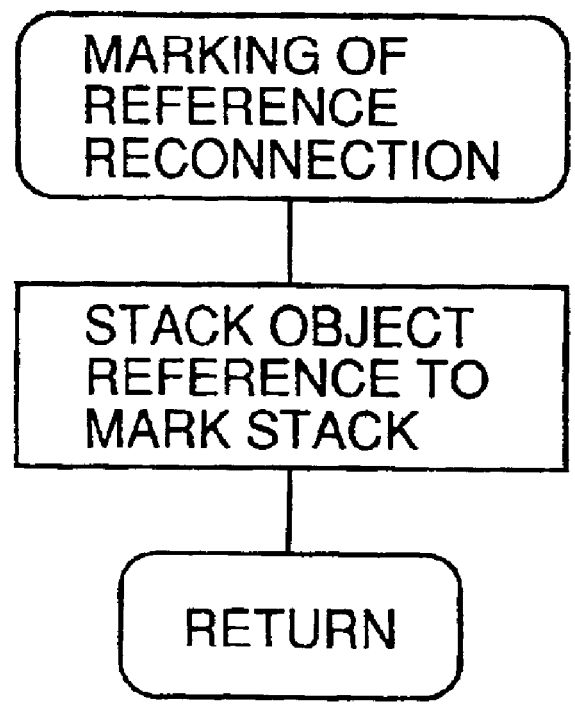
FIGS. 49 to 51 are flow charts corresponding to FIGS. 48A to 48D.

Referring to FIG. 49, the process of "marking indicating reference reconnection" (s155 of FIG. 6) will be described. In this manner, data indicating an object of which relation is reconnected is stacked on the mark stack. The process of object creation is the same as that shown in FIG. 6.

Figure 1:
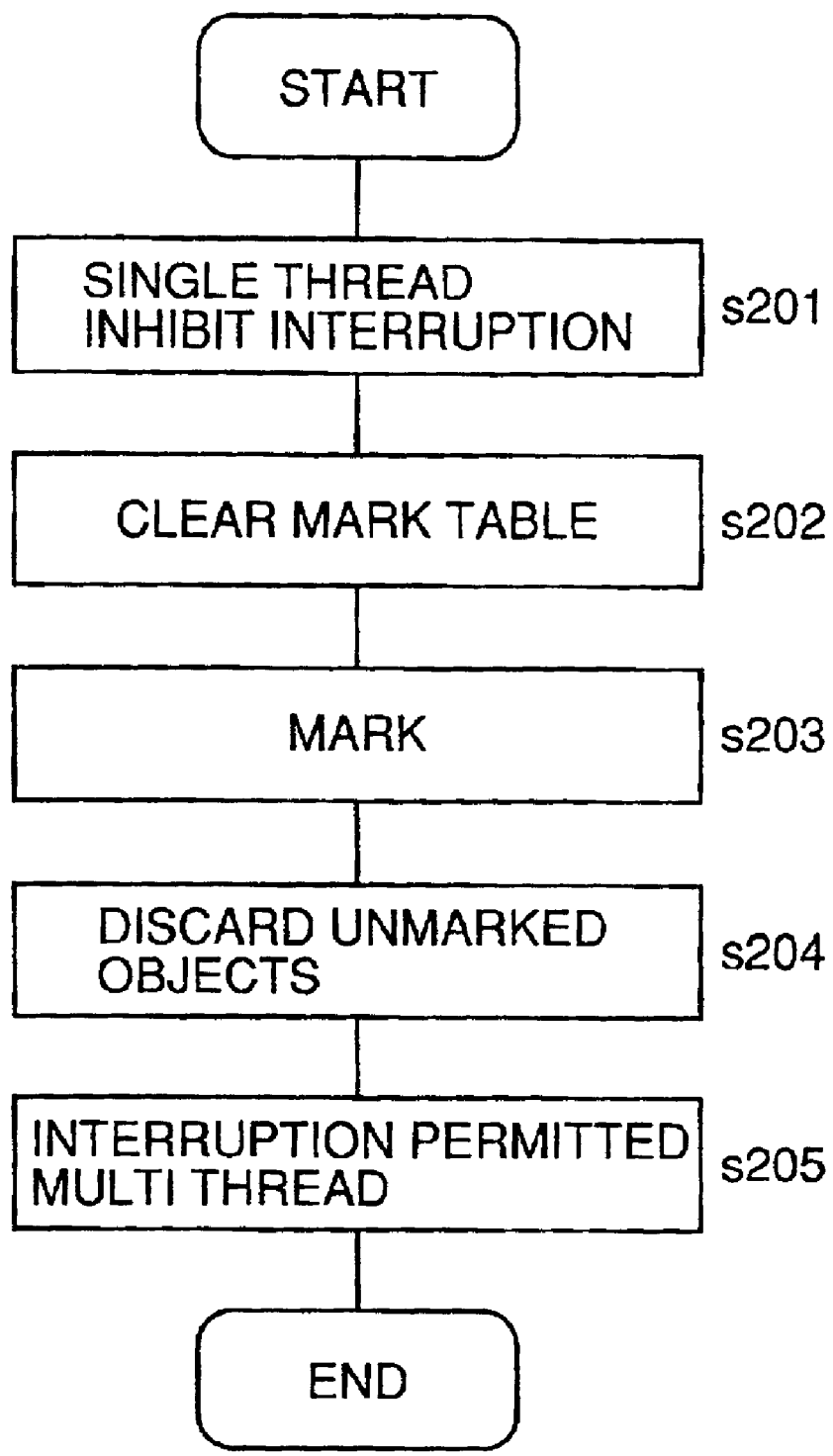
FIG. 1 is a flow chart representing a conventional procedure of GC in accordance with mark & sweep method.
Figure 2:
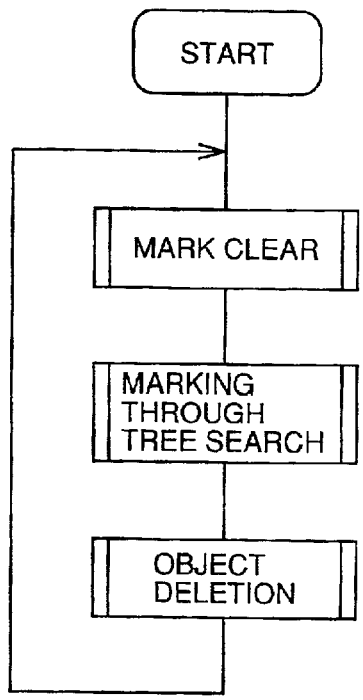
FIG. 2 is a flow chart showing a procedure of GC in accordance with mark & sweep method.
Figure 8:
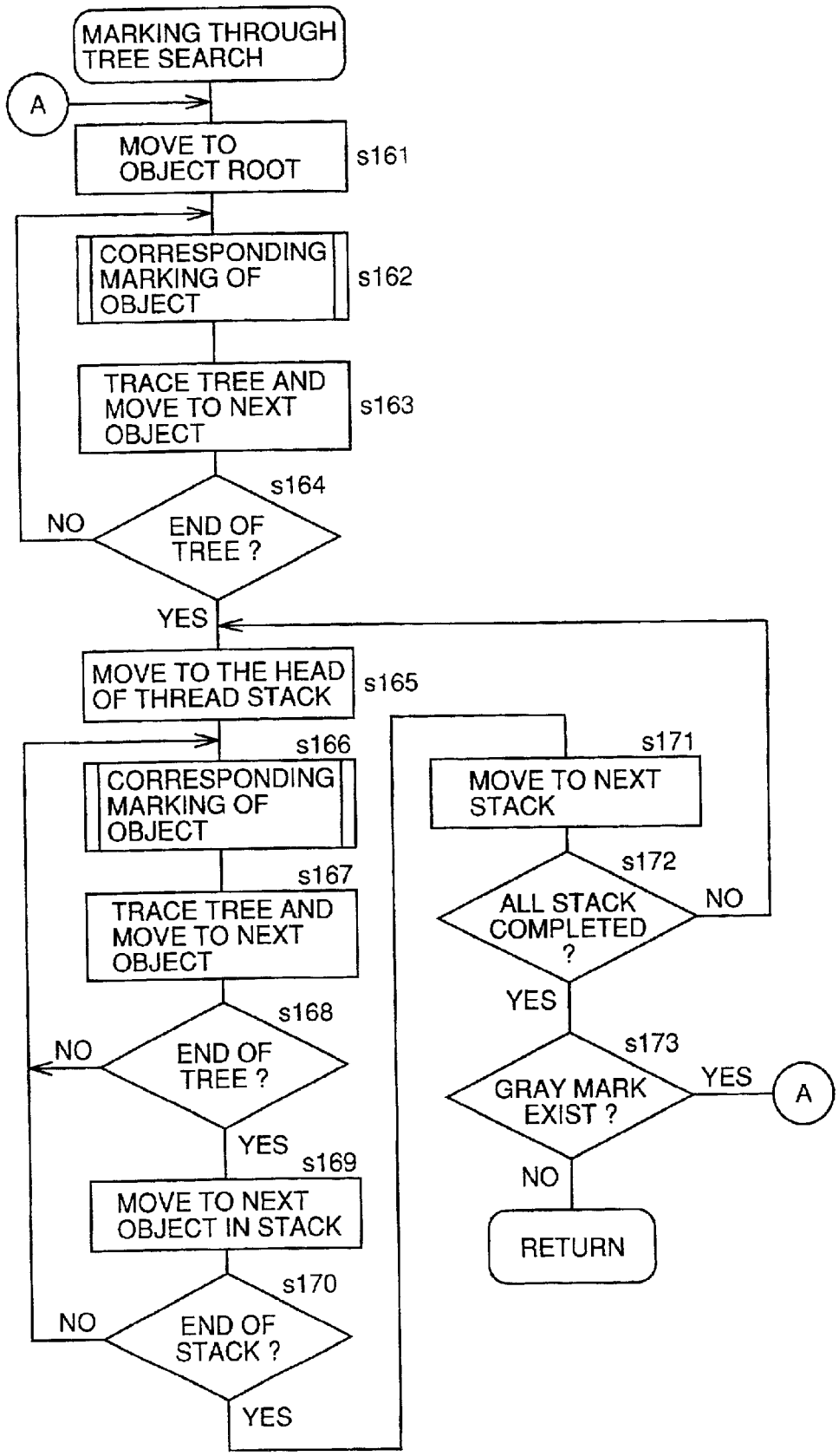
Figure 9:
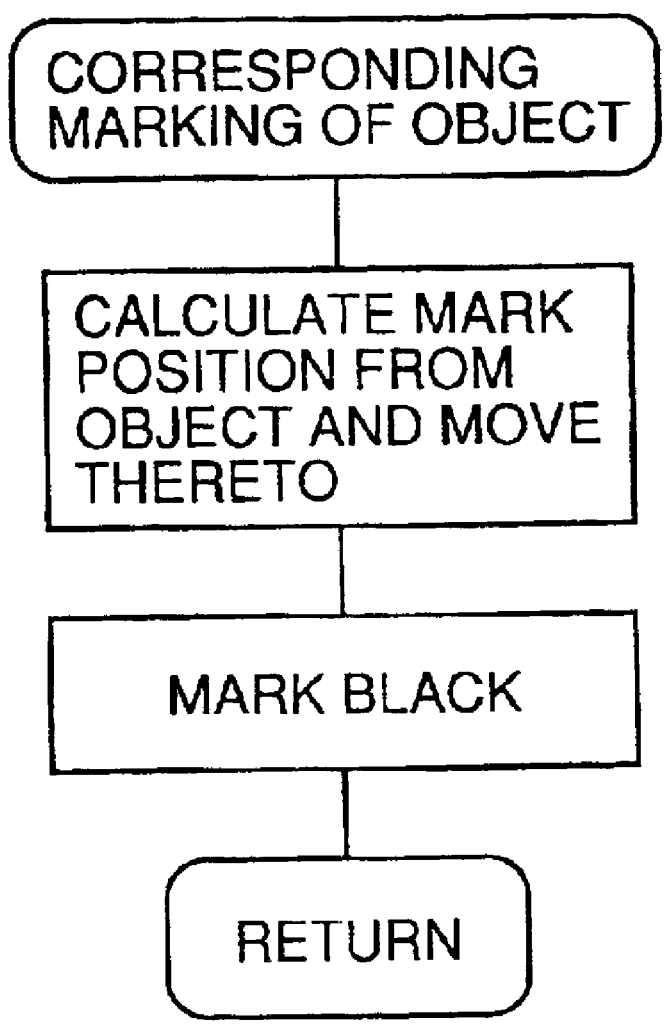
Figure 50:
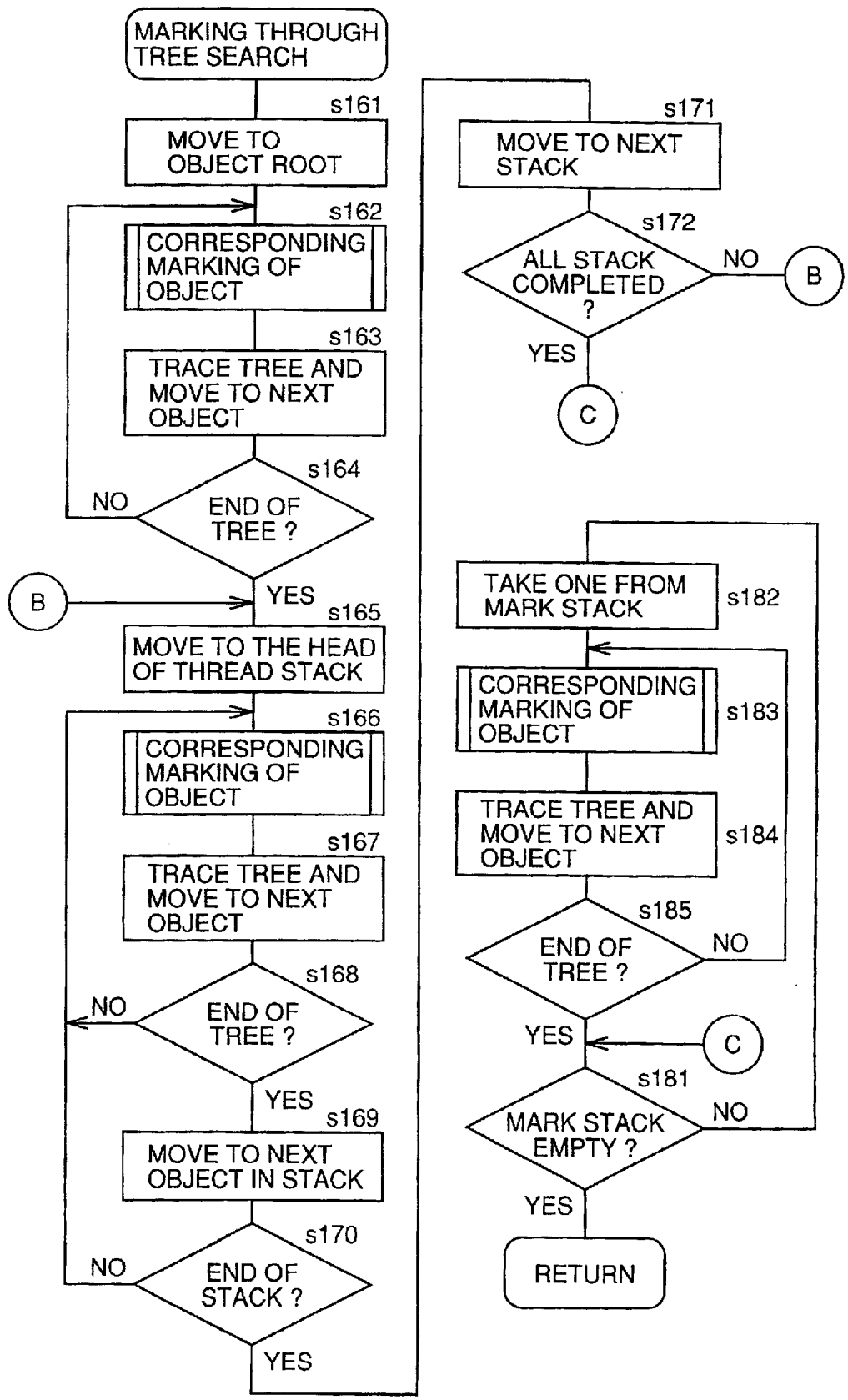

Referring to FIG. 50, the process of "marking through tree search" of FIG. 2 will be described. Steps s161 to s172 are the same as steps s161 to s172 of the flow chart shown in FIG. 8. Therefore, description is not repeated. In the example shown in FIG. 50, tree search for all the stacks is completed, and thereafter, data is taken out from the mark stack (s181→s182). Corresponding marking is done on the object identified by the data (s183), and starting from the object, the tree is traced to the end while marking the objects which have reference-relation (s184→s185→s183→ . . . ). This process is repeated while the pointer of the mark stack being updated, until the mark stack becomes empty (s181→s182→ . . . ).

Figure 51:
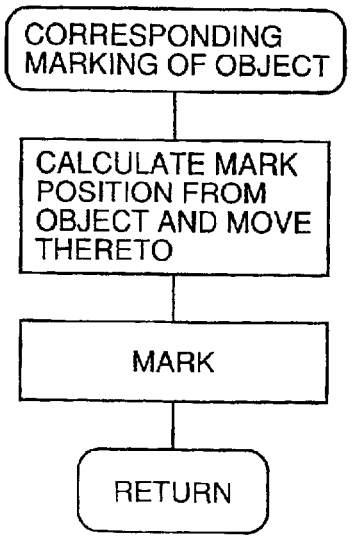

Referring to FIG. 51, the process of "corresponding marking of object" will be described. In this process, a position on the mark table is calculated and moved based on the created object, and the position is marked.

By utilizing the mark stack, it becomes unnecessary to restart tree search from the root node, and hence the overall processing time necessary for marking can significantly be reduced.

Figure 52:
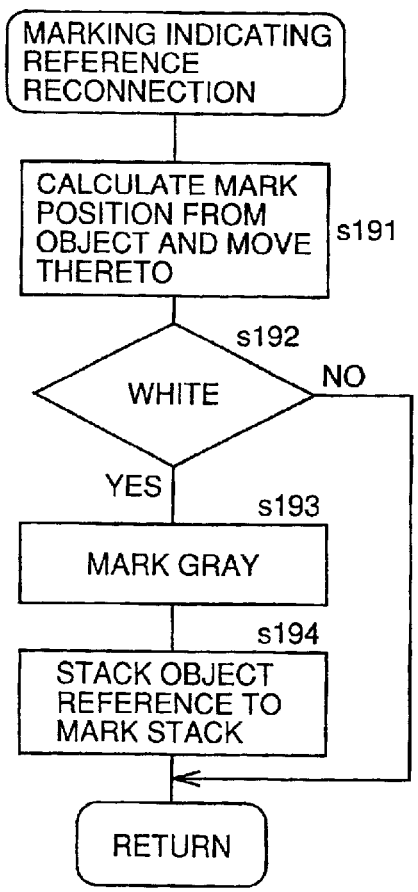
FIG. 52 is a flow chart showing another process for marking indicating reference reconnection.
Figure 53:
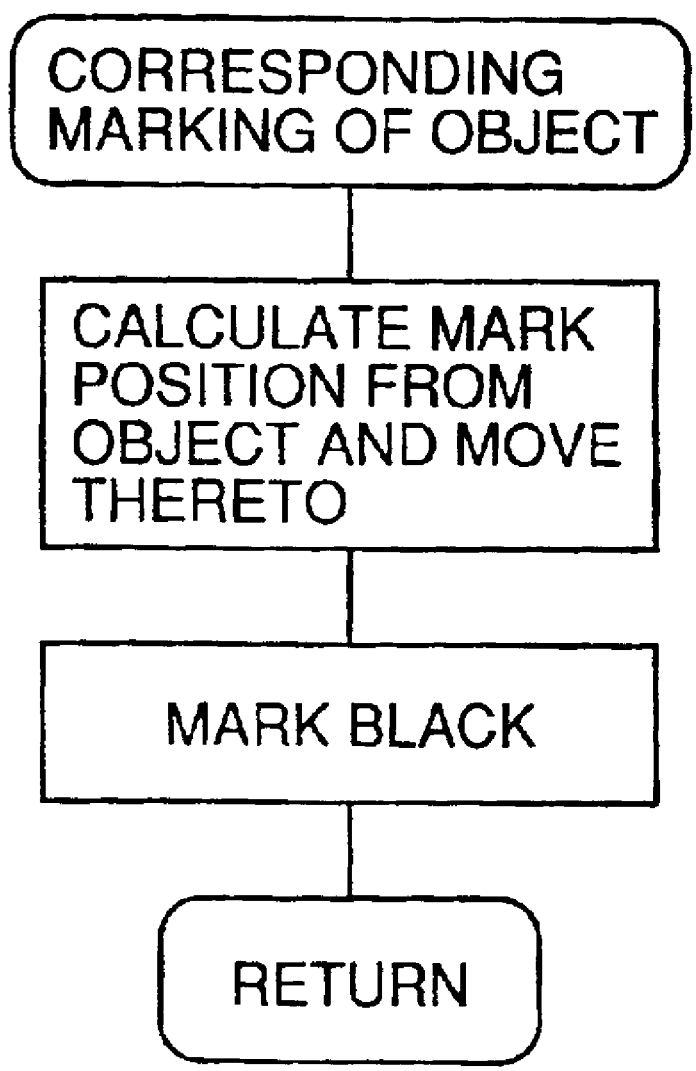
FIG. 53 is a flow chart showing another process of corresponding marking of object.

Referring to FIGS. 52 and 53, an example for further reducing the wasteful process time in marking the mark stack will be described.

Referring to FIG. 52, the process of marking indicating reference reconnection will be described. First, based on the object of which reference is reconnected, a position on the mark table is calculated, and whether the mark is WHITE mark or not is determined (s191→s192). This WHITE mark represents unmarked state, as described above. If the mark is not WHITE mark it means that the position in already marked. Therefore the process is terminated. If the mark is a WHITE mark, it is marked GRAY (s193). The GRAY mark represents an object of which reference is reconnected, as described above. Thereafter, data indicating the object to be referenced is stacked on the mark stack (s194).

Referring to FIG. 53, the process of "corresponding marking of object" in FIG. 50 will be described. In this process, based on a created object, a position of the mark table is calculated, and the position is marked BLACK. The BLACK mark represents a marked state. The process of "object creation" is the same as that shown in FIG. 44.

When the object of which reference is reconnected is to be marked, the object is marked only if the object is detected for the first time. Therefore, the time necessary for tree search in accordance with the contents of the mark stack and the time necessary for reading the mark stack can be reduced.

Further, the mark for the object of which reference is reconnected may not be stored in a stack but stored in an FIFO (First-In First-Out) buffer.

Though positions on the mark table are marked in the present invention, mark information may be provided inside the object and the object may directly be marked.

According to the eleventh embodiment, when sweeping or mark table clearing is performed, even if a new object is created by another thread or the relation of reference among objects is changed during sweeping or clearing of the mark table, erroneous deletion of the newly created object can be avoided while sweeping is performed based on the mark table, and it is not necessary to stop other threads. Therefore, GC can be done incrementally, and interruption can be done freely. This improves real time operation. Further, it becomes possible to execute GC thread continuously on the background, and therefore efficiency in use of the memory can be maintained high. Further, the time necessary for marking through tree searching is reduced. The problem of endless marking caused by interruption is prevented, and GC is surely executed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program control apparatus for controlling execution of a program in a computer system in which a plurality of threads are switched in accordance with a scheduling policy by a scheduler, comprising:

a first means for setting a prescribed flag to a first state, wherein said first means for setting a prescribed flag is responsive to a first application program interface call for requesting a start of context switching detection made from a first thread of said plurality of threads;

a second means for setting the prescribed flag to a second state, wherein said second means for setting the prescribed flag is responsive to context switches and sets the prescribed flag to the second state when a context switch is detected while the prescribed flag is in the first state;

a means for producing a first return value when the prescribed flag is in the first state and for producing a second return value when the prescribed is in the second state, wherein said means for producing a return value is responsive and passes said return value to, said first thread making a second application program interface call requesting a termination of context switch detection; and a means for invalidating said first thread if the return value is set to said second value when said first thread calls said second application program interface.

2. The program control apparatus according to claim 1, further comprising:

a means for alternately changing a priority of said first thread to high and low; and a means for comparing, for receiving a process time for said first thread between said first application program interface call and said second application program interface call, wherein said means for comparing compares the received process time with a remaining time until the priority of said first thread is changed to low, when said first thread is at a high priority state, and upon detection that said remaining time is shorter than said process time, lowering the priority of said first thread.

3. The program control apparatus according to claim 1, wherein said first thread is a garbage collection thread in accordance with copy method in which an object which is referenced by any other object in a memory heap area is detected, and the object is copied to a prescribed area in said heap area.

4. The program control apparatus according to claim 1, wherein said first thread is a memory compaction thread for eliminating fragmentation, by freeing a memory area of an object not referenced by any other object in a memory heap area as a free memory area allocatable to other object.

5. The program control apparatus of claim 1, wherein said first means for setting the prescribed flag includes a means responsive to the first application program interface call from the first thread for setting said prescribed flag to said first state, and said first state also corresponding to absence of a data write in a designated area; and said second means for setting the prescribed flag includes a means for setting, when there is a data write to said designated memory area, said prescribed flag to the second state, and said second state also corresponding to presence of a data write.

6. A method of program control, comprising the steps of:

in response to a first application program interface call from a first thread from a plurality of threads which requests a start of context switching detection, setting a flag to a state indicating absence of context switching;

in response to a detection of context switching after said flag is set to the state indicating absence of context switching,
setting said flag to a state indicating presence of context switching;

in response to a second application program interface call from said first thread, providing a return value indicating the state of said flag to said first thread; and invalidating said first thread if the return value corresponds to said flag indicating presence of context switching.

7. A method of program control, comprising the steps of:

in response to a first application program interface call from a first thread from a plurality of threads which requests a start of detection of a data write to a designated memory area,
setting a flag to a state indicating the absence of a data write;

in response to a detection of a data write to the designated memory area after said flag is set to the state indicating the absence of a data write,
setting said flag to a state indicating a presence of a data write;

in response to a second application program interface call from said first thread,
returning a value corresponding to the state of said flag to said thread; and invalidating said first thread if the return value corresponds to said flag indicating presence of a data write.

8. A computer readable recording medium storing a program allowing a computer to execute a program control method, said program control method includes the steps of:

in response to a first application program interface call from a thread which requests a start of detection of context switching,
setting a flag indicating the absence of context switching;

in response to a detection of a context switch, and after said first application program interface call,
setting said flag a state corresponding to presence of context switching;

in response to a second application program interface call from said thread which requests a termination of detection of context switching,
returning a value corresponding to the state of said flag to said thread; and invalidating said thread if the return value corresponds to said flag indicating presence of context switching.

9. A computer readable recording medium storing a program allowing a computer to execute a program control method, said program control method comprising the steps of:

in response to a first application program interface call from a thread which requests a start of detection of a data write to a designated memory area,
setting a flag indicating an absence of data writes;

in response to a detection of a data write to said designated memory area,
setting said flag to a state corresponding to presence of a data write;

in response to a second application program interface call from said thread which requests a termination of detection of a data write to the designated memory area,
returning a value corresponding to the state of said flag to said thread; and invalidating said thread if the return value corresponds to said flag indicating detection of a data write.

* * * * *